US012529836B2

(12) United States Patent
Saitoh et al.

(10) Patent No.: US 12,529,836 B2
(45) Date of Patent: Jan. 20, 2026

(54) TRANSMISSIVE LIQUID CRYSTAL DIFFRACTION ELEMENT

(71) Applicant: FUJIFILM Corporation, Tokyo (JP)

(72) Inventors: Yukito Saitoh, Minamiashigara (JP); Hiroshi Sato, Minamiashigara (JP); Takashi Yonemoto, Minamiashigara (JP); Jun Watanabe, Minamiashigara (JP); Mitsuyoshi Ichihashi, Minamiashigara (JP); Keisuke Kodama, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 575 days.

(21) Appl. No.: 18/056,536

(22) Filed: Nov. 17, 2022

(65) Prior Publication Data

US 2023/0097214 A1 Mar. 30, 2023

Related U.S. Application Data

(63) Continuation of application No. PCT/JP2021/018693, filed on May 18, 2021.

(30) Foreign Application Priority Data

May 20, 2020 (JP) ................................. 2020-087866
Jul. 30, 2020 (JP) ................................. 2020-129051
Dec. 22, 2020 (JP) ................................. 2020-212620

(51) Int. Cl.
G02B 5/30 (2006.01)
(52) U.S. Cl.
CPC ......... G02B 5/3016 (2013.01); G02B 5/3083 (2013.01)

(58) Field of Classification Search
CPC ........................... G02B 5/3016; G02B 5/3083
See application file for complete search history.

(56) References Cited

U.S. PATENT DOCUMENTS

2008/0278675 A1 11/2008 Escuti et al.
2010/0225876 A1 9/2010 Escuti et al.
(Continued)

FOREIGN PATENT DOCUMENTS

JP 2008-532085 A 8/2008
JP 2012-203212 A 10/2012
(Continued)

OTHER PUBLICATIONS

English machine translation of WO 2020/075711A1 (Year: 2020).*
(Continued)

*Primary Examiner* — Anne M Hines
(74) *Attorney, Agent, or Firm* — Birch, Stewart, Kolasch & Birch, LLP

(57) ABSTRACT

A transmissive liquid crystal diffraction element includes a first optically-anisotropic layer and a second optically-anisotropic layer each of which has a liquid crystal alignment pattern in which a direction of an optical axis derived from a liquid crystal compound changes while continuously rotating in at least one in-plane direction, in which a rotation direction of the optical axis in the liquid crystal alignment pattern of the first optically-anisotropic layer and a rotation direction of the optical axis in the liquid crystal alignment pattern of the second optically-anisotropic layer are opposite to each other, and a single period of the liquid crystal alignment pattern in the first optically-anisotropic layer and a single period of the liquid crystal alignment pattern in the second optically-anisotropic layer are the same.

8 Claims, 12 Drawing Sheets

(56) References Cited

U.S. PATENT DOCUMENTS

| 2013/0077040 A1 | 3/2013 | Escuti et al. |
| 2015/0205182 A1 | 7/2015 | Leister |
| 2021/0041610 A1 | 2/2021 | Saitoh et al. |
| 2021/0088703 A1 | 3/2021 | Saitoh et al. |
| 2021/0231985 A1 | 7/2021 | Sato et al. |

FOREIGN PATENT DOCUMENTS

| JP | 2014-89476 A | 5/2014 |
| WO | WO 2019/221294 A1 | 11/2019 |
| WO | WO 2020/075711 A1 | 4/2020 |

OTHER PUBLICATIONS

Japanese Office Action for corresponding Japanese Application No. 2022-524481, dated Dec. 5, 2023, with English translation.
International Preliminary Report on Patentability dated Dec. 1, 2022, and English translation of the Written Opinion of the International Searching Authority, dated Jul. 13, 2021, for International Application No. PCT/JP2021/018693.
International Search Report for International Application No. PCT/JP2021/018693, dated Jul. 13, 2021, with English translation.
Chinese Office Action and Search Report for corresponding Chinese Application No. 202180035467.8, dated Jul. 22, 2025, with English translation.

\* cited by examiner

TRANSMISSIVE LIQUID CRYSTAL DIFFRACTION ELEMENT

CROSS-REFERENCE TO RELATED APPLICATIONS

This application is a Continuation of PCT International Application No. PCT/JP2021/018693 filed on May 18, 2021, which claims priority under 35 U.S.C § 119(a) to Japanese Patent Application No. 2020-087866 filed on May 20, 2020, Japanese Patent Application No. 2020-129051 filed on Jul. 30, 2020, and Japanese Patent Application No. 2020-212620 filed on Dec. 22, 2020. Each of the above application(s) is hereby expressly incorporated by reference, in its entirety, into the present application.

BACKGROUND OF THE INVENTION

1. Field of the Invention

The present invention relates to a transmissive liquid crystal diffraction element that diffracts incident light.

2. Description of the Related Art

As an optical element that bends light to control a traveling direction of the light, a diffraction element is used in many optical devices or optical systems.

As this diffraction element, a liquid crystal diffraction element formed of a liquid crystal compound is disclosed.

For example, JP2014-089476A discloses a polarization diffraction grating including a first polarization diffraction grating layer and a second polarization diffraction grating layer disposed on the first polarization diffraction grating layer. The first polarization diffraction grating layer includes a molecular structure that is twisted according to a first twist sense such that respective relative alignments of molecules of the first polarization diffraction grating layer rotate by a first twisted angle over a first thickness defined between opposing faces of the first polarization diffraction grating layer. The second polarization diffraction grating layer includes a molecular structure that is twisted according to a second twist sense opposite to the first twist sense such that respective relative alignments of molecules of the second polarization diffraction grating layer rotate by a second twisted angle over a second thickness defined between opposing faces of the second polarization diffraction grating layer.

SUMMARY OF THE INVENTION

In a polarization diffraction element formed of a liquid crystal compound, a direction in which light is bent varies depending on polarized light. Specifically, left circularly polarized light and right circularly polarized light incident into the polarization diffraction element are bent in opposite directions and separated. Therefore, light cannot be diffracted in a predetermined direction irrespective of polarized light.

An object of the present invention is to provide a transmissive liquid crystal diffraction element that can diffract different polarized light components in the same direction.

In order to achieve the object, the present invention has the following configurations.

[1] A transmissive liquid crystal diffraction element comprising:
a first optically-anisotropic layer and a second optically-anisotropic layer each of which has a liquid crystal alignment pattern in which a direction of an optical axis derived from a liquid crystal compound changes while continuously rotating in at least one in-plane direction,
in which a rotation direction of the optical axis in the liquid crystal alignment pattern of the first optically-anisotropic layer and a rotation direction of the optical axis in the liquid crystal alignment pattern of the second optically-anisotropic layer are opposite to each other, and
in a case where a length over which the direction of the optical axis derived from the liquid crystal compound in the liquid crystal alignment pattern rotates by 180° in a plane is set as a single period, a single period of the liquid crystal alignment pattern in the first optically-anisotropic layer and a single period of the liquid crystal alignment pattern in the second optically-anisotropic layer are the same.

[2] The transmissive liquid crystal diffraction element according to [1],
in which the liquid crystal compound in each of the first optically-anisotropic layer and the second optically-anisotropic layer is twisted and aligned in a thickness direction,
a twisted angle of the twisted alignment is less than 360°, and
a twisted direction of the liquid crystal compound in the first optically-anisotropic layer and a twisted direction of the liquid crystal compound in the second optically-anisotropic layer are opposite to each other.

[3] The transmissive liquid crystal diffraction element according to [1] or [2],
in which the liquid crystal compound is a rod-like liquid crystal compound or a disk-like liquid crystal compound.

[4] The transmissive liquid crystal diffraction element according to any one of [1] to [3],
in which at least one of the first optically-anisotropic layer or the second optically-anisotropic layer has a configuration in which a rod-like liquid crystal layer where a rod-like liquid crystal compound is aligned in the liquid crystal alignment pattern and a disk-like liquid crystal layer where a disk-like liquid crystal compound is aligned in the liquid crystal alignment pattern are alternately laminated.

[5] The transmissive liquid crystal diffraction element according to [1],
in which at least one of the first optically-anisotropic layer or the second optically-anisotropic layer has a configuration in which a plurality of liquid crystal layers where the liquid crystal compound is twisted and aligned in a thickness direction are laminated,
a twisted angle of the twisted alignment in each of the liquid crystal layers is less than 360°, and
twisted directions of the liquid crystal compound in the plurality of liquid crystal layers are alternately changed in a laminating direction.

[6] The transmissive liquid crystal diffraction element according to [5],
in which at least one of the liquid crystal layers has a configuration in which a rod-like liquid crystal layer where a rod-like liquid crystal compound is aligned in the liquid crystal alignment pattern and a disk-like liquid crystal layer where a disk-like liquid crystal compound is aligned in the liquid crystal alignment pattern are alternately laminated.

[7] The transmissive liquid crystal diffraction element according to any one of [1] to [6], further comprising:
a retardation layer that is disposed between the first optically-anisotropic layer and the second optically-anisotropic layer.

[8] The transmissive liquid crystal diffraction element according to [7],
in which an Nz value of the retardation layer is 0.1 to 1.1.

[9] The transmissive liquid crystal diffraction element according to any one of [1] to [8], further comprising:
an λ/4 plate that is provided on at least one of a side of the first optically-anisotropic layer opposite to the second optically-anisotropic layer or a side of the second optically-anisotropic layer opposite to the first optically-anisotropic layer.

According to an aspect of the present invention, a transmissive liquid crystal diffraction element that can diffract different polarized light components in the same direction and has high diffraction efficiency can be provided.

DESCRIPTION OF THE PREFERRED EMBODIMENTS

Hereinafter, a transmissive liquid crystal diffraction element according to an embodiment of the present invention will be described in detail based on a preferred embodiment shown in the accompanying drawings.

In the present specification, numerical ranges represented by "to" include numerical values before and after "to" as lower limit values and upper limit values.

In the present specification, "(meth)acrylate" represents "either or both of acrylate and methacrylate".

In the present specification, the meaning of "the same" and "equal" includes a case where an error range is generally allowable in the technical field.

[Transmissive Liquid Crystal Diffraction Element]

The liquid crystal diffraction element according to the embodiment of the present invention comprises:
a first optically-anisotropic layer and a second optically-anisotropic layer each of which has a liquid crystal alignment pattern in which a direction of an optical axis derived from a liquid crystal compound changes while continuously rotating in at least one in-plane direction,
in which a rotation direction of the optical axis in the liquid crystal alignment pattern of the first optically-anisotropic layer and a rotation direction of the optical axis in the liquid crystal alignment pattern of the second optically-anisotropic layer are opposite to each other, and
in a case where a length over which the direction of the optical axis derived from the liquid crystal compound in the liquid crystal alignment pattern rotates by 180° in a plane is set as a single period, a single period of the liquid crystal alignment pattern in the first optically-anisotropic layer and a single period of the liquid crystal alignment pattern in the second optically-anisotropic layer are the same.

Figure 1:
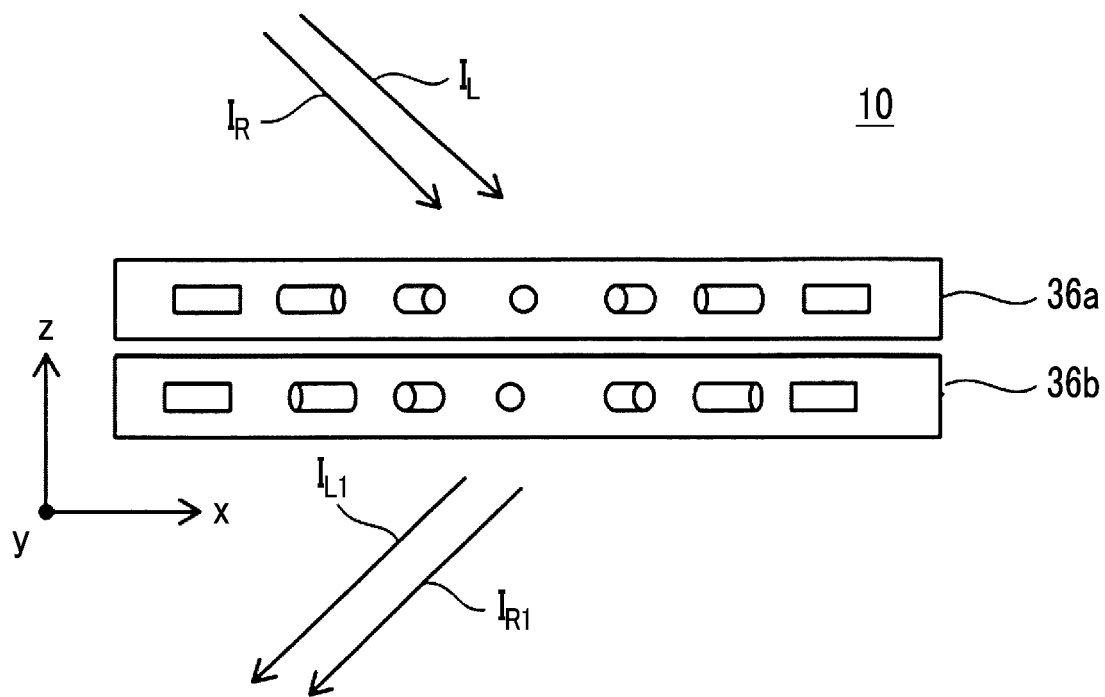
FIG. 1 is a diagram conceptually showing an example of a transmissive liquid crystal diffraction element according to the present invention.

FIG. 1 conceptually shows an example of the transmissive liquid crystal diffraction element according to the embodiment of the present invention.

A transmissive liquid crystal diffraction element 10 shown in FIG. 1 includes a first optically-anisotropic layer 36a and a second optically-anisotropic layer 36b that are laminated in a thickness direction. In FIG. 1, in order to simplify the drawing to clearly show a configuration of the transmissive liquid crystal diffraction element 10, in the first optically-anisotropic layer 36a and the second optically-anisotropic layer 36b, only liquid crystal compounds 40 (molecules of the liquid crystal compound) on a surface are conceptually shown. However, each of the first optically-anisotropic layer 36a and the second optically-anisotropic layer 36b has a structure in which the liquid crystal compounds 40 are laminated in the thickness direction as conceptually shown in FIG. 2 and where optical axes of the liquid crystal compounds 40 laminated in the thickness direction are directed in the same direction.

As shown in FIG. 1, the first optically-anisotropic layer 36a and the second optically-anisotropic layer 36b are laminated in the thickness direction.

Each of the first optically-anisotropic layer 36a and the second optically-anisotropic layer 36b has a liquid crystal alignment pattern in which a direction of an optical axis derived from a liquid crystal compound changes while continuously rotating in at least one in-plane direction.

The first optically-anisotropic layer 36a and the second optically-anisotropic layer 36b have the above-described liquid crystal alignment pattern such that transmitted light can be diffracted. In this case, in a case where a length over which the direction of the optical axis derived from the liquid crystal compound in the liquid crystal alignment pattern rotates by 180° in a plane is set as a single period, (hereinafter, also referred to as the single period of the liquid crystal alignment pattern), the diffraction angle depends on the length of the single period. Therefore, the diffraction angle can be adjusted by adjusting the single period of the liquid crystal alignment pattern.

Here, in the present invention a rotation direction of the optical axis in the liquid crystal alignment pattern of the first optically-anisotropic layer 36a and a rotation direction of the optical axis in the liquid crystal alignment pattern of the second optically-anisotropic layer are opposite to each other. In addition, a single period of the liquid crystal alignment pattern in the first optically-anisotropic layer 36a and a single period of the liquid crystal alignment pattern in the second optically-anisotropic layer 36b are the same. The transmissive liquid crystal diffraction element according to the embodiment of the present invention having the above-described configuration diffracts light incident into a main surface from an oblique direction while allowing transmission of the incident light. In this case, right circularly polarized light and left circularly polarized light can be diffracted in the same direction. That is, the transmissive liquid crystal diffraction element according to the embodiment of the present invention can realize a transmissive liquid crystal diffraction element that can diffract different polarized light components in the same direction and has high diffraction efficiency. This action will be described below in detail.

(Optically-Anisotropic Layer)

The first optically-anisotropic layer 36a and the second optically-anisotropic layer 36b will be described using FIGS. 2 and 3. The first optically-anisotropic layer 36a and the second optically-anisotropic layer 36b have the same configuration, except that the rotation directions of the optical axes in the liquid crystal alignment patterns are opposite to each other. Therefore, in a case where the first optically-anisotropic layer 36a and the second optically-anisotropic layer 36b do not need to be distinguished from each other, the first optically-anisotropic layer 36a and the second optically-anisotropic layer 36b will be collectively referred to as the optically-anisotropic layer 36.

Figure 2:
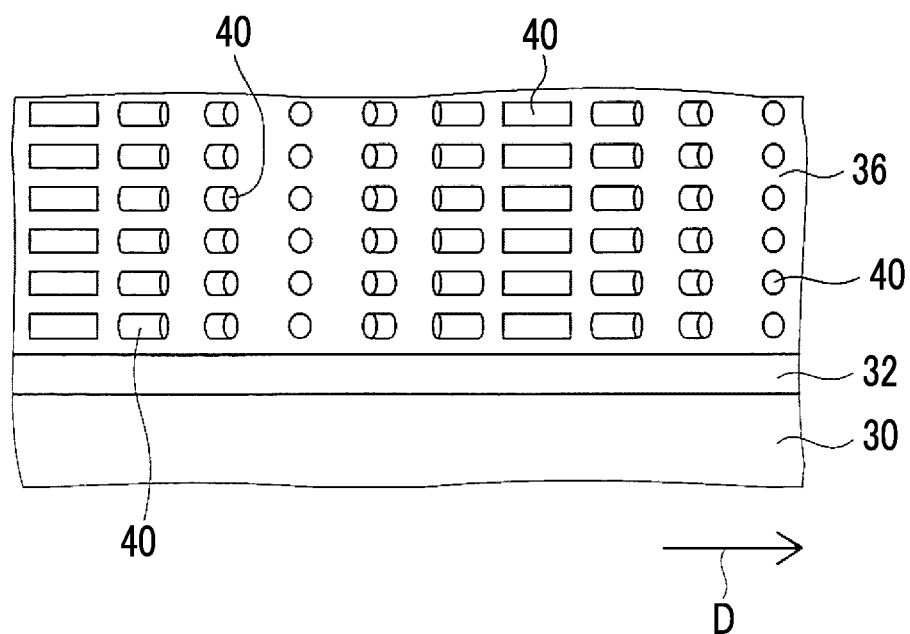
FIG. 2 is a diagram conceptually showing an optically-anisotropic layer in the transmissive liquid crystal diffraction element shown in FIG. 1.
Figure 3:
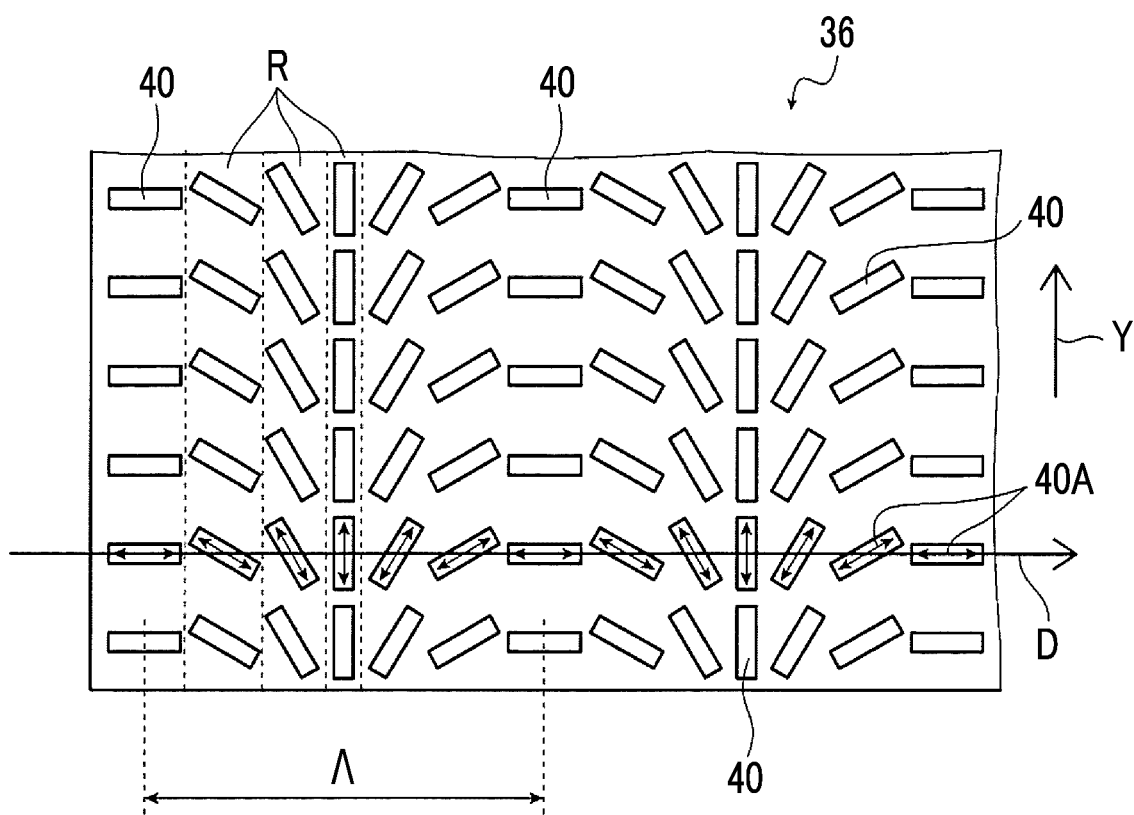
FIG. 3 is a front view showing the optically-anisotropic layer shown in FIG. 2.

In the example shown in FIGS. 2 and 3, the optically-anisotropic layer is formed by immobilizing a liquid crystal phase where a liquid crystal compound is aligned and has a liquid crystal alignment pattern in which a direction of an optical axis derived from the liquid crystal compound changes while continuously rotating in at least one in-plane direction. In the optically-anisotropic layer in the example shown in FIGS. 2 and 3, the rotation direction of the optical axis in the liquid crystal alignment pattern is the same as the first optically-anisotropic layer 36a in FIG. 1.

In the example shown in FIG. 2, the optically-anisotropic layer 36 is laminated on an alignment film 32 that is laminated on a support 30.

In a case where the first optically-anisotropic layer and the second optically-anisotropic layer are laminated as transmissive liquid crystal diffraction elements, As in the example shown in FIG. 2, the optically-anisotropic layers may be laminated in a state where they are laminated on the support 30 and the alignment film 32. Alternatively, the optically-anisotropic layers may be laminated, for example, in a state where only the alignment film 32 and the optically-anisotropic layers are laminated after peeling off the support 30. Alternatively, the optically-anisotropic layers may be laminated, for example, in a state where only the optically-anisotropic layers are laminated after peeling off the support 30 and the alignment film 32.

<Support>

The support 30 supports the alignment film 32 and the optically-anisotropic layer 36.

As the support 30, various sheet-shaped materials (films or plate-shaped materials) can be used as long as they can support the alignment film 32 and the optically-anisotropic layer 36.

A transmittance of the support 30 with respect to light to be diffracted is preferably 50% or higher, more preferably 70% or higher, and still more preferably 85% or higher.

The thickness of the support 30 is not particularly limited and may be appropriately set depending on the use of the transmissive liquid crystal diffraction element, a material for forming the support 30, and the like in a range where the alignment film 32 and the optically-anisotropic layer 36 can be supported.

The thickness of the support 30 is preferably 1 to 1000 more preferably 3 to 250 and still more preferably 5 to 150

The support 30 may have a monolayer structure or a multi-layer structure.

In a case where the support 30 has a monolayer structure, examples thereof include supports formed of glass, triacetyl cellulose (TAC), polyethylene terephthalate (PET), polycarbonates, polyvinyl chloride, acryl, polyolefin, and the like. In a case where the support 30 has a multi-layer structure, examples thereof include a support including: one of the above-described supports having a monolayer structure that is provided as a substrate; and another layer that is provided on a surface of the substrate.

<Alignment Film>

The alignment film 32 is formed on the surface of the support 30.

The alignment film 32 is an alignment film for aligning the liquid crystal compound 40 to the predetermined liquid crystal alignment pattern during the formation of the optically-anisotropic layer 36.

Although described below, in the present invention, the optically-anisotropic layer 36 has a liquid crystal alignment pattern in which a direction of an optical axis 40A (refer to FIG. 3) derived from the liquid crystal compound 40 changes while continuously rotating in one in-plane direction. Accordingly, the alignment film 32 is formed such that the optically-anisotropic layer 36 can form the liquid crystal alignment pattern.

In the following description, "the direction of the optical axis 40A rotates" will also be simply referred to as "the optical axis 40A rotates".

As the alignment film 32, various well-known films can be used.

Examples of the alignment film include a rubbed film formed of an organic compound such as a polymer, an obliquely deposited film formed of an inorganic compound, a film having a microgroove, and a film formed by lamination of Langmuir-Blodgett (LB) films formed with a Langmuir-Blodgett's method using an organic compound such as ω-tricosanoic acid, dioctadecylmethylammonium chloride, or methyl stearate.

The alignment film 32 formed by a rubbing treatment can be formed by rubbing a surface of a polymer layer with paper or fabric in a given direction multiple times.

As the material used for the alignment film 32, for example, a material for forming polyimide, polyvinyl alcohol, a polymer having a polymerizable group described in JP1997-152509A (JP-H9-152509A), or an alignment film 32 such as JP2005-97377A, JP2005-99228A, and JP2005-128503A is preferable.

In the optically-anisotropic layer, the alignment film 32 can be suitably used as a so-called photo-alignment film obtained by irradiating a photo-alignment material with polarized light or non-polarized light. That is, in the optically-anisotropic layer, a photo-alignment film that is formed by applying a photo-alignment material to the support 30 is suitably used as the alignment film 32.

The irradiation of polarized light can be performed in a direction perpendicular or oblique to the photo-alignment film, and the irradiation of non-polarized light can be performed in a direction oblique to the photo-alignment film.

Preferable examples of the photo-alignment material used in the alignment film that can be used in the present invention include: an azo compound described in JP2006-285197A, JP2007-76839A, JP2007-138138A, JP2007-94071A, JP2007-121721A, JP2007-140465A, JP2007-156439A, JP2007-133184A, JP2009-109831A, JP3883848B, and JP4151746B; an aromatic ester compound described in JP2002-229039A; a maleimide- and/or alkenyl-substituted nadiimide compound having a photo-alignable unit described in JP2002-265541A and JP2002-317013A; a photocrosslinking silane derivative described in JP4205195B and JP4205198B, a photocrosslinking polyimide, a photocrosslinking polyamide, or a photocrosslinking polyester described in JP2003-520878A, JP2004-529220A, and JP4162850B; and a photodimerizable compound, in particular, a cinnamate compound, a chalcone compound, or a coumarin compound described in JP1997-118717A (JP-H9-118717A), JP1998-506420A (JP-H10-506420A), JP2003-505561A, WO2010/150748A, JP2013-177561A, and JP2014-12823A.

Among these, an azo compound, a photocrosslinking polyimide, a photocrosslinking polyamide, a photocrosslinking polyester, a cinnamate compound, or a chalcone compound is suitably used.

The thickness of the alignment film 32 is not particularly limited. The thickness with which a required alignment function can be obtained may be appropriately set depending on the material for forming the alignment film 32.

The thickness of the alignment film 32 is preferably 0.01 to 5 μm and more preferably 0.05 to 2 μm.

A method of forming the alignment film 32 is not limited. Any one of various well-known methods corresponding to a material for forming the alignment film 32 can be used. For example, a method including: applying the alignment film 32 to a surface of the support 30; drying the applied alignment film 32; and exposing the alignment film 32 to laser light to form an alignment pattern can be used.

Figure 4:
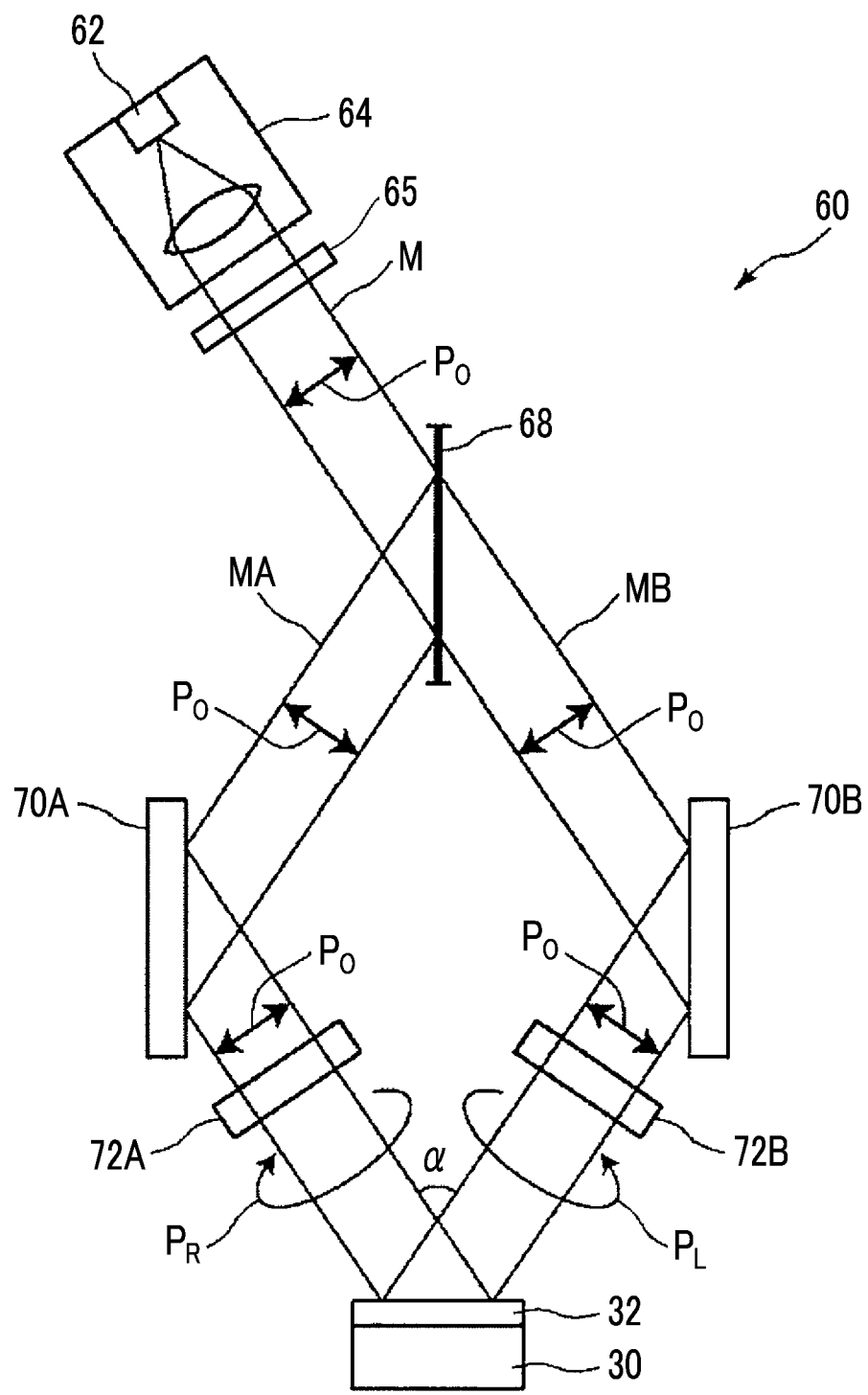
FIG. 4 is a conceptual diagram showing one example of an exposure device that exposes an alignment film of the optically-anisotropic layer shown in FIG. 2.

FIG. 4 conceptually shows an example of an exposure device that exposes the alignment film 32 to form an alignment pattern.

An exposure device 60 shown in FIG. 4 includes: a light source 64 including a laser 62; an λ/2 plate 65 that changes a polarization direction of laser light M emitted from the laser 62; a polarization beam splitter 68 that splits the laser light M emitted from the laser 62 into two beams MA and MB; mirrors 70A and 70B that are disposed on optical paths of the split two beams MA and MB; and λ/4 plates 72A and 72B.

The light source 64 emits linearly polarized light $P_O$. The λ/4 plate 72A converts the linearly polarized light $P_O$ (beam MA) into right circularly polarized light $P_R$, and the λ/4 plate 72B converts the linearly polarized light $P_O$ (beam MB) into left circularly polarized light $P_L$.

The support 30 including the alignment film 32 on which the alignment pattern is not yet formed is disposed at an exposed portion, the two beams MA and MB intersect and interfere with each other on the alignment film 32, and the alignment film 32 is irradiated with and exposed to the interference light.

Due to the interference in this case, the polarization state of light with which the alignment film 32 is irradiated periodically changes according to interference fringes. As a result, an alignment film (hereinafter, also referred to as "patterned alignment film") having an alignment pattern in which the alignment state changes periodically is obtained.

In the exposure device 60, by changing an intersecting angle α between the two beams MA and MB, the period of the alignment pattern can be adjusted. That is, by adjusting the intersecting angle α in the exposure device 60, in the alignment pattern in which the optical axis 40A derived from the liquid crystal compound 40 continuously rotates in the one in-plane direction, the length of the single period over which the optical axis 40A rotates by 180° in the one in-plane direction in which the optical axis 40A rotates can be adjusted.

By forming the optically-anisotropic layer on the alignment film 32 having the alignment pattern in which the alignment state periodically changes, as described below, the optically-anisotropic layer 36 having the liquid crystal alignment pattern in which the optical axis 40A derived from the liquid crystal compound 40 continuously rotates in the one in-plane direction can be formed.

In addition, by rotating the optical axes of the λ/4 plates 72A and 72B by 90°, respectively, the rotation direction of the optical axis 40A can be reversed.

As described above, the patterned alignment film has an alignment pattern to obtain the liquid crystal alignment pattern in which the liquid crystal compound is aligned such that the direction of the optical axis of the liquid crystal compound in the optically-anisotropic layer formed on the patterned alignment film changes while continuously rotating in at least one in-plane direction. In a case where an axis in the direction in which the liquid crystal compound is aligned is an alignment axis, it can be said that the patterned alignment film has an alignment pattern in which the direction of the alignment axis changes while continuously rotating in at least one in-plane direction. The alignment axis of the patterned alignment film can be detected by measuring absorption anisotropy. For example, in a case where the amount of light transmitted through the patterned alignment film is measured by irradiating the patterned alignment film with linearly polarized light while rotating the patterned alignment film, it is observed that a direction in which the light amount is the maximum or the minimum gradually changes in the one in-plane direction.

In the present invention, the alignment film 32 is provided as a preferable aspect and is not an essential component.

For example, the following configuration can also be adopted, in which, by forming the alignment pattern on the support 30 using a method of rubbing the support 30, a method of processing the support 30 with laser light or the like, or the like, the optically-anisotropic layer has the liquid crystal alignment pattern in which the direction of the optical axis 40A derived from the liquid crystal compound 40 changes while continuously rotating in at least one in-plane direction. That is, in the present invention, the support 30 may be made to act as the alignment film.

<Optically-Anisotropic Layer>

The optically-anisotropic layer 36 is formed on a surface of the alignment film 32.

As described above, the optically-anisotropic layer 36 is formed by immobilizing a liquid crystal phase where a liquid crystal compound is aligned and has a liquid crystal alignment pattern in which a direction of an optical axis derived from the liquid crystal compound changes while continuously rotating in at least one in-plane direction.

In the optically-anisotropic layer 36, as conceptually shown in FIG. 2, the liquid crystal compound 40 is not helically twisted and rotated in the thickness direction, and the liquid crystal compounds 40 at the same position in a plane direction are aligned such that the directions of the optical axes 40A thereof are directed in the same direction.

<<Method of Forming Optically-Anisotropic Layer>>

The optically-anisotropic layer can be formed by immobilizing a liquid crystal phase in a layer shape, the liquid crystal phase being aligned in a liquid crystal alignment pattern in which a direction of an optical axis derived from the liquid crystal compound changes while continuously rotating in at least one in-plane direction.

The structure in which a liquid crystal phase is immobilized may be a structure in which the alignment of the liquid crystal compound as a liquid crystal phase is immobilized. Typically, the structure in which a liquid crystal phase is immobilized is preferably a structure which is obtained by aligning the polymerizable liquid crystal compound in the liquid crystal alignment pattern, polymerizing and curing the polymerizable liquid crystal compound with ultraviolet irradiation, heating, or the like to form a layer having no fluidity, and concurrently changing the state of the polymerizable liquid crystal compound into a state where the alignment state is not changed by an external field or an external force.

The structure in which a liquid crystal phase is immobilized is not particularly limited as long as the optical characteristics of the liquid crystal phase are maintained, and the liquid crystal compound 40 in the optically-anisotropic layer does not necessarily exhibit liquid crystallinity. For example, the molecular weight of the polymerizable liquid crystal compound may be increased by a curing reaction such that the liquid crystallinity thereof is lost.

Examples of a material used for forming the optically-anisotropic layer obtained by immobilizing a liquid crystal phase include a liquid crystal composition including a liquid crystal compound. It is preferable that the liquid crystal compound is a polymerizable liquid crystal compound.

In addition, the liquid crystal composition used for forming the optically-anisotropic layer may further include a surfactant and a polymerization initiator.

——Polymerizable Liquid Crystal Compound——

The polymerizable liquid crystal compound may be a rod-like liquid crystal compound or a disk-like liquid crystal compound.

Examples of the rod-like polymerizable liquid crystal compound for forming an optically-anisotropic layer include a rod-like nematic liquid crystal compound. As the rod-like nematic liquid crystal compound, an azomethine compound, an azoxy compound, a cyanobiphenyl compound, a cyanophenyl ester compound, a benzoate compound, a phenyl cyclohexanecarboxylate compound, a cyanophenylcyclohexane compound, a cyano-substituted phenylpyrimidine compound, an alkoxy-substituted phenylpyrimidine compound, a phenyldioxane compound, a tolan compound, or an alkenylcyclohexylbenzonitrile compound is preferably used. Not only a low-molecular-weight liquid crystal compound but also a polymer liquid crystal compound can be used.

The polymerizable liquid crystal compound can be obtained by introducing a polymerizable group into the liquid crystal compound. Examples of the polymerizable group include an unsaturated polymerizable group, an epoxy group, and an aziridinyl group. Among these, an unsaturated polymerizable group is preferable, and an ethylenically unsaturated polymerizable group is more preferable. The polymerizable group can be introduced into the molecules of the liquid crystal compound using various methods. The number of polymerizable groups in the polymerizable liquid crystal compound is preferably 1 to 6 and more preferably 1 to 3.

Examples of the polymerizable liquid crystal compound include compounds described in Makromol. Chem. (1989), Vol. 190, p. 2255, Advanced Materials (1993), Vol. 5, p. 107, U.S. Pat. Nos. 4,683,327A, 5,622,648A, 5,770,107A, WO95/22586A, WO95/24455A, WO97/00600A, WO98/23580A, WO98/52905A, JP1989-272551A (JP-H1-272551A), JP1994-16616A (JP-H6-16616A), JP1995-110469A (JP-H7-110469A), JP1999-80081A (JP-H11-80081A), and JP2001-328973A. Two or more polymerizable liquid crystal compounds may be used in combination. In a case where two or more polymerizable liquid crystal compounds are used in combination, the alignment temperature can be decreased.

In addition, as a polymerizable liquid crystal compound other than the above-described examples, for example, a cyclic organopolysiloxane compound having a cholesteric phase described in JP1982-165480A (JP-S57-165480A) can be used. Further, as the above-described polymer liquid crystal compound, for example, a polymer in which a liquid crystal mesogenic group is introduced into a main chain, a side chain, or both a main chain and a side chain, a polymer cholesteric liquid crystal in which a cholesteryl group is introduced into a side chain, a liquid crystal polymer described in JP1997-133810A (JP-H9-133810A), and a liquid crystal polymer described in JP1999-293252A (JP-H11-293252A) can be used.

——Disk-Like Liquid Crystal Compound——

As the disk-like liquid crystal compound, for example, compounds described in JP2007-108732A and JP2010-244038A can be preferably used.

In addition, the addition amount of the polymerizable liquid crystal compound in the liquid crystal composition is preferably 75 to 99.9 mass %, more preferably 80 to 99 mass %, and still more preferably 85 to 90 mass % with respect to the solid content mass (mass excluding a solvent) of the liquid crystal composition.

——Surfactant——

The liquid crystal composition used for forming the optically-anisotropic layer may include a surfactant.

It is preferable that the surfactant is a compound that can function as an alignment control agent contributing to the stable or rapid alignment of the liquid crystal compound. Examples of the surfactant include a silicone-based surfactant and a fluorine-based surfactant. Among these, a fluorine-based surfactant is preferable.

Specific examples of the surfactant include compounds described in paragraphs "0082" to "0090" of JP2014-119605A, compounds described in paragraphs "0031" to "0034" of JP2012-203237A, exemplary compounds described in paragraphs "0092" and "0093" of JP2005-99248A, exemplary compounds described in paragraphs "0076" to "0078" and paragraphs "0082" to "0085" of JP2002-129162A, and fluorine (meth)acrylate polymers described in paragraphs "0018" to "0043" of JP2007-272185A.

As the surfactant, one kind may be used alone, or two or more kinds may be used in combination.

As the fluorine-based surfactant, a compound described in paragraphs "0082" to "0090" of JP2014-119605A is preferable.

The addition amount of the surfactant in the liquid crystal composition is preferably 0.01 to 10 mass %, more preferably 0.01 to 5 mass %, and still more preferably 0.02 to 1 mass % with respect to the total mass of the liquid crystal compound.

——Polymerization Initiator——

In a case where the liquid crystal composition includes a polymerizable compound, it is preferable that the liquid crystal composition includes a polymerization initiator. In an aspect where a polymerization reaction progresses with ultraviolet irradiation, it is preferable that the polymerization initiator is a photopolymerization initiator which initiates a polymerization reaction with ultraviolet irradiation.

Examples of the photopolymerization initiator include an α-carbonyl compound (described in U.S. Pat. Nos. 2,367,661A and 2,367,670A), an acyloin ether (described in U.S. Pat. No. 2,448,828A), an α-hydrocarbon-substituted aromatic acyloin compound (described in U.S. Pat. No. 2,722,512A), a polynuclear quinone compound (described in U.S. Pat. Nos. 3,046,127A and 2,951,758A), a combination of a triarylimidazole dimer and p-aminophenyl ketone (described in U.S. Pat. No. 3,549,367A), an acridine compound and a phenazine compound (described in JP1985-105667A (JP-S60-105667A) and U.S. Pat. No. 4,239,850A), and an oxadiazole compound (described in U.S. Pat. No. 4,212,970A).

The content of the photopolymerization initiator in the liquid crystal composition is preferably 0.1 to 20 mass % and more preferably 0.5 to 12 mass % with respect to the content of the liquid crystal compound.

——Crosslinking Agent——

In order to improve the film hardness after curing and to improve durability, the liquid crystal composition may optionally include a crosslinking agent. As the crosslinking agent, a curing agent which can perform curing with ultraviolet light, heat, moisture, or the like can be suitably used.

The crosslinking agent is not particularly limited and can be appropriately selected depending on the purpose. Examples of the crosslinking agent include: a polyfunctional acrylate compound such as trimethylol propane tri(meth)acrylate or pentaerythritol tri(meth)acrylate; an epoxy compound such as glycidyl (meth)acrylate or ethylene glycol diglycidyl ether; an aziridine compound such as 2,2-bis hydroxymethyl butanol-tris[3-(1-aziridinyl)propionate] or 4,4-bis(ethyleneiminocarbonylamino)diphenylmethane; an isocyanate compound such as hexamethylene diisocyanate or a biuret type isocyanate; a polyoxazoline compound having an oxazoline group at a side chain thereof; and an alkoxysilane compound such as vinyl trimethoxysilane or N-(2-aminoethyl)-3-aminopropyltrimethoxysilane. In addition, depending on the reactivity of the crosslinking agent, a well-known catalyst can be used, and not only film hardness and durability but also productivity can be improved. Among these crosslinking agents, one kind may be used alone, or two or more kinds may be used in combination.

The content of the crosslinking agent is preferably 3% to 20 mass % and more preferably 5% to 15 mass % with respect to the solid content mass of the liquid crystal composition. In a case where the content of the crosslinking agent is in the above-described range, an effect of improving a crosslinking density can be easily obtained, and the stability of a liquid crystal phase is further improved.

——Other Additives——

Optionally, a polymerization inhibitor, an antioxidant, an ultraviolet absorber, a light stabilizer, a coloring material, metal oxide fine particles, or the like can be added to the liquid crystal composition in a range where optical performance and the like do not deteriorate.

It is preferable that the liquid crystal composition is used as a liquid during the formation of the optically-anisotropic layer.

The liquid crystal composition may include a solvent. The solvent is not particularly limited and can be appropriately selected depending on the purpose. An organic solvent is preferable.

The organic solvent is not particularly limited and can be appropriately selected depending on the purpose. Examples of the organic solvent include a ketone, an alkyl halide, an amide, a sulfoxide, a heterocyclic compound, a hydrocarbon, an ester, and an ether. Among these organic solvents, one kind may be used alone, or two or more kinds may be used in combination. Among these, a ketone is preferable in consideration of an environmental burden.

In a case where the optically-anisotropic layer is formed, it is preferable that the optically-anisotropic layer is formed by applying the liquid crystal composition to a surface where the optically-anisotropic layer is to be formed, aligning the liquid crystal compound to a state the liquid crystal phase aligned in the predetermined liquid crystal alignment pattern, and curing the liquid crystal compound.

That is, in a case where the optically-anisotropic layer is formed on the alignment film 32, it is preferable that the optically-anisotropic layer obtained by immobilizing a liquid crystal phase is formed by applying the liquid crystal composition to the alignment film 32, aligning the liquid crystal compound in the predetermined liquid crystal alignment pattern, and curing the liquid crystal compound.

For the application of the liquid crystal composition, a printing method such as ink jet or scroll printing or a well-known method such as spin coating, bar coating, or spray coating capable of uniformly applying liquid to a sheet-shaped material can be used.

The applied liquid crystal composition is optionally dried and/or heated and then is cured to form the optically-anisotropic layer. In the drying and/or heating step, the liquid crystal compound in the liquid crystal composition only has to be aligned in the predetermined liquid crystal alignment pattern. In the case of heating, the heating temperature is preferably 200° C. or lower and more preferably 130° C. or lower.

The aligned liquid crystal compound is optionally further polymerized. Regarding the polymerization, thermal polymerization or photopolymerization using light irradiation may be performed, and photopolymerization is preferable. Regarding the light irradiation, ultraviolet light is preferably used. The irradiation energy is preferably 20 mJ/cm$^2$ to 50 J/cm$^2$ and more preferably 50 mJ/cm$^2$ to 1500 mJ/cm$^2$. In order to promote a photopolymerization reaction, light irradiation may be performed under heating conditions or in a nitrogen atmosphere. The wavelength of irradiated ultraviolet light is preferably 250 to 430 nm.

An activation treatment may be further performed on the polymerized liquid crystal composition to laminate and align the liquid crystal layer. As the activation treatment, a corona treatment or a plasma treatment can be adopted. As a result, the wettability of the surface state before applying the liquid crystal can be improved, and an effect of improving the aligning properties of horizontal alignment of liquid crystal molecules can be obtained. In the corona treatment, the discharge amount is preferably 10 to 500 W/m²/min. As a manufacturing device, a device described in WO14/054437A can be suitably used. For example, a discharge type in air at normal pressure by a corona treater (manufactured by Kasuga Denki, Inc.) can be used. As the plasma treatment, for example, a discharge type in air at normal pressure or in an inert gas atmosphere such as nitrogen or argon by a plasma treater (manufactured by Sekisui Chemical Co., Ltd.) can be used.

The thickness of the optically-anisotropic layer is not particularly limited, and the thickness with which a required light reflectivity can be obtained may be appropriately set depending on the use of the optically-anisotropic layer, the light reflectivity required for the optically-anisotropic layer, the material for forming the optically-anisotropic layer, and the like.

<<Liquid Crystal Alignment Pattern of Optically-Anisotropic Layer>>

As described above, the optically-anisotropic layer has the liquid crystal alignment pattern in which the direction of the optical axis 40A derived from the liquid crystal compound 40 changes while continuously rotating in the one in-plane direction in a plane of the optically-anisotropic layer.

The optical axis 40A derived from the liquid crystal compound 40 is an axis having the highest refractive index in the liquid crystal compound 40, that is, a so-called slow axis. For example, in a case where the liquid crystal compound 40 is a rod-like liquid crystal compound, the optical axis 40A is along a rod-like major axis direction. In the following description, the optical axis 40A derived from the liquid crystal compound 40 will also be referred to as "the optical axis 40A of the liquid crystal compound 40" or "the optical axis 40A".

FIG. 3 conceptually shows a plan view of the optically-anisotropic layer 36.

The plan view is a view in a case where the optically-anisotropic layer is seen from the top in FIG. 2, that is, a view in a case where the optically-anisotropic layer is seen from a thickness direction (laminating direction of the respective layers (films)).

In addition, in FIG. 3, in order to easily understand the configuration of the optically-anisotropic layer (optically-anisotropic layer 36), only the liquid crystal compound 40 on the surface of the alignment film 32 is shown.

As shown in FIG. 3, on the surface of the alignment film 32, the liquid crystal compound 40 forming the optically-anisotropic layer 36 has the liquid crystal alignment pattern in which the direction of the optical axis 40A changes while continuously rotating in the predetermined one in-plane direction indicated by arrow D (hereinafter, referred to as the arrangement axis D) in a plane of the optically-anisotropic layer according to the alignment pattern formed on the alignment film 32 as the lower layer. In the example shown in the drawing, the liquid crystal compound 40 has the liquid crystal alignment pattern in which the optical axis 40A of the liquid crystal compound 40 changes while continuously rotating clockwise in the arrangement axis D direction.

The liquid crystal compound 40 forming the optically-anisotropic layer 36 is two-dimensionally arranged in a direction perpendicular to the arrangement axis D and the one in-plane direction (arrangement axis D direction).

In the following description, the direction perpendicular to the arrangement axis D direction will be referred to as "Y direction" for convenience of description. That is, the arrow Y direction is a direction perpendicular to the one in-plane direction in which the direction of the optical axis 40A of the liquid crystal compound 40 changes while continuously rotating in a plane of the optically-anisotropic layer. Accordingly, in FIGS. 1 and 2 and FIGS. 5 and 6 described below, the Y direction is a direction perpendicular to the paper plane.

Specifically, "the direction of the optical axis 40A of the liquid crystal compound 40 changes while continuously rotating in the arrangement axis D direction (the predetermined one in-plane direction)" represents that an angle between the optical axis 40A of the liquid crystal compound 40, which is arranged in the arrangement axis D direction, and the arrangement axis D direction varies depending on positions in the arrangement axis D direction, and the angle between the optical axis 40A and the arrangement axis D direction sequentially changes from θ to θ+180° or θ−180° in the arrangement axis D direction.

A difference between the angles of the optical axes 40A of the liquid crystal compounds 40 adjacent to each other in the arrangement axis D direction is preferably 45° or less, more preferably 15° or less, and still more preferably less than 15°.

In addition, in the present invention, the liquid crystal compound rotates in the direction in which an angle between the optical axes 40A of the liquid crystal compounds 40 adjacent to each other in the arrangement axis D direction decreases. Accordingly, in the optically-anisotropic layer shown in FIGS. 2 and 3, the optical axis 40A of the liquid crystal compound 40 rotates to the right (clockwise) in the direction indicated by the arrow of the arrangement axis D.

On the other hand, in the liquid crystal compound 40 forming the optically-anisotropic layer 36, the directions of the optical axes 40A are the same in the Y direction perpendicular to the arrangement axis D direction, that is, the Y direction perpendicular to the one in-plane direction in which the optical axis 40A continuously rotates.

In other words, in the liquid crystal compound 40 forming the optically-anisotropic layer 36, angles between the optical axes 40A of the liquid crystal compound 40 and the arrangement axis D direction are the same in the Y direction.

In the liquid crystal compounds 40 arranged in the Y direction in the optically-anisotropic layer 36, the angles between the optical axes 40A and the arrangement axis D direction (the one in-plane direction in which the direction of the optical axis of the liquid crystal compound 40 rotates) are the same. Regions where the liquid crystal compounds 40 in which the angles between the optical axes 40A and the arrangement axis D direction are the same are disposed in the Y direction will be referred to as "regions R".

In this case, it is preferable that an in-plane retardation (Re) value of each of the regions R is substantially a half wavelength, that is, λ/2. This condition is for converting right circularly polarized light into left circularly polarized light and converting left circularly polarized light into right circularly polarized light. The in-plane retardation is calculated from the product of a difference Δn in refractive index generated by refractive index anisotropy of the region R and the thickness of the optically-anisotropic layer. Here, the difference in refractive index generated by refractive index anisotropy of the region R in the optically-anisotropic layer is defined by a difference between a refractive index of a direction of an in-plane slow axis of the region R and a refractive index of a direction perpendicular to the direction of the slow axis. That is, the difference Δn in refractive index generated by refractive index anisotropy of the region R is the same as a difference between a refractive index of the liquid crystal compound 40 in the direction of the optical axis 40A and a refractive index of the liquid crystal compound 40 in a direction perpendicular to the optical axis 40A in a plane of the region R. That is, the difference Δn in refractive index is the same as the difference in refractive index of the liquid crystal compound 40.

In the optically-anisotropic layer 36, in the liquid crystal alignment pattern of the liquid crystal compound 40, the length (distance) over which the optical axis 40A of the liquid crystal compound 40 rotates by 180° in the arrangement axis D direction in which the optical axis 40A changes while continuously rotating in a plane is the length A of the single period in the liquid crystal alignment pattern.

That is, a distance between centers of two liquid crystal compounds 40 in the arrangement axis D direction is the length A of the single period, the two liquid crystal compounds having the same angle in the arrangement axis D direction. Specifically, as shown in FIG. 3, a distance between centers in the arrangement axis D direction of two liquid crystal compounds 40 in which the arrangement axis D direction and the direction of the optical axis 40A match each other is the length A of the single period. In the following description, the length A of the single period will also be referred to as "single period A".

In the liquid crystal alignment pattern of the optically-anisotropic layer 36, the single period A is repeated in the arrangement axis D direction, that is, in the one in-plane direction in which the direction of the optical axis 40A changes while continuously rotating.

In a case where circularly polarized light is incident into the above-described optically-anisotropic layer 36, the light is refracted such that the direction of the circularly polarized light is converted.

Figure 5:
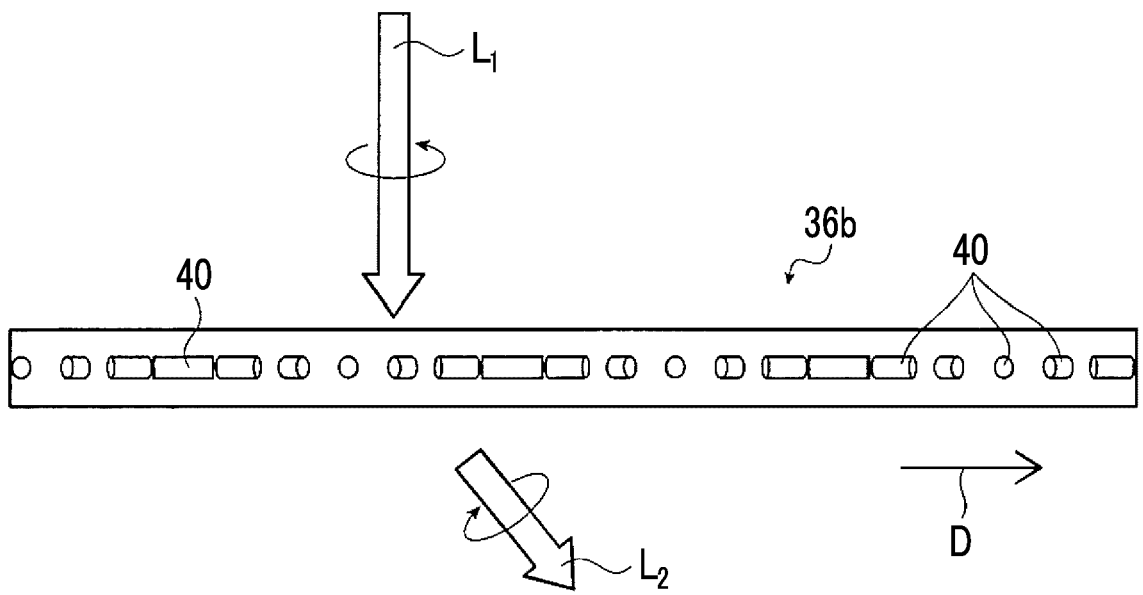
FIG. 5 is a conceptual diagram showing an action of the optically-anisotropic layer.
Figure 6:
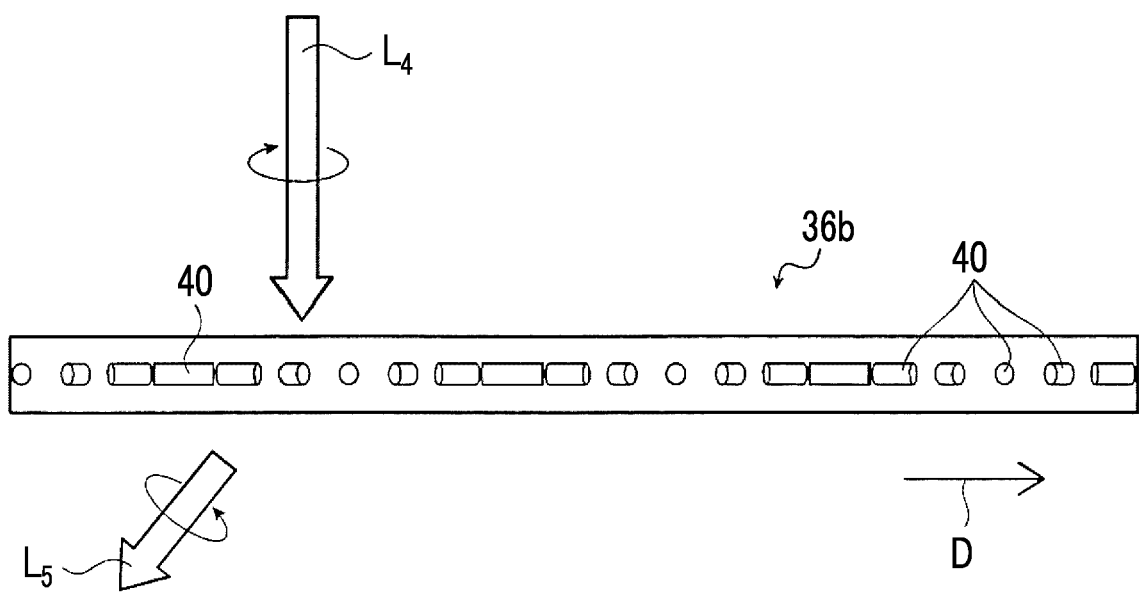
FIG. 6 is a conceptual diagram showing the action of the optically-anisotropic layer.

This action is conceptually shown in FIGS. 5 and 6. In the optically-anisotropic layer 36, the value of the product of the difference in refractive index of the liquid crystal compound and the thickness of the optically-anisotropic layer is λ/2.

As shown in FIG. 5, in a case where the value of the product of the difference in refractive index of the liquid crystal compound and the thickness of the optically-anisotropic layer in the optically-anisotropic layer 36 is λ/2 and incidence light $L_1$ as left circularly polarized light is incident into the optically-anisotropic layer 36, the incidence light $L_1$ transmits through the optically-anisotropic layer 36 to be imparted with a retardation of 180°, and the transmitted light $L_2$ is converted into right circularly polarized light.

In addition, the liquid crystal alignment pattern formed in the optically-anisotropic layer 36 is a pattern that is periodic in the arrangement axis D direction. Therefore, the transmitted light $L_2$ travels in a direction different from a traveling direction of the incidence light $L_1$. This way, the incidence light $L_1$ of the left circularly polarized light is converted into the transmitted light $L_2$ of right circularly polarized light that is tilted by a predetermined angle in the arrangement axis D direction with respect to an incidence direction. In the example shown in FIG. 5, the transmitted light $L_2$ is diffracted to travel in the lower right direction.

On the other hand, as shown in FIG. 6, in a case where the value of the product of the difference in refractive index of the liquid crystal compound and the thickness of the optically-anisotropic layer in the optically-anisotropic layer 36 is λ/2 and incidence light $L_4$ as right circularly polarized light is incident into the optically-anisotropic layer 36, the incidence light $L_4$ transmits through the optically-anisotropic layer 36 to be imparted with a retardation of 180° and is converted into transmitted light $L_5$ of left circularly polarized light.

In addition, the liquid crystal alignment pattern formed in the optically-anisotropic layer 36 is a pattern that is periodic in the arrangement axis D direction. Therefore, the transmitted light $L_5$ travels in a direction different from a traveling direction of the incidence light $L_4$. In this case, the transmitted Light $L_5$ travels in a direction different from the transmitted light $L_2$, that is, in a direction opposite to the arrow direction of the arrangement axis D with respect to the incidence direction. This way, the incidence light $L_4$ is converted into the transmitted light $L_5$ of left circularly polarized light that is tilted by a predetermined angle in a direction opposite to the arrangement axis D direction with respect to an incidence direction. In the example shown in FIG. 6, the transmitted light $L_5$ is diffracted to travel in the lower left direction.

Here, refraction angles of the transmitted light components $L_2$ and $L_5$ can be adjusted depending on the length of the single period A of the liquid crystal alignment pattern formed in the optically-anisotropic layer 36. Specifically, even in the optically-anisotropic layer 36, as the single period A of the liquid crystal alignment pattern decreases, light components transmitted through the liquid crystal compounds 40 adjacent to each other more strongly interfere with each other. Therefore, the transmitted light components $L_2$ and $L_5$ can be more largely refracted.

In addition, by reversing the rotation direction of the optical axis 40A of the liquid crystal compound 40 that rotates in the arrangement axis D direction, the refraction direction of transmitted light can be reversed. That is, in the example FIGS. 5 and 6, the rotation direction of the optical axis 40A toward the arrangement axis D direction is clockwise. By setting this rotation direction to be counterclockwise, the refraction direction of transmitted light can be reversed. Specifically, in FIGS. 5 and 6, in a case where the rotation direction of the optical axis 40A toward the arrangement axis D direction is counterclockwise, left circularly polarized light incident into the optically-anisotropic layer 36 from the upper side in the drawing transmits through the optically-anisotropic layer 36 such that the transmitted light is converted into right circularly polarized light and is diffracted to travel in the lower left direction in the drawing. In addition, right circularly polarized light incident into the optically-anisotropic layer 36 from the upper side in the drawing transmits through the optically-anisotropic layer 36 such that the transmitted light is converted into left circularly polarized light and is diffracted to travel in the lower right direction in the drawing.

(Action of Transmissive Liquid Crystal Diffraction Element)

Figure 7:
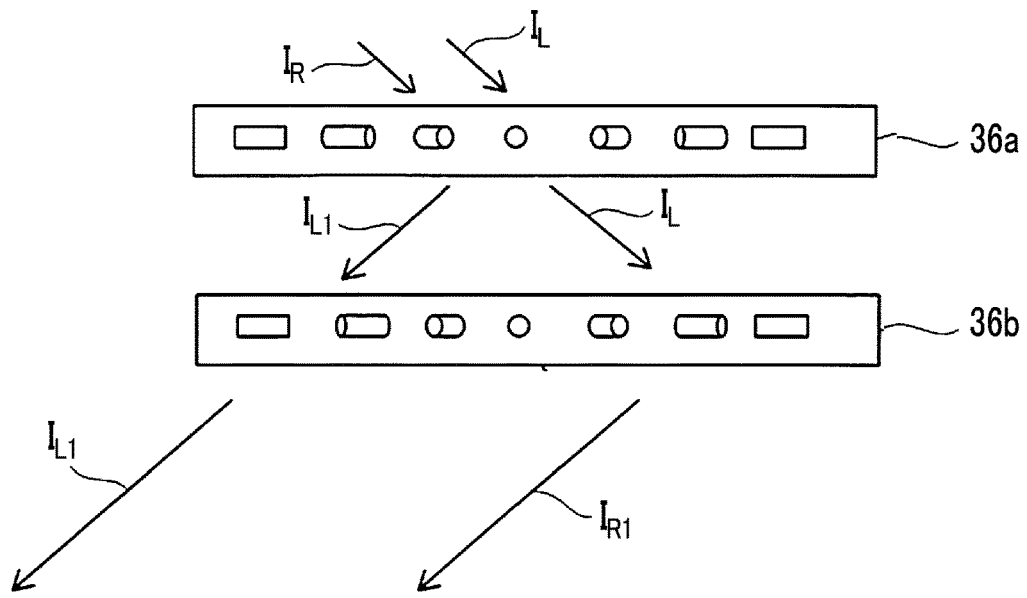
FIG. 7 is a conceptual diagram showing an action of the transmissive liquid crystal diffraction element shown in FIG. 1.

Next, an action of the transmissive liquid crystal diffraction element according to the embodiment of the present invention having a configuration in which two optically-anisotropic layers having the liquid crystal alignment pattern are laminated will be described using FIG. 7. In FIG. 7, for convenience of description, the first optically-anisotropic layer 36a and the second optically-anisotropic layer 36b are spaced from each other.

As described above, in the transmissive liquid crystal diffraction element according to the embodiment of the present invention, the first optically-anisotropic layer and the second optically-anisotropic layer having the liquid crystal alignment pattern are laminated, and the rotation directions of the optical axes in the liquid crystal alignment patterns of the optically-anisotropic layers are opposite to each other. In FIG. 7, the rotation direction of the optical axis in the liquid crystal alignment pattern of the first optically-anisotropic layer 36a is clockwise (right-handed), and the rotation direction of the optical axis in the liquid crystal alignment pattern of the second optically-anisotropic layer 36b is counterclockwise (left-handed).

In addition, the direction of the arrangement axis D in the liquid crystal alignment pattern of the first optically-anisotropic layer 36a and the direction of the arrangement axis D in the liquid crystal alignment pattern of the second optically-anisotropic layer 36b match with each other. In the example shown in FIG. 7, the direction of the arrangement axis D is the left direction in the drawing.

In addition, the length of the single period A in the liquid crystal alignment pattern of the first optically-anisotropic layer 36a and the length of the single period A in the liquid crystal alignment pattern of the second optically-anisotropic layer 36b are the same.

A case where right circularly polarized light $I_R$ and left circularly polarized light $I_L$ are incident into the transmissive liquid crystal diffraction element having the above-described configuration from the first optically-anisotropic layer 36a side will be described as an example.

As shown in FIG. 7, the right circularly polarized light $I_R$ and the left circularly polarized light $I_L$ are incident into the main surface of the first optically-anisotropic layer 36a from an oblique direction. In the example shown in the drawing, the right circularly polarized light $I_R$ and the left circularly polarized light $I_L$ are incident into the first optically-anisotropic layer 36a at the same incidence angle to travel along the arrangement axis D from the upper left direction to the lower right direction in FIG. 7.

As described above, the optically-anisotropic layer diffracts the right circularly polarized light $I_R$ and the left circularly polarized light $I_L$ along the arrangement axis D in opposite directions. In the example shown in FIG. 7, the first optically-anisotropic layer 36a diffracts the incident right circularly polarized light $I_R$ in a direction in which the light travels along the arrangement axis D in the lower left direction in FIG. 7 with respect to the traveling direction of the incident right circularly polarized light $I_R$. In addition, as described above, the diffracted light is converted into left circularly polarized light $I_{L1}$.

On the other hand, the first optically-anisotropic layer 36a diffracts the incident left circularly polarized light $I_L$ to travel along the arrangement axis D in the right direction in FIG. 7 with respect to the traveling direction of the incident left circularly polarized light $I_L$. However, due to the angle dependence of the diffraction efficiency by the optically-anisotropic layer, the diffraction efficiency during the diffraction in this direction decreases. Therefore, the incident left circularly polarized light $I_L$ transmits through the first optically-anisotropic layer 36a as it is in the lower right direction in the drawing substantially without being diffracted.

The left circularly polarized light $I_{L1}$ and the left circularly polarized light $I_L$ transmitted through the first optically-anisotropic layer 36a are incident into the second optically-anisotropic layer 36b. As described above, in the second optically-anisotropic layer 36b, the rotation direction of the optical axis in the liquid crystal alignment pattern is opposite to that of the first optically-anisotropic layer 36a. Therefore, the second optically-anisotropic layer 36b diffracts the incident circularly polarized light in a direction opposite to that of the first optically-anisotropic layer 36a. That is, the left circularly polarized light is diffracted along the arrangement axis D in the left direction.

As shown in FIG. 7, the left circularly polarized light IL1 is incident from the upper right direction to the lower left direction with respect to the second optically-anisotropic layer 36b. Here, the second optically-anisotropic layer 36b diffracts the incident left circularly polarized light IL1 along the arrangement axis D in the left direction in FIG. 7 with respect to the traveling direction of the incident left circularly polarized light $I_{L1}$. However, due to the angle dependence of the diffraction efficiency by the optically-anisotropic layer, the diffraction efficiency during the diffraction in this direction decreases. Therefore, the incident left circularly polarized light $I_L$ transmits through the second optically-anisotropic layer 36b as it is in the lower left direction in the drawing substantially without being diffracted.

On the other hand, the second optically-anisotropic layer 36b diffracts the left circularly polarized light $I_L$ that travels from the upper left direction to the lower right direction in a direction in which the light travels along the arrangement axis D in the lower left direction in FIG. 7 with respect to the traveling direction of the incident left circularly polarized light $I_L$. In addition, as described above, the diffracted light is converted into right circularly polarized light $I_{R1}$.

Accordingly, as shown in FIG. 7, the right circularly polarized light $I_R$ and the left circularly polarized light $I_L$ incident into the first optically-anisotropic layer 36a and the second optically-anisotropic layer 36b in an oblique direction are converted into the left circularly polarized light $I_{L1}$ and the right circularly polarized light $I_{R1}$ and are diffracted in the same direction to be emitted.

As described above, in a polarization diffraction element formed of a liquid crystal compound, a direction in which light is bent varies depending on polarized light. Therefore, left circularly polarized light and right circularly polarized light incident into a polarization diffraction element in the related art are bent in opposite directions and separated, and thus cannot be diffracted in a predetermined direction irrespective of polarized light.

On the other hand, in the transmissive liquid crystal diffraction element according to the embodiment of the present invention, as described above, left circularly polarized light and right circularly polarized light incident from an oblique direction can be diffracted in the same direction and emitted.

Here, in order to exhibit the action of diffracting right circularly polarized light and left circularly polarized light incident from an oblique direction in the same direction, an incidence angle of light into the transmissive liquid crystal diffraction element is preferably 10° to 80°, more preferably 20° to 70°, and still more preferably 40° to 50°.

In addition, in order to exhibit the action of diffracting right circularly polarized light and left circularly polarized light incident from an oblique direction in the same direction, a diffraction angle by each of the first optically-anisotropic layer 36a and the second optically-anisotropic layer 36b is preferably 50° to 130°, more preferably 60° to 120°, and still more preferably 70° to 110°. Here, the diffraction angle refers to an angle between incidence light and diffracted light.

In a case where the length of the single period of the liquid crystal alignment pattern in the first optically-anisotropic layer 36a is represented by $\Lambda_1$ and the length of the single period of the liquid crystal alignment pattern in the second optically-anisotropic layer 36b is represented by $\Lambda_2$, $\Lambda_1$ and $\Lambda_2$ may be appropriately set depending on the desired diffraction angle and the like. A ratio between $\Lambda_1$ and $\Lambda_2$ is preferably about 0.2 to 5. In a case where it is desired to match an angle between diffracted light and a diffraction grating surface to an incidence angle, the ratio between $\Lambda_1$ and $\Lambda_2$ may be set to 1.

In addition, in order to exhibit the effect of the present invention and to diffract incidence light at a large angle such that zero-order light and first-order light are separated with an angle to utilize a difference in diffraction efficiency, it is preferable that an angle difference between zero-order light and first-order light is large. Here, "zero-order light" refers to light that is not diffracted by a diffraction grating such that the direction does not change, and "first-order light" refers to light obtained by diffracting incidence light with a diffraction grating in a direction of a +1 order or −1 order diffraction condition such that the direction is changed. On the other hand, in a case where the angle difference between zero-order light and first-order light is excessively large, the diffraction condition deviates from first-order light. $\lambda/\Lambda$ which is a ratio of a wavelength $\lambda$ corresponding to a diffraction angle of light to a pitch $\Lambda$ of the liquid crystal pattern is preferably in a range of 0.1 to 1.9, more preferably in a range of 0.2 to 1.8, and still more preferably in a range of 0.3 to 1.7.

In addition, the transmissive liquid crystal diffraction element is not limited to the configuration consisting of only the first optically-anisotropic layer 36a and the second optically-anisotropic layer 36b. As described above, the first optically-anisotropic layer 36a and/or the second optically-anisotropic layer 36b in the transmissive liquid crystal diffraction element may be laminated on the support 30 and the alignment film 32, or may be laminated on the alignment film 32.

Here, in a case where an incidence angle and an emission angle of light with respect to the transmissive liquid crystal diffraction element 10 are the same, as in the example illustrated in FIG. 2, it is preferable that each of the first optically-anisotropic layer 36a and the second optically-anisotropic layer 36b has a structure where the optical axes of the liquid crystal compounds 40 laminated in the thickness direction are directed in the same direction. In other words, it is preferable that the optical axes of the liquid crystal compounds 40 present at the same position in a plane direction are directed in the same direction. That is, it is preferable that, in each of the first optically-anisotropic layer 36a and the second optically-anisotropic layer 36b, the liquid crystal compound 40 is twisted and aligned in the thickness direction. In a case where an incidence angle and an emission angle of light with respect to the transmissive liquid crystal diffraction element 10 are the same, the diffraction efficiency can be improved by adopting the configuration where the liquid crystal compound 40 in each of the first optically-anisotropic layer 36a and the second optically-anisotropic layer 36b is twisted and aligned.

Figure 8:
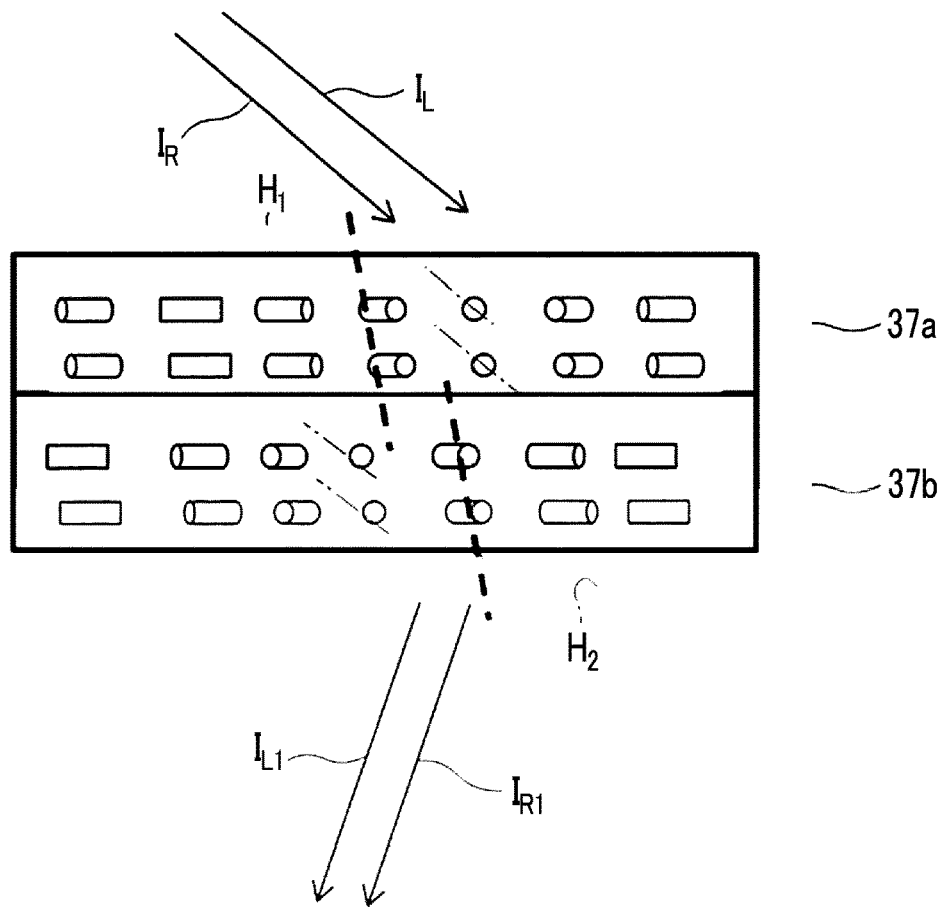
FIG. 8 is a diagram conceptually showing another example of the transmissive liquid crystal diffraction element according to the present invention.

In a case where an incidence angle and an emission angle of light with respect to the transmissive liquid crystal diffraction element 10 are different from each other, as in the example illustrated in FIG. 8, it is preferable that, in each of a first optically-anisotropic layer 37a and a second optically-anisotropic layer 37b, a liquid crystal compound is twisted and aligned in a thickness direction. In the twisted alignment of the first optically-anisotropic layer 37a and the second optically-anisotropic layer 37b, a twisted angle in the thickness direction is less than 360°. That is, the liquid crystal compound is twisted and aligned to the degree to which it is not cholesterically aligned.

In addition, a twisted direction of the liquid crystal compound 40 in the first optically-anisotropic layer 37a and a twisted direction of the liquid crystal compound 40 in the second optically-anisotropic layer 37b are opposite to each other. In the example shown in FIG. 8, in the first optically-anisotropic layer 37a, the liquid crystal compound 40 is twisted clockwise from the upper side to the lower side in the drawing. On the other hand, in the second optically-anisotropic layer 37b, the liquid crystal compound 40 is twisted counterclockwise from the upper side to the lower side in the drawing.

In addition, as in the example of FIG. 1, a rotation direction of the optical axis in the liquid crystal alignment pattern of the first optically-anisotropic layer 37a and a rotation direction of the optical axis in the liquid crystal alignment pattern of the second optically-anisotropic layer 37b are opposite to each other. The first optically-anisotropic layer 37a and the second optically-anisotropic layer 37b have the same configuration, except that the rotation directions of the optical axes in the liquid crystal alignment patterns are opposite to each other and the twisted directions of the liquid crystal compounds that are twisted and aligned in the thickness direction are opposite to each other. Therefore, in a case where the first optically-anisotropic layer 37a and the second optically-anisotropic layer 37b do not need to be distinguished from each other, the first optically-anisotropic layer 37a and the second optically-anisotropic layer 37b will be collectively referred to as the optically-anisotropic layer 37.

Figure 9:
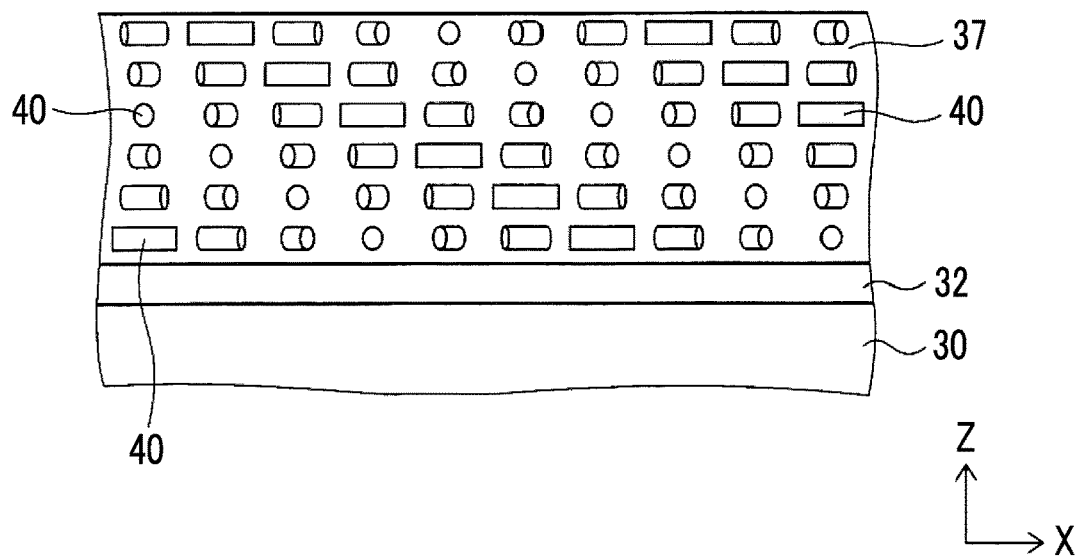
FIG. 9 is a diagram conceptually showing an optically-anisotropic layer in the transmissive liquid crystal diffraction element shown in FIG. 8.

FIG. 9 is a diagram conceptually showing the optically-anisotropic layer 37. The optically-anisotropic layer 37 shown in FIG. 9 has the same configuration as the optically-anisotropic layer 36 shown in FIG. 2, except that the liquid crystal compound is twisted and aligned in the thickness direction. That is, in a case where the optically-anisotropic layer 37 shown in FIG. 9 is seen from the thickness direction, as in the example shown in FIG. 3, the optically-anisotropic layer 37 has a liquid crystal alignment pattern in which the direction of the optical axis 40A changes while continuously rotating along the arrangement axis D in a plane.

The optically-anisotropic layer 37 shown in FIG. 9 has a twisted structure in which the liquid crystal compound 40 is turned and laminated in the thickness direction, and a total rotation angle between the liquid crystal compound 40 present on one main surface side of the optically-anisotropic layer 37 and the liquid crystal compound 40 present on another main surface side of the optically-anisotropic layer 37 is less than 360°.

This way, in a case where the optically-anisotropic layer 37 has the liquid crystal alignment pattern where the direction of the optical axis 40A changes while continuously rotating along the arrangement axis D in a plane and has the structure where liquid crystal compound 40 is twisted in the thickness direction, in a cross-section parallel to the arrangement axis D, line segments (in FIG. 8, the line segments indicated by $H_1$ and $H_2$) that connect the liquid crystal compounds 40 directed in the same direction in the thickness direction are tilted with respect to the main surface of the optically-anisotropic layer 37. By adjusting an incidence angle and an emission angle of light with respect to the line segments $H_1$ and $H_2$, in a case where an incidence angle and an emission angle of light with respect to the transmissive liquid crystal diffraction element 10 are different, the diffraction efficiency can be improved. Specifically, it is preferable that the line segments $H_1$ and $H_2$ are parallel, and it is preferable that an incidence angle and an emission angle of light are about intermediate angles with respect to the line segments $H_1$ and $H_2$.

Here, from the viewpoint of the diffraction efficiency, it is preferable that the line segments $H_1$ and $H_2$ are parallel. Accordingly, it is preferable that the twisted direction of the liquid crystal compound 40 in the first optically-anisotropic layer 37a and the twisted direction of the liquid crystal compound 40 in the second optically-anisotropic layer 37b are opposite to each other and the twisted angles are the same.

This way, in order for the optically-anisotropic layer to have the configuration where the liquid crystal compound is twisted and aligned in the thickness direction, the liquid crystal composition for forming the optically-anisotropic layer may contain a chiral agent.

——Chiral Agent (Optically Active Compound)——

The chiral agent (optically active compound) has a function of inducing a helical structure of a liquid crystal phase. The chiral agent may be selected depending on the purposes because a helical twisted direction and a helical twisting power (HTP) to be induced vary depending on compounds.

The chiral agent is not particularly limited, and a well-known compound (for example, Liquid Crystal Device Handbook (No. 142 Committee of Japan Society for the Promotion of Science, 1989), Chapter 3, Article 4-3, chiral agent for twisted nematic (TN) or super twisted nematic (STN), p. 199), isosorbide, or an isomannide derivative can be used.

In general, the chiral agent includes an asymmetric carbon atom. However, an axially asymmetric compound or a planar asymmetric compound not having an asymmetric carbon atom can also be used as the chiral agent. Examples of the axially asymmetric compound or the planar asymmetric compound include binaphthyl, helicene, paracyclophane, and derivatives thereof. The chiral agent may include a polymerizable group. In a case where both the chiral agent and the liquid crystal compound have a polymerizable group, a polymer which includes a repeating unit derived from the polymerizable liquid crystal compound and a repeating unit derived from the chiral agent can be formed due to a polymerization reaction of a polymerizable chiral agent and the polymerizable liquid crystal compound. In this aspect, it is preferable that the polymerizable group included in the polymerizable chiral agent is the same as the polymerizable group included in the polymerizable liquid crystal compound. Accordingly, the polymerizable group of the chiral agent is preferably an unsaturated polymerizable group, an epoxy group, or an aziridinyl group, more preferably an unsaturated polymerizable group, and still more preferably an ethylenically unsaturated polymerizable group.

In addition, the chiral agent may be a liquid crystal compound.

In a case where the chiral agent includes a photoisomerization group, a desired twisted alignment corresponding to a luminescence wavelength can be formed by irradiation of an actinic ray or the like through a photomask after coating and alignment, which is preferable. As the photoisomerization group, an isomerization portion of a photochromic compound, an azo group, an azoxy group, or a cinnamoyl group is preferable. Specific examples of the compound include compounds described in JP2002-80478A, JP2002-80851A, JP2002-179668A, JP2002-179669A, JP2002-179670A, JP2002-179681A, JP2002-179682A, JP2002-338575A, JP2002-338668A, JP2003-313189A, and JP2003-313292A.

The content of the chiral agent in the liquid crystal composition is preferably 0.01% to 200 mol % and more preferably 1% to 30 mol % with respect to the content molar amount of the liquid crystal compound.

Figure 10:
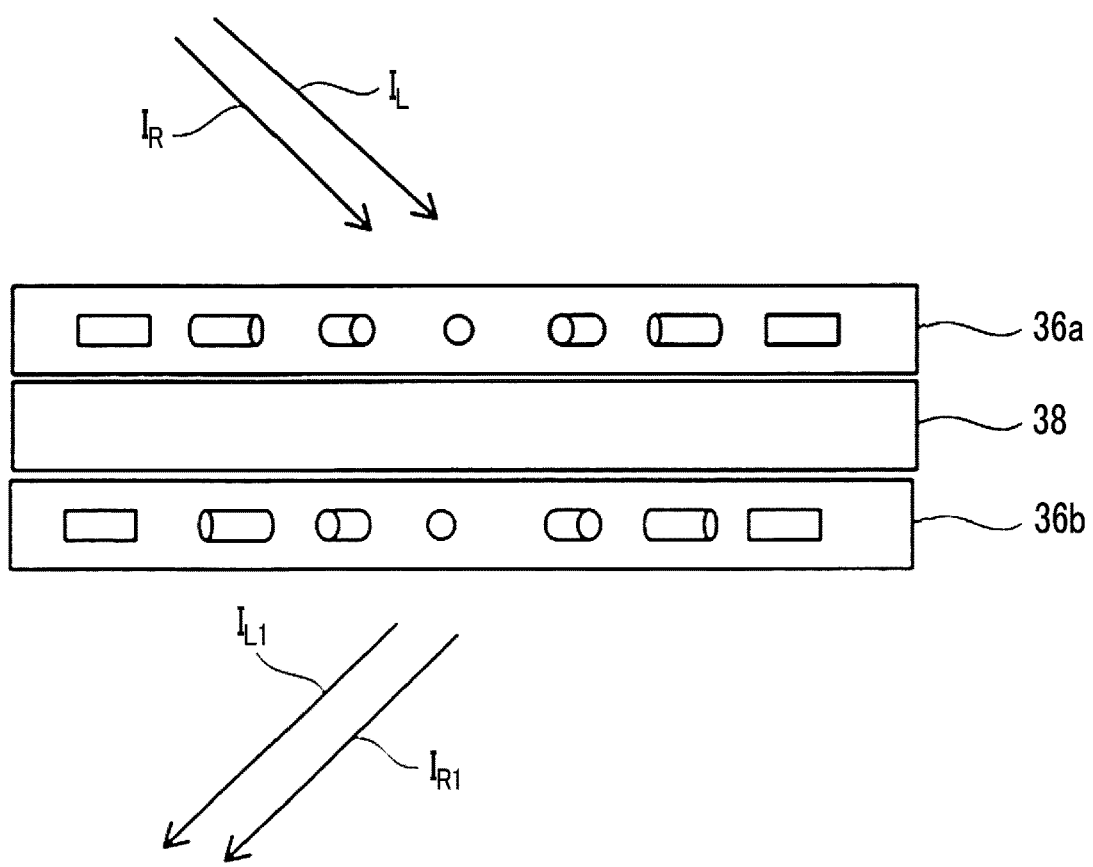
FIG. 10 is a diagram conceptually showing another example of the transmissive liquid crystal diffraction element according to the present invention.

In addition, the transmissive liquid crystal diffraction element may include another layer. For example, as in the example shown in FIG. 10, a retardation layer 38 may be provided between the first optically-anisotropic layer 36a and the second optically-anisotropic layer 36b.

As described above, the optically-anisotropic layer 36 converts incident circularly polarized light into circularly polarized light having an opposite turning direction. However, the circularly polarized light may be converted into elliptically polarized light without being converted into circularly polarized light having a completely opposite direction. In the transmissive liquid crystal diffraction element, in a case where the light converted by the first optically-anisotropic layer 36a is elliptically polarized light, the action of the second optically-anisotropic layer 36b cannot be appropriately obtained, and the diffraction efficiency may decrease.

Therefore, by adopting the configuration in which the retardation layer 38 is provided between the first optically-anisotropic layer 36a and the second optically-anisotropic layer 36b, the elliptically polarized light emitted from the first optically-anisotropic layer 36a can be converted into circularly polarized light by imparting a retardation to the elliptically polarized light. As a result, the action of the second optically-anisotropic layer 36b cannot be appropriately obtained, and the diffraction efficiency can be increased.

Even in a case where the retardation layer is provided between the first optically-anisotropic layer 36a and the second optically-anisotropic layer 36b, the light only transmits through the inside of the retardation layer 38 without affecting diffraction during the traveling of light between the first optically-anisotropic layer 36a and the second optically-anisotropic layer 36b. Therefore, the same action of diffraction as that of the example shown in FIG. 7 can be obtained.

The retardation layer only has to impart a retardation to the elliptically polarized light emitted from the first optically-anisotropic layer 36a, and only a C-plate and an A-Plate can be appropriately used.

A thickness direction retardation of the retardation layer may be appropriately set depending on the incidence angle of light, the configuration of the first optically-anisotropic layer 36a, and the like such that the elliptically polarized light emitted from the first optically-anisotropic layer 36a can be converted into circularly polarized light. As the index, $Nz=Rth/Re+0.5$ can be used. Here, Rth represents a thickness direction retardation, and Re represents an in-plane direction retardation. Nz is preferably 0.1 to 1.1, more preferably 0.8 to 0.2, and still more preferably 0.7 to 0.3.

Here, in the optically-anisotropic layer 36 shown in FIG. 2 and the optically-anisotropic layer 37 shown in FIG. 9, the optical axis of the liquid crystal compound is parallel to the main surface of the optically-anisotropic layer. However, the present invention is not limited to this configuration. In the optically-anisotropic layer, the optical axis of the liquid crystal compound is tilted with respect to the main surface of the optically-anisotropic layer.

In addition, the optical axis 40A of the liquid crystal compound 40 in the liquid crystal alignment pattern of the optically-anisotropic layer shown in FIG. 3 continuously rotates only in the arrangement axis D direction.

However, the present invention is not limited thereto, and various configurations can be used as long as the optical axis 40A of the liquid crystal compound 40 in the optically-anisotropic layer continuously rotates in the one in-plane direction.

Here, at least one of the first optically-anisotropic layer or the second optically-anisotropic layer has a configuration in which a rod-like liquid crystal layer where a rod-like liquid crystal compound is aligned in the liquid crystal alignment pattern and a disk-like liquid crystal layer where a disk-like liquid crystal compound is aligned in the liquid crystal alignment pattern are alternately laminated. It is more preferable that both of the first optically-anisotropic layer and the second optically-anisotropic layer have the configuration in which the rod-like liquid crystal layer and the disk-like liquid crystal layer are alternately laminated.

Figure 11:
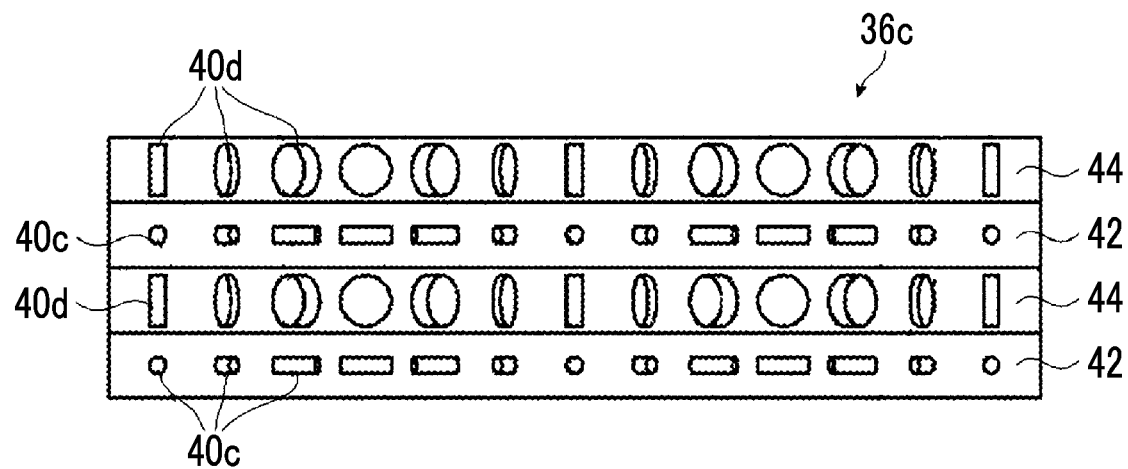
FIG. 11 is a diagram conceptually showing another example of the optically-anisotropic layer in the transmissive liquid crystal diffraction element according to the present invention.

FIG. 11 is a diagram conceptually showing another example of the optically-anisotropic layer in the transmissive liquid crystal diffraction element according to the embodiment of the present invention.

An optically-anisotropic layer 36c shown in FIG. 11 includes four layers in total where a liquid crystal layer (hereinafter, also referred to as the rod-like liquid crystal layer) 42 that is formed of a rod-like liquid crystal compound 40c and a liquid crystal layer (hereinafter, also referred to as the disk-like liquid crystal layer) 44 that is formed of a disk-like liquid crystal compound 40d are alternately provided. In FIG. 11, in order to simplify the drawing to clearly show the configuration of the optically-anisotropic layer 36c, only the liquid crystal compound on the surface of the rod-like liquid crystal layer 42 and the disk-like liquid crystal layer 44 is conceptually shown. However, each of the rod-like liquid crystal layer 42 and the disk-like liquid crystal layer 44 has a structure in which the liquid crystal compounds are laminated in the thickness direction and where optical axes of the liquid crystal compounds laminated in the thickness direction are directed in the same direction.

As in the example shown in FIGS. 2 and 3, the rod-like liquid crystal layer 42 is a layer where the rod-like liquid crystal compound 40c is aligned in a liquid crystal alignment pattern in which a direction of an optical axis of the rod-like liquid crystal compound 40c changes while continuously rotating in at least one in-plane direction. In addition, as in the example shown in FIGS. 2 and 3, the disk-like liquid crystal layer 44 is a layer where the disk-like liquid crystal compound 40d is aligned in a liquid crystal alignment pattern in which a direction of an optical axis of the disk-like liquid crystal compound 40d changes while continuously rotating in at least one in-plane direction. As described above, the direction of the optical axis of the rod-like liquid crystal compound 40c extends along a direction of a major axis. On the other hand, the direction of the optical axis of the disk-like liquid crystal compound 40d extends in a direction perpendicular to a disk plane. Accordingly, in the disk-like liquid crystal layer 44, the disk-like liquid crystal compound 40d is aligned such that the disk plane is perpendicular to an interface of the disk-like liquid crystal layer 44.

In one optically-anisotropic layer 36c, in the rod-like liquid crystal layer 42 and the disk-like liquid crystal layer 44, the single periods of the liquid crystal alignment patterns are the same, and the rotation directions of the optical axes in the liquid crystal alignment patterns are the same. Accordingly, in the example shown in FIG. 11, the two rod-like liquid crystal layers 42 and the two disk-like liquid crystal layer 44 exhibit the above-described action of the optically-anisotropic layer 36 as one optically-anisotropic layer 36c.

In a case where the optically-anisotropic layer has the configuration in which the rod-like liquid crystal layer 42 and the disk-like liquid crystal layer 44 are alternately laminated, the thickness direction retardation Rth of the optically-anisotropic layer can be approximated to zero. As a result, in a case where light is incident into the optically-anisotropic layer from an oblique direction, a change in the in-plane retardation Re is small. Therefore, the incidence angle dependence of the diffraction performance such as the diffraction efficiency can be improved.

In addition, diffracted light is produced in various places in the thickness direction of a layer that causes diffraction to occur. Therefore, it is preferable that Rth is close to zero in any place in the thickness direction of the layer that causes diffraction to occur. It is preferable that Rth is offset in each of the places in the thickness direction of the layer that causes diffraction to occur. Accordingly, the Rths of the rod-like liquid crystal layer and the disk-like liquid crystal layer that are alternately laminated have a positive and negative relationship with the Rth of a layer adjacent thereto, and an absolute value of the Rth of each of the layers is preferably about 10 to 200 nm.

By providing the above-described optically-anisotropic layer, the diffraction efficiency of the transmissive liquid crystal diffraction element can be further improved.

Here, the thickness of each of the rod-like liquid crystal layer 42 and the disk-like liquid crystal layer 44 is preferably 0.1 µm to 5 µm, more preferably 0.1 µm to 2 µm, and still more preferably 0.1 µm to 0.5 µm. In addition, it is preferable that the total thickness of the rod-like liquid crystal layer 42 and the disk-like liquid crystal layer 44 is not excessively large with respect to the wavelength of incident light.

In the example shown in FIG. 11, the configuration in which the two rod-like liquid crystal layers 42 and the two disk-like liquid crystal layer 44 are provided, but the present invention is not limited to this configuration. A configuration in which one rod-like liquid crystal layer 42 and one disk-like liquid crystal layer 44 are provided may be adopted or a configuration in which three or more rod-like liquid crystal layers 42 and three or more disk-like liquid crystal layers 44 are provided may be adopted.

By providing a plurality of rod-like liquid crystal layers 42 and a plurality of disk-like liquid crystal layers 44 and matching the sizes of the retardations $\Delta n \times d$ ($\Delta n$ represents a difference in refractive index of the liquid crystal compound, and d represents the thickness of the liquid crystal layer) of the rod-like liquid crystal layers 42 and the disk-like liquid crystal layers 44 to each other, the thickness direction retardation Rth of the optically-anisotropic layer can be approximated to zero.

In addition, by changing the values of $\Delta n$ and the thickness d of the rod-like liquid crystal layers and the disk-like liquid crystal layers, the value of Rth of the optically-anisotropic layer can be accurately controlled. In this configuration, $Rth = ((ne+no)/2 - no) \times d = (ne-no)/2 \times d$. Therefore, in the rod-like liquid crystal layer, $ne > no$, and thus $Rth > 0$. In the disk-like liquid crystal layer, $ne < no$, and thus $Rth < 0$. In the present invention, the rod-like liquid crystal layer and the disk-like liquid crystal layer can be alternately laminated, and the proportion thereof can be changed. Therefore, the value of Rth can be accurately controlled between the value obtained in a case where all of the liquid crystal layers are the rod-like liquid crystal layers and the value obtained in a case where all of the liquid crystal layers are the disk-like liquid crystal layers.

As shown in FIG. 11, it is preferable that the rod-like liquid crystal compound 40c is aligned in a state where the optical axis (director) is parallel to an interface of the rod-like liquid crystal layer 42, and the disk-like liquid crystal compound 40d is aligned in a state where the disk plane is perpendicular to an interface of the disk-like liquid crystal layer 44. As a result, by averaging the refractive indices in the thickness direction of the disk-like liquid crystal compound and the rod-like liquid crystal compound while continuously maintaining a change of the slow axis in the thickness direction in a plane, the thickness direction retardation Rth can be approximated to zero, and the incidence angle dependence can be further improved.

In addition, in the transmissive liquid crystal diffraction element according to the embodiment of the present invention, it is preferable that at least one of the first optically-anisotropic layer or the second optically-anisotropic layer has a configuration in which a plurality of liquid crystal layers where the liquid crystal compound is twisted and aligned in a thickness direction are laminated, a twisted angle of the twisted alignment in each of the liquid crystal layers is less than 360°, and twisted directions of the liquid crystal compound in the plurality of liquid crystal layers are alternately changed in a laminating direction.

Figure 12:
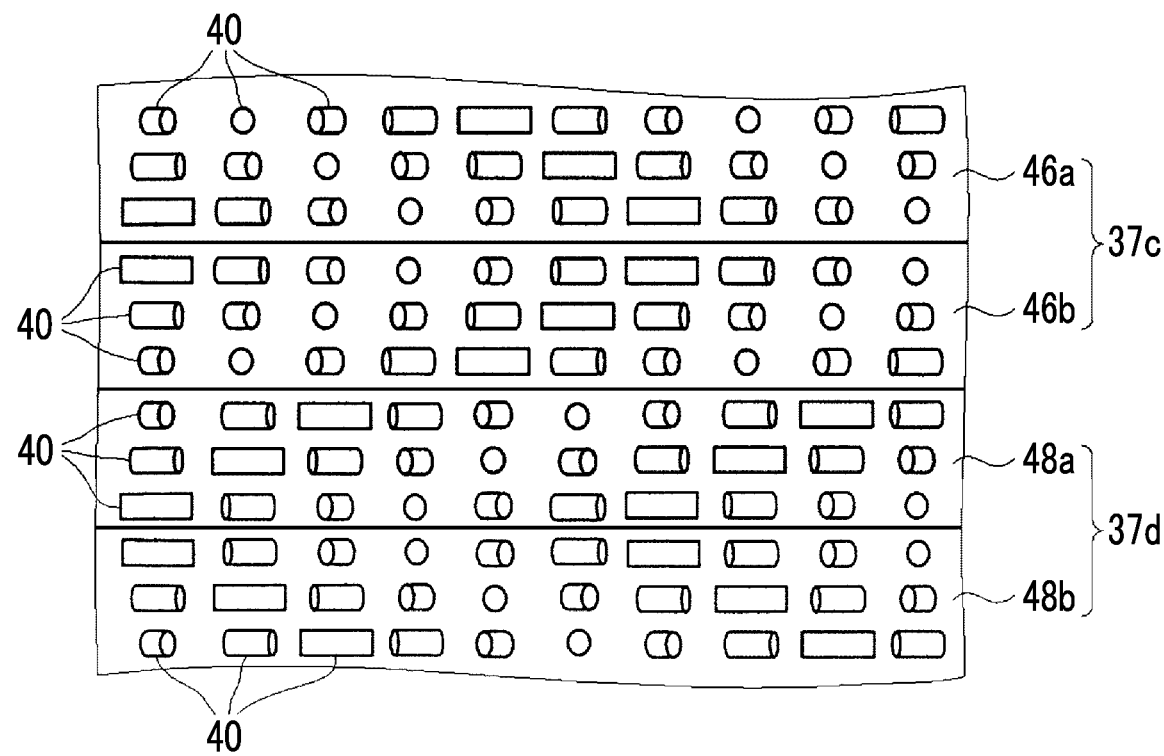
FIG. 12 is a diagram conceptually showing still another example of the transmissive liquid crystal diffraction element according to the present invention.

FIG. 12 is a diagram conceptually showing still another example of the transmissive liquid crystal diffraction element according to the embodiment of the present invention.

The transmissive liquid crystal diffraction element shown in FIG. 12 includes: a first optically-anisotropic layer 37c that includes a liquid crystal layer 46a and a liquid crystal layer 46b; and a second optically-anisotropic layer 37d that includes a liquid crystal layer 48a and a liquid crystal layer 48b.

As in the example shown in FIG. 3, the liquid crystal layer 46a and the liquid crystal layer 46b of the first optically-anisotropic layer 37a are layers having the liquid crystal alignment pattern in which the direction of the optical axis derived from the liquid crystal compound 40 changes while continuously rotating in at least one in-plane direction. In addition, in the liquid crystal layer 46a and the liquid crystal layer 46b, the single periods of the liquid crystal alignment patterns are the same, and the rotation directions of the optical axes in the liquid crystal alignment patterns are the same.

Here, in the liquid crystal layer 46a and the liquid crystal layer 46b, the liquid crystal compound 40 is twisted and aligned in the thickness direction, and a twisted direction of the liquid crystal compound 40 in the liquid crystal layer 46a and a twisted direction of the liquid crystal compound 40 in the liquid crystal layer 46b are opposite to each other.

In the example shown in FIG. 12, the twisted direction of the liquid crystal compound 40 in the liquid crystal layer 46a is a counterclockwise rotation direction from the upper side to the lower side in the drawing. On the other hand, the twisted direction of the liquid crystal compound 40 in the liquid crystal layer 46b is a clockwise rotation direction from the upper side to the lower side in the drawing.

That is, the first optically-anisotropic layer 37c is a liquid crystal layer in which the twisted directions of the liquid crystal compounds 40 in the thickness direction are different.

Likewise, as in the example shown in FIG. 3, the liquid crystal layer 48a and the liquid crystal layer 48b of the second optically-anisotropic layer 37d are layers having the liquid crystal alignment pattern in which the direction of the optical axis derived from the liquid crystal compound 40 changes while continuously rotating in at least one in-plane direction. In addition, in the liquid crystal layer 48a and the liquid crystal layer 48b, the single periods of the liquid crystal alignment patterns are the same, and the rotation directions of the optical axes in the liquid crystal alignment patterns are the same.

In addition, the rotation direction of the optical axis in the liquid crystal alignment pattern of the liquid crystal layer 48a and the liquid crystal layer 48b of the second optically-anisotropic layer 37d and the rotation direction of the optical axis in the liquid crystal alignment pattern of the liquid crystal layer 46a and the liquid crystal layer 46b of the first optically-anisotropic layer 37c are opposite to each other.

Here, in the liquid crystal layer 48a and the liquid crystal layer 48b, the liquid crystal compound 40 is twisted and aligned in the thickness direction, and a twisted direction of the liquid crystal compound 40 in the liquid crystal layer 48a and a twisted direction of the liquid crystal compound 40 in the liquid crystal layer 48b are opposite to each other.

In the example shown in FIG. 12, the twisted direction of the liquid crystal compound 40 in the liquid crystal layer 48a is a counterclockwise rotation direction from the upper side to the lower side in the drawing. On the other hand, the twisted direction of the liquid crystal compound 40 in the liquid crystal layer 48b is a clockwise rotation direction from the upper side to the lower side in the drawing.

That is, the second optically-anisotropic layer 37d is a liquid crystal layer in which the twisted directions of the liquid crystal compounds 40 in the thickness direction are different.

This way, By adopting the configuration where the optically-anisotropic layer includes the liquid crystal layers where the twisted directions of the liquid crystal compounds 40 in the thickness direction are different, the angle dependence and the wavelength dependence of the diffraction efficiency are improved. In this case, the optimum values of the twisted angle (the total twisted angle in the thickness direction) and the retardation $\Delta n \times d$ of each of the liquid crystal layers change depending on the difference $\Delta n$ in refractive index of the liquid crystal compound. Therefore, the twisted angle may be optimized for each of the liquid crystal layers. The twisted angle is preferably 30° to 180°. The twisted alignment can be realized by adding the above-described chiral agent that is typically used.

In addition, in a case where $\Delta n$ of the liquid crystal compound is large, the angle dependence and the wavelength dependence are further improved, which is preferable.

In addition, in the example shown in FIG. 12, the optically-anisotropic layer has the two-layer configuration in which the liquid crystal layers where the twisted directions are different are laminated, but the present invention is not limited thereto. The optically-anisotropic layer may have three or more liquid crystal layers where the twisted directions are different. Alternatively, the optically-anisotropic layer may include a liquid crystal layer where the liquid crystal compound is not twisted in the thickness direction that is provided between two liquid crystal layers where the twisted directions are different. As a result, the angle dependence and the wavelength dependence of the diffraction efficiency are further improved.

In the liquid crystal layer where the liquid crystal compound is not twisted and aligned between the liquid crystal layers where the liquid crystal compound is twisted and aligned, it is preferable that, in each of places in a plane, the direction of the optical axis of the liquid crystal compound is continuously connected (directed to the same direction) to the direction of the optical axis of the liquid crystal layer at an interface of the adjacent liquid crystal layer where the liquid crystal compound is twisted and aligned. The configuration where the directions of the optical axes of the liquid crystal compounds are connected between the adjacent liquid crystal layers can be achieved by laminating and applying the upper liquid crystal layer to the lower liquid crystal layer.

In a case where the optically-anisotropic layer includes the liquid crystal layers where the twisted directions of the liquid crystal compounds 40 in the thickness direction are different, it is preferable that the twisted angles of the liquid crystal layers per unit length in the thickness direction are the same from the viewpoint of the symmetry of the diffraction performance. On the other hand, in order to improve the diffraction performance at a given angle, the twisted angles of the liquid crystal layers per unit length in the thickness direction may be different.

The thickness of each of the liquid crystal layers is preferably 0.1 µm to 5 µm, more preferably 0.1 µm to 2 µm, and still more preferably 0.1 µm to 0.5 µm.

As described above, the Rths of the rod-like liquid crystal layer and the disk-like liquid crystal layer that are alternately laminated have a positive and negative relationship with the Rth of a layer adjacent thereto, and an absolute value of the Rth of each of the layers is preferably about 10 to 200 nm.

Here, as shown in FIG. 12, in a case where the optically-anisotropic layer includes the liquid crystal layers where the twisted directions of the liquid crystal compounds 40 in the thickness direction are different, at least one of the liquid crystal layers has a configuration in which a rod-like liquid crystal layer where a rod-like liquid crystal compound is aligned in the liquid crystal alignment pattern and a disk-like liquid crystal layer where a disk-like liquid crystal compound is aligned in the liquid crystal alignment pattern are alternately laminated.

Figure 13:
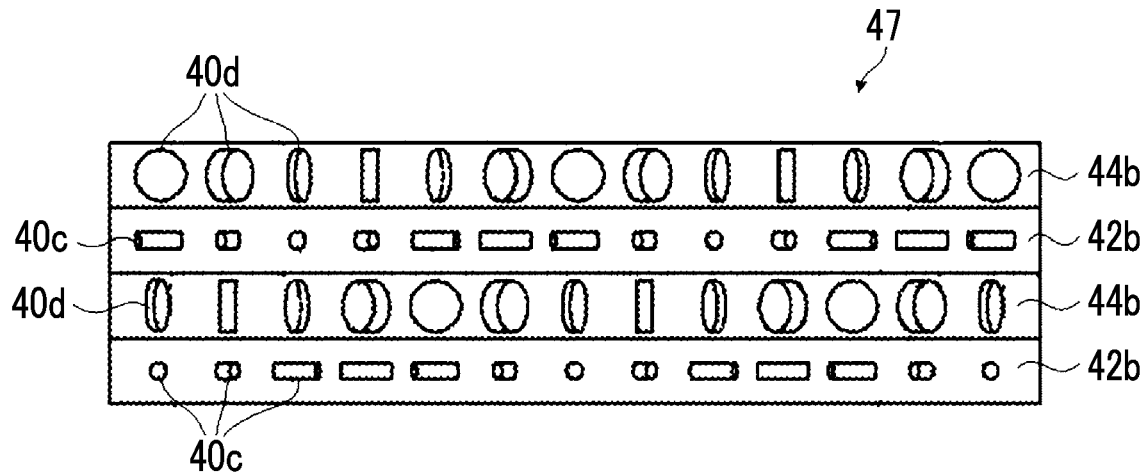
FIG. 13 is a diagram conceptually showing another example of a liquid crystal layer in the liquid crystal diffraction element shown in FIG. 12.

FIG. 13 is a diagram conceptually showing another example of the liquid crystal layer of the liquid crystal layer in the optically-anisotropic layer of the transmissive liquid crystal diffraction element according to the embodiment of the present invention.

A liquid crystal layer 47 shown in FIG. 13 includes four layers in total where a rod-like liquid crystal layer 42b that is formed of a rod-like liquid crystal compound 40c and a disk-like liquid crystal layer 44b that is formed of a disk-like liquid crystal compound 40d are alternately provided. In FIG. 13, in order to simplify the drawing to clearly show the configuration of the liquid crystal layer 47, only the liquid crystal compound on the surface of the rod-like liquid crystal layer 42b and the disk-like liquid crystal layer 44b is conceptually shown. However, the rod-like liquid crystal layer 42b and the disk-like liquid crystal layer 44b have a structure in which the liquid crystal compound is laminated in the thickness direction.

As in the example shown in FIG. 3, the rod-like liquid crystal layer 42b is a layer where the rod-like liquid crystal compound 40c is aligned in a liquid crystal alignment pattern in which a direction of an optical axis of the rod-like liquid crystal compound 40c changes while continuously rotating in at least one in-plane direction. In addition, as in the example shown in FIG. 3, the disk-like liquid crystal layer 44b is a layer where the disk-like liquid crystal compound 40d is aligned in a liquid crystal alignment pattern in which a direction of an optical axis of the disk-like liquid crystal compound 40d changes while continuously rotating in at least one in-plane direction.

In one liquid crystal layer 47, in the rod-like liquid crystal layer 42b and the disk-like liquid crystal layer 44b, the single periods of the liquid crystal alignment patterns are the same, and the rotation directions of the optical axes in the liquid crystal alignment patterns are the same.

Here, in the example shown in FIG. 13, a longitudinal direction of the liquid crystal compound in a plane is integrally twisted and aligned in the thickness direction from the lower rod-like liquid crystal layer 42b to the upper disk-like liquid crystal layer 44b in the drawing. As a result, the two rod-like liquid crystal layers 42b and the two disk-like liquid crystal layers 44b exhibit the same action as the liquid crystal layer shown in FIG. 12 as one liquid crystal layer 47. The longitudinal direction of the liquid crystal compound in the disk-like liquid crystal layer 44b is a longitudinal direction of a shape in which the disk-like liquid crystal compound is projected on the surface (interface) of the disk-like liquid crystal layer.

This way, in a case where the optically-anisotropic layer includes the liquid crystal layers where the twisted directions of the liquid crystal compounds 40 in the thickness direction are different, at least one of the liquid crystal layers has the configuration where the rod-like liquid crystal layer and the disk-like liquid crystal layer are laminated such that the incidence angle dependence of the diffraction performance such as the diffraction efficiency can be further improved.

The thicknesses and the like of the rod-like liquid crystal layer 42b and the disk-like liquid crystal layer 44b are the same as those of the rod-like liquid crystal layer 42 and the disk-like liquid crystal layer 44.

In addition, it is preferable that the transmissive liquid crystal diffraction element according to the embodiment of the present invention includes an λ/4 plate that is provided on at least one of a side of the first optically-anisotropic layer opposite to the second optically-anisotropic layer or a side of the second optically-anisotropic layer opposite to the first optically-anisotropic layer.

Figure 14:
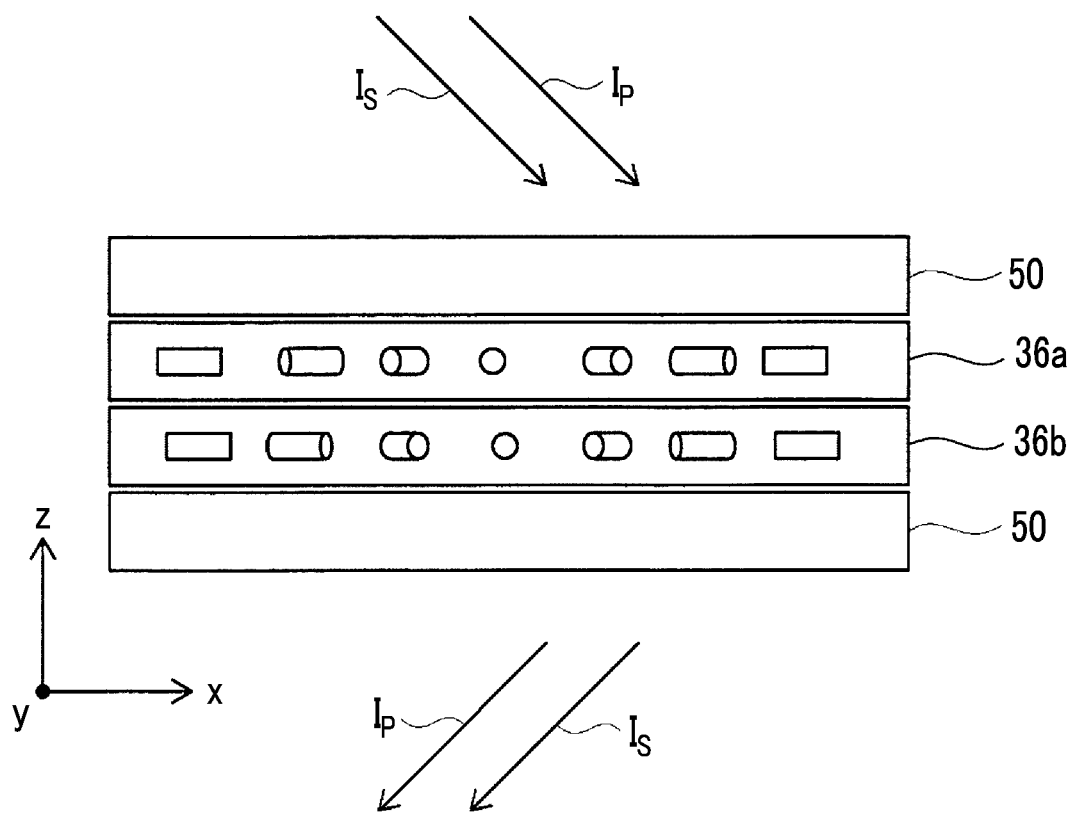
FIG. 14 is a diagram conceptually showing still another example of the transmissive liquid crystal diffraction element according to the present invention.

FIG. 14 is a diagram conceptually showing still another example of the transmissive liquid crystal diffraction element according to the embodiment of the present invention.

The transmissive liquid crystal diffraction element shown in FIG. 14 includes a first λ/4 plate 50, the first optically-anisotropic layer 36a, the second optically-anisotropic layer 36b, and a second λ/4 plate 50 in this order. That is, the transmissive liquid crystal diffraction element shown in FIG. 14 has the configuration in which the first optically-anisotropic layer 36a and the second optically-anisotropic layer 36b are interposed between the λ/4 plates 50.

Since the first optically-anisotropic layer 36a and the second optically-anisotropic layer 36b have the same configuration as the first optically-anisotropic layer 36a and the second optically-anisotropic layer 36b shown in FIG. 1, the description thereof will not be repeated.

The first λ/4 plate 50 and the second λ/4 plate 50 are well-known λ/4 plates in the related art. As is well known, circularly polarized light incident into the λ/4 plate is converted into linearly polarized light, and linearly polarized light incident into the λ/4 plate is converted into circularly polarized light. The λ/4 plate 50 is disposed such that an angle between the slow axis and the direction (arrangement axis D direction) in which the optical axis derived from the liquid crystal compound changes while continuously rotating in the one in-plane direction is 45 degrees or −45 degrees.

Accordingly, in the example shown in FIG. 14, linearly polarized light components incident into the transmissive liquid crystal diffraction element where vibration directions are perpendicular to each other can be bent in the same direction.

Specifically, an example where s polarized light and p polarized light are incident into the transmissive liquid crystal diffraction element from the same direction can be considered. In addition, in a case where s polarized light and p polarized light are incident into the transmissive liquid crystal diffraction element, the s polarized light and the p polarized light are converted into right circularly polarized light and left circularly polarized light by the first λ/4 plate 50, respectively. The converted right circularly polarized light and the converted left circularly polarized light transmit through the first optically-anisotropic layer 36a and the second optically-anisotropic layer 36b in this order. In this case, as in the transmissive liquid crystal diffraction element shown in FIG. 1, the light components transmitted through the second optically-anisotropic layer 36b are bent in the same direction in the states of the left circularly polarized light and the right circularly polarized light. The bent left circularly polarized light and the bent right circularly polarized light are incident into the second λ/4 plate 50 and converted into s polarized light and p polarized light. In this case the s polarized light and the p polarized light are emitted in the same direction.

This way, with the configuration where the transmissive liquid crystal diffraction element includes the λ/4 plates, linearly polarized light components where vibration directions are perpendicular to each other can be bent in the same direction without being mixed.

In the example shown in FIG. 14, the configuration where the first optically-anisotropic layer 36a and the second optically-anisotropic layer 36b are interposed between the two λ/4 plates 50 is shown, but the present invention is not limited to this configuration. For example, with the configuration where the transmissive liquid crystal diffraction element includes the first λ/4 plate 50 on the first optically-anisotropic layer 36a side, incident right circularly polarized light and left circularly polarized light can be bent in the same direction as linearly polarized light components where vibration directions are perpendicular to each other. In addition with the configuration where the transmissive liquid crystal diffraction element includes the second λ/4 plate 50 on the second optically-anisotropic layer 36b side, incident linearly polarized light components where vibration directions are perpendicular to each other can be converted into right circularly polarized light and left circularly polarized light and bent in the same direction.

The λ/4 plate is not particularly limited, and various well-known plates having a λ/4 function can be used. Specific examples of the λ/4 plate include those described in US2015/0277006A.

Specific examples of an aspect where the λ/4 plate 26 has a monolayer structure include a stretched polymer film and a retardation film where an optically-anisotropic layer having a λ/4 function is provided on a support. Examples of an aspect in which the λ/4 plate has a multi-layer structure include a broadband λ/4 plate in which a λ/4 plate and a λ/2 wave plate are laminated.

The thickness of the λ/4 plate is not particularly limited and is preferably 1 to 500 μm, more preferably 1 to 50 μm, and still more preferably 1 to 5 μm.

It is preferable that the λ/4 plate used in the present invention has reverse wavelength dispersibility. By the λ/4 plate having reverse wavelength dispersibility, the wavelength dependence can be improved. The λ/4 plate having reverse wavelength dispersibility can be prepared and realized, for example, using a reverse dispersion liquid crystal material.

In addition, from the viewpoint of improving the incidence angle dependence, it is preferable that the λ/4 plate is a wide viewing angle λ/4 plate. The wide viewing angle λ/4 plate is a λ/4 plate where the thickness direction retardation is close to zero. This wide viewing angle λ/4 plate can be realized, for example, by laminating a positive A-Plate and a positive C-plate.

Figure 15:
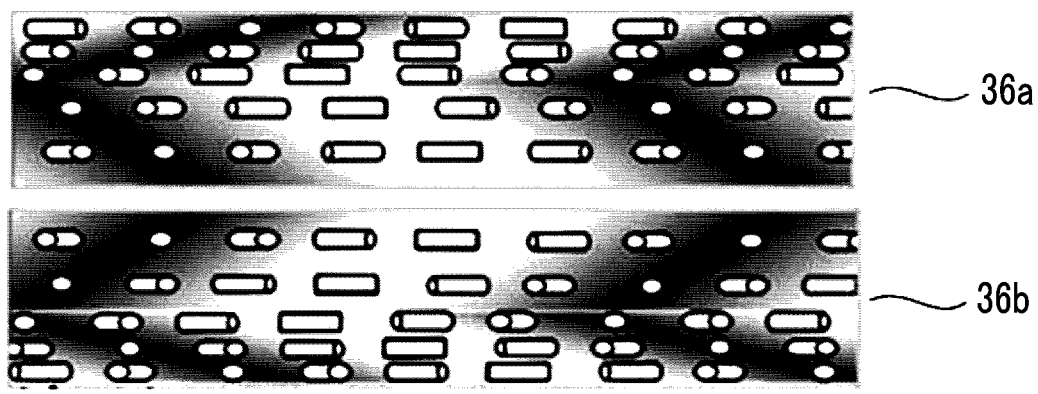
FIG. 15 is a diagram conceptually showing still another example of the transmissive liquid crystal diffraction element according to the present invention.
Figure 16:
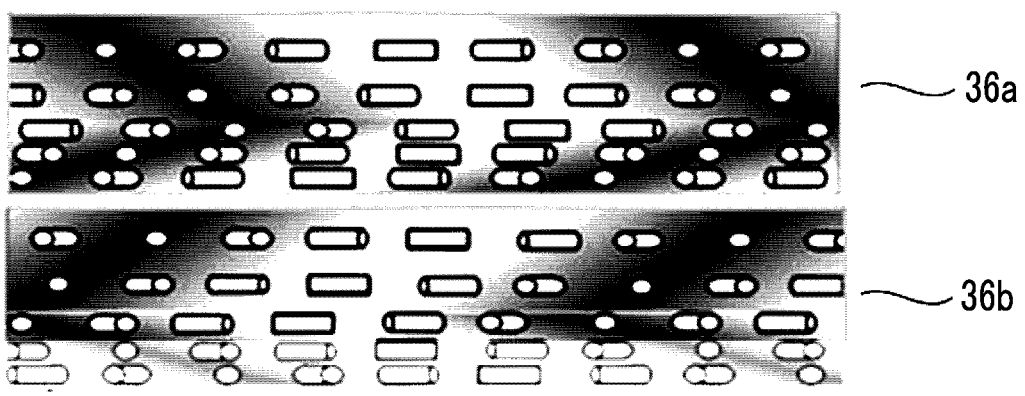
FIG. 16 is a diagram conceptually showing still another example of the transmissive liquid crystal diffraction element according to the present invention.

FIGS. 15 and 16 are diagrams conceptually showing still other examples of the transmissive liquid crystal diffraction element according to the embodiment of the present invention.

In FIGS. 15 and 16, in a first liquid crystal layer and a second liquid crystal layer, a right-twisted layer and a left-twisted layer are continuously laminated, the thicknesses of the right-twisted layer and the left-twisted layer are different, and absolute values of twisted angles of the right-twisted layer and the left-twisted layer are different. As a result, a wavelength range at which a high diffraction efficiency can be obtained can be widened. In this case, in a cross sectional image of the first optically-anisotropic layer obtained by an SEM, bright and dark lines having a left-right asymmetric V-shape that is horizontally laid are observed, in which the lengths and angles of two lines extending in an oblique left-right direction with respect to a lower interface of the first optically-anisotropic layer are different. Even in the second optically-anisotropic layer, bright and dark lines having a V-shape that is horizontally laid are observed. The bright and dark lines are observed with the configuration where the two liquid crystal layers where the liquid crystal compounds are aligned such that the twisted directions in the thickness direction are different in the left-right direction are laminated in the thickness direction and where the absolute values of the thicknesses and the twisted angles of the right-twisted layer and the left-twisted layer are different.

The transmissive liquid crystal diffraction element shown in FIG. 15 may be prepared by preparing the first liquid crystal layer and the second liquid crystal layer using the same method and vertically inverting and laminating the first liquid crystal layer and the second liquid crystal layer. On the other hand, the transmissive liquid crystal diffraction element shown in FIG. 16 may be prepared by preparing the first liquid crystal layer and the second liquid crystal layer such that the right-twisted layer and the left-twisted layer are left-right symmetric and laminating the first liquid crystal layer and the second liquid crystal layer.

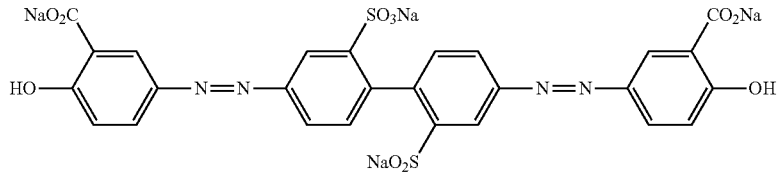

FIG. 15 illustrates a method in which the first liquid crystal layer and the second liquid crystal layer are laminated such that layers that are twisted in the same direction in the first liquid crystal layer and the second liquid crystal layer face each other and directions in which the left-right asymmetric V-shape that is horizontally laid protrudes are the same. FIG. 16 illustrates a method in which the first liquid crystal layer and the second liquid crystal layer are laminated such that layers that are twisted in different directions in the first liquid crystal layer and the second liquid crystal layer face each other and directions in which the left-right asymmetric V-shape that is horizontally laid protrudes are opposite to each other. Irrespective of the laminating method, a wavelength range at which a high diffraction efficiency can be obtained can be widened.

Hereinabove, the transmissive liquid crystal diffraction element according to the embodiment of the present invention has been described in detail. However, the present invention is not limited to the above-described examples, and various improvements and modifications can be made within a range not departing from the scope of the present invention.

EXAMPLES

Hereinafter, the characteristics of the present invention will be described in detail using examples. Materials, chemicals, used amounts, material amounts, ratios, treatment details, treatment procedures, and the like shown in the following examples can be appropriately changed within a range not departing from the scope of the present invention. Accordingly, the scope of the present invention is not limited to the following specific examples.

Example 1

<Preparation of Transmissive Liquid Crystal Diffraction Element>
(Formation of Alignment Film)

A glass substrate was used as the support. The following coating liquid for forming an alignment film was applied to the support by spin coating. The support on which the coating film of the coating liquid for forming an alignment film was formed was dried using a hot plate at 60° C. for 60 seconds. As a result, an alignment film P-2 was formed.

Coating Liquid for Forming Alignment Film

| | |
|---|---|
| The following material for photo-alignment | 1.00 part by mass |
| Water | 16.00 parts by mass |
| Butoxyethanol | 42.00 parts by mass |
| Propylene glycol monomethyl ether | 42.00 parts by mass |

(Exposure of Alignment Film)

By irradiating the obtained alignment film P-2 with polarized ultraviolet light (50 mJ/cm², using an extra high pressure mercury lamp), the alignment film P-2 was exposed.

The alignment film was exposed using the exposure device shown in FIG. 4 to form an alignment film P-2 having an alignment pattern. In the exposure device, a laser that emits laser light having a wavelength (325 nm) was used as the laser. The exposure amount of the interference light was 300 mJ/cm². An intersecting angle (intersecting angle α) between the two laser beams was adjusted such that the single period Λ (the length over which the optical axis rotates by 180°) of an alignment pattern formed by interference of the two laser beams was 1.05 μm.

(Formation of First Optically-Anisotropic Layer)

As the liquid crystal composition forming the liquid crystal layer, the following composition B-1 was prepared.

Composition B-1

| | |
|---|---|
| Rod-like liquid crystal compound L-1 | 100.00 parts by mass |
| Polymerization initiator (IRGACURE (registered trade name) 907, manufactured by BASF SE) | 3.00 parts by mass |
| Photosensitizer (KAYACURE DETX-S, manufactured by Nippon Kayaku Co., Ltd.) | 1.00 part by mass |
| Leveling agent T-1 | 0.08 parts by mass |
| Methyl ethyl ketone | 2000.00 parts by mass |

Rod-like liquid crystal compound L-1 (including the following structures at a mass ratio shown on the right side)

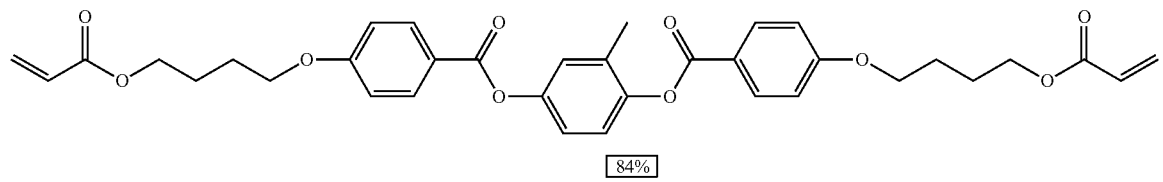

84%

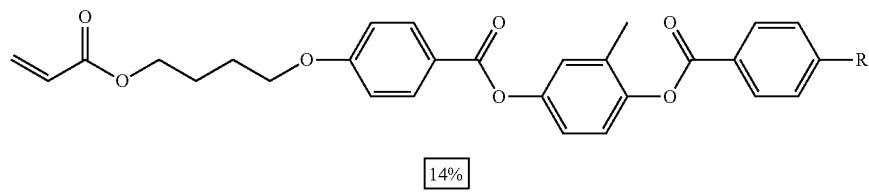

14%

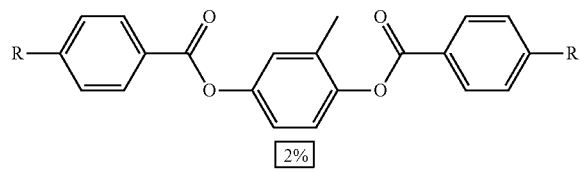

2%

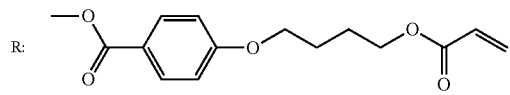

Leveling Agent T-1

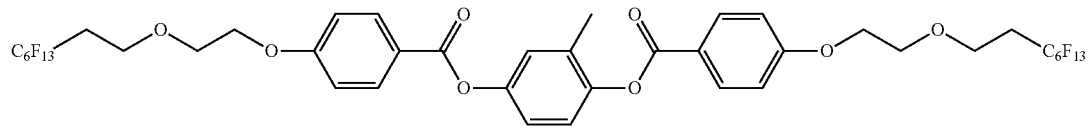

The first optically-anisotropic layer was formed by applying multiple layers of the composition B-1 to the alignment film P-2. The following processes were repeated, the processes including: preparing a first liquid crystal immobilized layer by applying the composition B-1 for forming the first layer to the alignment film, heating the composition B-1, cooling the composition B-1, and irradiating the composition B-1 with ultraviolet light for curing; and preparing a second or subsequent liquid crystal immobilized layer by applying the composition B-1 for forming the second or subsequent layer to the formed liquid crystal immobilized layer, heating the composition B-1, cooling the composition B-1, and irradiating the composition B-1 with ultraviolet light for curing as described above.

Regarding the first liquid crystal layer, the following composition B-1 was applied to the alignment film P-2 to form a coating film, the coating film was heated using a hot plate at 80° C., and the coating film was irradiated with ultraviolet light having a wavelength of 365 nm at an irradiation dose of 300 mJ/cm² using a high-pressure mercury lamp in a nitrogen atmosphere at 80° C. As a result, the alignment of the liquid crystal compound was immobilized.

Regarding the second or subsequent liquid crystal immobilized layer, the composition was applied to the first liquid crystal layer, and the applied composition was heated, cooled, and irradiated with ultraviolet light for curing under the same conditions as described above. As a result, a liquid crystal immobilized layer was prepared. This way, by repeating the application multiple times until the total thickness reached a desired thickness, the first optically-anisotropic layer was obtained.

A difference in refractive index Δn of the cured layer of a liquid crystal composition B-1 was obtained by applying the liquid crystal composition B-1 a support with an alignment film for retardation measurement that was prepared separately, aligning the director of the liquid crystal compound to be parallel to the substrate, irradiating the liquid crystal compound with ultraviolet irradiation for immobilization to obtain a liquid crystal immobilized layer, and measuring the retardation Re(λ) and the thickness of the liquid crystal immobilized layer. $\Delta n_\lambda$ can be calculated by dividing the retardation Re(λ) by the thickness. The retardation Re(λ) was measured by measuring a desired wavelength using Axoscan (manufactured by Axometrix inc.) and measuring the thickness using a SEM. In the expression of Re(λ), λ represents the wavelength of incidence light. In the following description, the wavelength λ of incidence light was 1550 nm.

Finally, in the first optically-anisotropic layer, $\Delta n_{1550} \times$ thickness=Re(1550) of the liquid crystals was 775 nm, and it was verified with a polarization microscope that periodic alignment occurred. In addition, the twisted angle of the first optically-anisotropic layer in the thickness direction was 0°. In addition, in a cross sectional image with a SEM, bright and dark lines that were perpendicular to the lower interface (interface with the glass substrate) of the first optically-anisotropic layer was observed. The bright and dark lines were observed with the configuration where the liquid crystal compounds aligned in the same direction were laminated in the thickness direction.

(Formation of Second Optically-Anisotropic Layer)

As a second optically-anisotropic layer, an optically-anisotropic layer was formed using the same method as the first optically-anisotropic layer. Finally, as in the first optically-anisotropic layer, $\Delta n_{1550} \times$ thickness=Re(1550) of the liquid crystals was 775 nm, and it was verified with a polarization microscope that periodic alignment occurred. In addition, the twisted angle of the second optically-anisotropic layer in the thickness direction was 0°. In addition, in a cross sectional image with a SEM, bright and dark lines that were perpendicular to the lower interface (interface with the glass substrate) of the second optically-anisotropic layer was observed.

The second optically-anisotropic layer was transferred to and laminated on the first optically-anisotropic layer and bonded using a pressure sensitive adhesive. In this case, the second optically-anisotropic layer was inverted by 180 degrees with respect to an axis perpendicular to the main surface and bonded such that the rotation direction of the optical axis derived from the liquid crystal compound that changed while continuously rotating in one in-plane direction was opposite to that of the first optically-anisotropic layer and the directions (arrangement axes D) of the rotation directions in the one in-plane direction were parallel. This way, a transmissive liquid crystal diffraction element (bending diffraction element) where the first optically-anisotropic layer and the second optically-anisotropic layer were laminated was prepared.

In the diffraction element, the value of λ/Λ with respect to light having an incidence wavelength λ of 1550 nm was 1.48, that is, Λ=1.05 μm.

Example 2

A transmissive liquid crystal diffraction element was prepared using the same method as that of Example 1, except that the composition B-1 was changed to the following composition B-2 during the formation of the first optically-anisotropic layer and the composition B-1 was changed to the following composition B-3 during the formation of the second optically-anisotropic layer.

Composition B-2

| | |
|---|---|
| Rod-like liquid crystal compound L-1 | 100.00 parts by mass |
| Chiral agent Ch-A | 0.14 parts by mass |
| Polymerization initiator (IRGACURE (registered trade name) 907, manufactured by BASF SE) | 3.00 parts by mass |
| Photosensitizer (KAYACURE DETX-S, manufactured by Nippon Kayaku Co., Ltd.) | 1.00 part by mass |
| Leveling agent T-1 | 0.08 parts by mass |
| Methyl ethyl ketone | 2000.00 parts by mass |

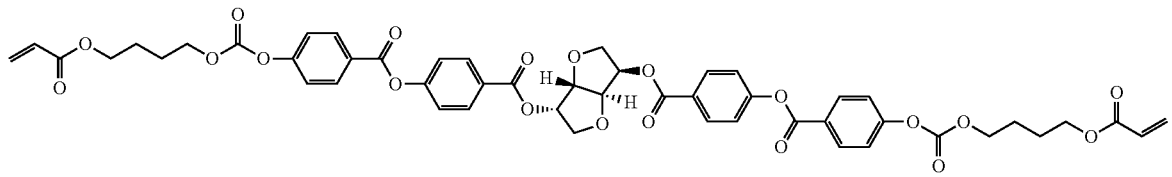 [SMILES: C=CC(=O)OCCCCOC(=O)Oc1ccc(C(=O)Oc2ccc(C(=O)O[C@H]3CO[C@H]4[C@H]3OC[C@H]4OC(=O)c3ccc(OC(=O)c4ccc(OC(=O)OCCCCOC(=O)C=C)cc4)cc3)cc2)cc1]

Composition B-3

| | |
|---|---|
| Rod-like liquid crystal compound L-1 | 100.00 parts by mass |
| Chiral agent Ch-B | 0.24 parts by mass |
| Polymerization initiator (IRGACURE (registered trade name) 907, manufactured by BASF SE) | 3.00 parts by mass |
| Photosensitizer (KAYACURE DETX-S, manufactured by Nippon Kayaku Co., Ltd.) | 1.00 part by mass |
| Leveling agent T-1 | 0.08 parts by mass |
| Methyl ethyl ketone | 2000.00 parts by mass |

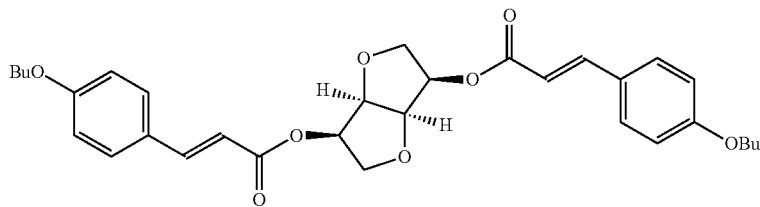

Finally, in the first optically-anisotropic layer, $\Delta n_{1550} \times$ thickness=Re(1550) of the liquid crystals was 775 nm, and it was verified with a polarization microscope that periodic alignment occurred. In addition, the twisted angle of the first optically-anisotropic layer in the thickness direction was 120° (right-twisted). In addition, in a cross sectional image with a SEM, bright and dark lines that were oblique to the lower interface (interface with the glass substrate) of the first optically-anisotropic layer was observed.

Finally, in the second optically-anisotropic layer, $\Delta N_{1550} \times$ thickness=Re(1550) of the liquid crystals was 775 nm, and it was verified with a polarization microscope that periodic alignment occurred. In addition, the twisted angle of the second optically-anisotropic layer in the thickness direction was −120° (left-twisted). In addition, in a cross sectional image with a SEM, bright and dark lines that were oblique to the lower interface (interface with the glass substrate) of the second optically-anisotropic layer was observed. In this case, an absolute value of the oblique angle was the same as that of the angle of the first optically-anisotropic layer, and the tilt direction is opposite to that of the first optically-anisotropic layer.

As in Example 1, the second optically-anisotropic layer was transferred to the first optically-anisotropic layer such that the rotation directions of the optical axes in the liquid crystal alignment patterns were opposite to each other. In this case, the oblique bright and dark lines of the first optically-anisotropic layer and the oblique bright and dark lines of the second optically-anisotropic layer were parallel.

In the diffraction element, the value of $\lambda/\Lambda$ with respect to light having an incidence wavelength $\lambda$ of 1550 nm was 1.48, that is, $\Lambda=1.05$ μm.

Example 3

A transmissive liquid crystal diffraction element was prepared using the same method as that of Example 1, except that a C-plate having positive refractive index anisotropy was disposed between the first optically-anisotropic layer and the second optically-anisotropic layer.

The positive C-plate was formed by vertically aligning the rod-like liquid crystal compound L-1 and the curing the rod-like liquid crystal compound L-1 with ultraviolet light. In this case, the thickness direction retardation (Rth) of the positive C-plate was −390 nm. The positive C-plate was bonded to the first optically-anisotropic layer using a pressure sensitive adhesive.

In the diffraction element, the value of $\lambda/\Lambda$ with respect to light having an incidence wavelength $\lambda$ of 1550 nm was 1.48, that is, $\Lambda=1.05$ μm.

Comparative Example 1

A transmissive liquid crystal diffraction element including only the first optically-anisotropic layer according to Example 1 was prepared.

[Evaluation]

Laser light having a wavelength of 1550 nm was incident into the prepared transmissive liquid crystal diffraction element at an incidence angle θi from the normal direction of the main surface of the transmissive liquid crystal diffraction element such that the azimuthal angle was the direction (arrangement axis D direction) in which the optical axis derived from the liquid crystal compound changes while continuously rotating in the one in-plane direction. In the direction in which light was incident, an emission angle θo and an intensity (diffraction efficiency) of refracted light that was refracted in a direction opposite to the light incidence direction and an emission angle θp and an intensity (diffraction efficiency) of refracted light that was refracted in the same direction as the light incidence direction were measured using a power meter. The incident laser light was unpolarized light. Standards of the intensity (diffraction efficiency) were as follows.

S: the intensity (diffraction efficiency) was 95% or more
A: the intensity (diffraction efficiency) was 92% or more
B: the intensity (diffraction efficiency) was 90% or more
C: the intensity (diffraction efficiency) was 80% or more
D: the intensity (diffraction efficiency) was 50% or more
E: the intensity (diffraction efficiency) was less than 50%

The results are shown in Table 1 below.

TABLE 1

| | θi | θo | θp | Evaluation | |
|---|---|---|---|---|---|
| | (°) | (°) | (°) | Intensity at θo | Intensity at θp |
| Example 1 | 47.6 | −47.6 | 47.6 | A | Not Observed |
| Example 2 | 35 | −64.5 | 35 | A | Not Observed |
| Example 3 | 47.6 | −47.6 | 47.6 | S | Not Observed |
| Comparative Example 1 | 47.6 | −47.6 | 47.6 | E | E |

It can be seen from Table 1 that, in Examples of the present invention, incidence light can be bent at a large angle. In addition, the following can be seen. The refracted light that was refracted in the same direction (the angle of θp) as the light incidence direction was not able to be observed, and the intensity (diffraction efficiency) of the refracted light that was refracted in the direction (the angle of θo) opposite to the light incidence direction was 50% or more. Therefore, both of a right circularly polarized light component and a left circularly polarized light component of the incidence light were able to be diffracted in the same direction (the angle of θo).

Example 4

The formation of the alignment film and the exposure of the alignment film were performed using the same method as that of Example 1, and the formation of the first and second optically-anisotropic layers were performed as follows.

(Preparation of Liquid Crystal Composition)

As the liquid crystal composition for forming the liquid crystal layer, the following compositions C-1, C-2, D-1, and D-2 were prepared. The reference numeral C represents a liquid crystal compound of which the major component was a rod-like liquid crystal compound, the reference numeral D represents a liquid crystal compound of which the major component was a disk-like liquid crystal compound, the reference numeral 1 represents right-twisted, and the reference numeral 2 represents left-twisted. That is, the composition C-1 is a right-twisted liquid crystal composition of which the major component is a rod-like liquid crystal compound, the composition C-2 is a left-twisted liquid crystal composition of which the major component is a rod-like liquid crystal compound, the composition D-1 is a right-twisted liquid crystal composition of which the major component is a disk-like liquid crystal compound, and the composition D-2 is a left-twisted liquid crystal composition of which the major component is a disk-like liquid crystal compound.

Composition C-1

| | |
|---|---|
| Rod-like liquid crystal compound L-1 | 100.00 parts by mass |
| Chiral agent Ch-A | 0.058 parts by mass |
| Polymerization initiator (IRGACURE (registered trade name) 907, manufactured by BASF SE) | 3.00 parts by mass |
| Photosensitizer (KAYACURE DETX-S, manufactured by Nippon Kayaku Co., Ltd.) | 1.00 part by mass |
| Leveling agent T-1 | 0.08 parts by mass |
| Methyl ethyl ketone | 2000.00 parts by mass |

Composition C-2

| | |
|---|---|
| Rod-like liquid crystal compound L-1 | 100.00 parts by mass |
| Chiral agent Ch-B | 0.099 parts by mass |
| Polymerization initiator (IRGACURE (registered trade name) 907, manufactured by BASF SE) | 3.00 parts by mass |
| Photosensitizer (KAYACURE DETX-S, manufactured by Nippon Kayaku Co., Ltd.) | 1.00 part by mass |
| Leveling agent T-1 | 0.08 parts by mass |
| Methyl ethyl ketone | 2000.00 parts by mass |

Composition D-1

| | |
|---|---|
| Disk-like liquid crystal compound L-2 | 80.00 parts by mass |
| Disk-like liquid crystal compound L-3 | 20.00 parts by mass |
| Polymerization initiator (IRGACURE (registered trade name) 907, manufactured by BASF SE) | 5.00 parts by mass |
| MEGAFACE F444 (manufactured by DIC Corporation) | 0.50 parts by mass |
| Chiral agent Ch-2 | 0.033 parts by mass |
| Methyl ethyl ketone | 300.00 parts by mass |

Composition D-2

| | |
|---|---|
| Disk-like liquid crystal compound L-2 | 80.00 parts by mass |
| Disk-like liquid crystal compound L-3 | 20.00 parts by mass |
| Polymerization initiator (IRGACURE (registered trade name) 907, manufactured by BASF SE) | 5.00 parts by mass |
| MEGAFACE F444 (manufactured by DIC Corporation) | 0.50 parts by mass |
| Chiral agent Ch-3 | 0.033 parts by mass |
| Methyl ethyl ketone | 300.00 parts by mass |

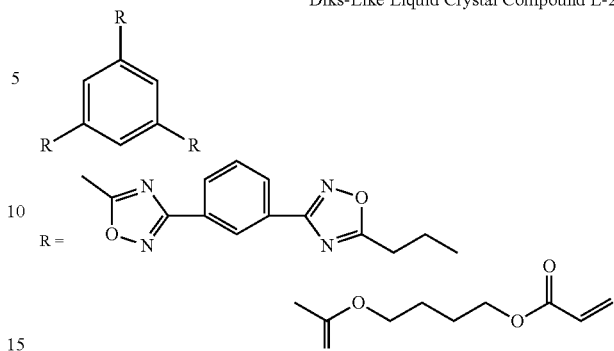

Diks-Like Liquid Crystal Compound L-2

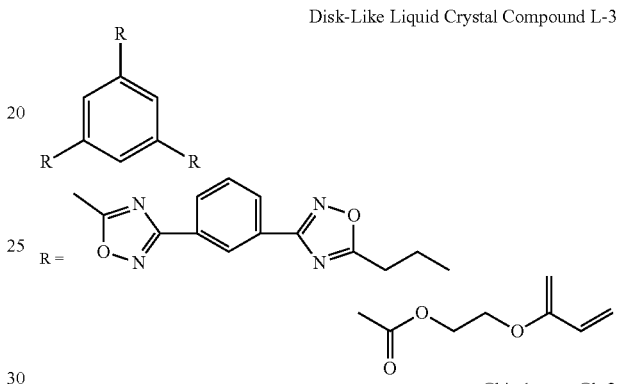

Disk-Like Liquid Crystal Compound L-3

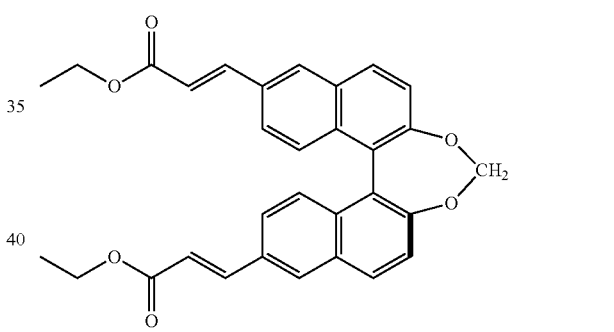

Chiral agent Ch-2

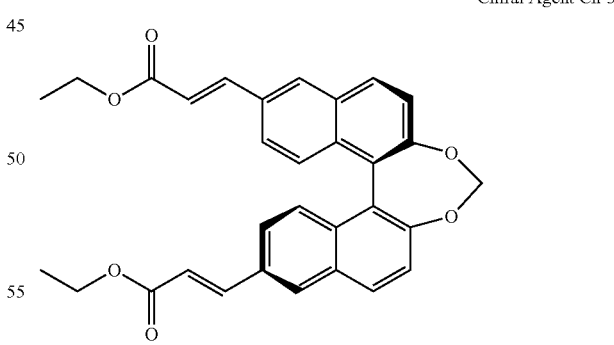

Chiral Agent Ch-3

(Formation of First Optically-Anisotropic Layer)

The first optically-anisotropic layer was formed by applying multiple layers of the composition C-1 to the alignment film P-2 and applying multiple layers of the composition C-2 thereto. A liquid crystal layer C-1 was formed by repeating the following processes including: preparing a first liquid crystal immobilized layer by applying the composition C-1 for forming the first layer to the alignment film, heating the composition C-1, cooling the composition C-1, and irradiating the composition C-1 with ultraviolet light for curing; and preparing a second or subsequent liquid crystal immobilized layer by applying the composition C-1 for forming the second or subsequent layer to the formed liquid crystal immobilized layer, heating the composition C-1, cooling the composition C-1, and irradiating the composition C-1 with ultraviolet light for curing as described above. The steps from the application to the ultraviolet curing are the same as those of Example 1. In this case, the coating thickness during each application was adjusted such that the thickness of the liquid crystal layer C-1 was about 0.4 μm and an excellent alignment state was obtained. As a result, $\Delta n_{1550} \times$ thickness=Re(1550) of the liquid crystal layer C-1 was 930 nm.

A liquid crystal layer C-2 was formed on the liquid crystal layer C-1 by applying multiple layers of the composition C-2. As a result, $\Delta n_{1550} \times$ thickness=Re(1550) of the liquid crystal layer C-2 was 930 nm. As a result, a first optically-anisotropic layer having a structure where the liquid crystal layer C-1 and the liquid crystal layer C-2 were laminated was prepared. It was verified with a microscope that periodic alignment occurred. In addition, in the first optically-anisotropic layer, the twisted angle of the liquid crystal layer C-1 portion in the thickness direction was 60°, and the twisted angle of the liquid crystal layer C-2 portion in the thickness direction was −60°. In addition, in a cross sectional image with a SEM, bright and dark lines having a V-shape that was horizontally laid to the lower interface (interface with the glass substrate) of the first optically-anisotropic layer was observed. The bright and dark lines were observed with the configuration where the liquid crystal compounds aligned such that the twisted directions in the thickness direction were different in the left-right direction were laminated in the thickness direction.

(Formation of Second Optically-Anisotropic Layer and Preparation of Transmissive Liquid Crystal Diffraction Element)

Figure 17:
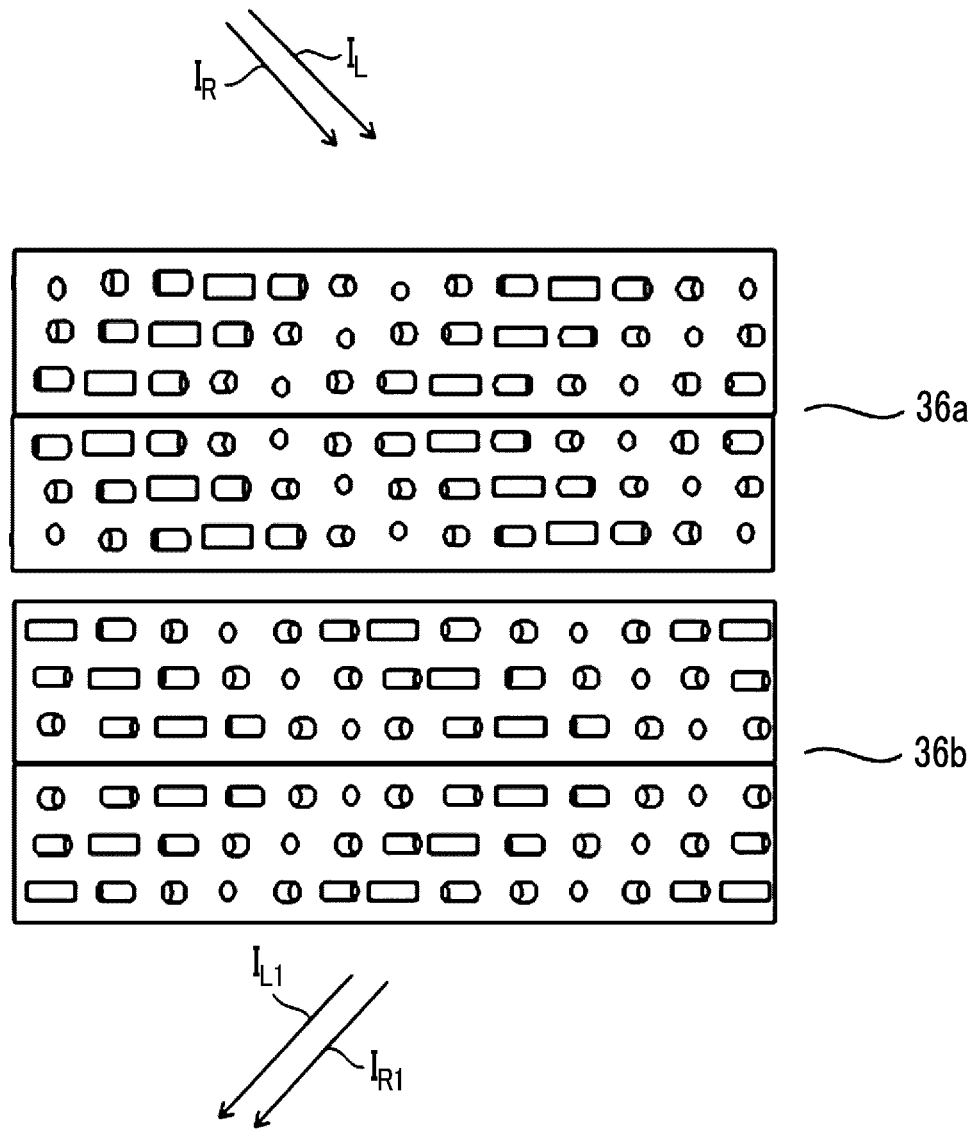
FIG. 17 is a diagram conceptually showing still another example of the transmissive liquid crystal diffraction element according to the present invention.

As a second optically-anisotropic layer, an optically-anisotropic layer was formed using the same method as the first optically-anisotropic layer. The second optically-anisotropic layer was transferred to and laminated on the first optically-anisotropic layer and bonded using a pressure sensitive adhesive. In this case, the second optically-anisotropic layer was inverted by 180 degrees with respect to an axis perpendicular to the main surface and bonded such that the rotation direction of the optical axis derived from the liquid crystal compound that changed while continuously rotating in one in-plane direction was opposite to that of the first optically-anisotropic layer and the directions (arrangement axes D) of the rotation directions in the one in-plane direction were parallel. This way, a transmissive liquid crystal diffraction element where the first optically-anisotropic layer and the second optically-anisotropic layer were laminated was prepared (refer to FIG. 17).

In the diffraction element, the value of λ/Λ with respect to light having an incidence wavelength λ of 1550 nm was 1.48, that is, Λ=1.05 μm.

Example 5

The formation of the alignment film and the exposure of the alignment film were performed using the same method as that of Example 1, and the formation of the first and second optically-anisotropic layers were performed as follows.

(Formation of First Optically-Anisotropic Layer)

The first optically-anisotropic layer was formed by applying multiple layers of the composition C-1 and the composition D-1 to the alignment film P-2 and applying multiple layers of the composition C-2 and the composition D-2 thereto. A rod-like liquid crystal layer C-1 was formed by applying the composition C-1 for forming the first layer to the alignment film, heating the composition C-1, cooling the composition C-1, and irradiating the composition C-1 with ultraviolet light for curing, and subsequently a disk-like liquid crystal layer D-1 was formed by applying the composition D-1 for forming the second layer to the rod-like liquid crystal layer C-1, heating the composition D-1, cooling the composition D-1, and irradiating the composition D-1 with ultraviolet light for curing as described above. Next, the formation of the rod-like liquid crystal layer C-1 and the formation of the disk-like liquid crystal layer D-1 were alternately repeated. The steps from the application to the ultraviolet curing are the same as those of Example 1. In this case, the coating thickness during each application was adjusted such that the thickness of the liquid crystal layer was about 0.4 μm and an excellent alignment state was obtained. In addition, the alignment direction (the direction of the major axis of the rod-like liquid crystal compound) of the liquid crystal compound in the rod-like liquid crystal layer C-1 and the alignment direction (the direction of the long side of the disk-like liquid crystal compound) of the liquid crystal compound in the disk-like liquid crystal layer D-1 were parallel during the lamination and application. Therefore, optical characteristics in which the thickness direction retardation was offset were obtained. The total $\Delta n_{1550} \times$ thickness=Re(1550) of the liquid crystal layers where a plurality of rod-like liquid crystal layers C-1 and a plurality of disk-like liquid crystal layers D-1 were laminated as described above was 930 nm. In this case, $\Delta n_{1550}$ represents an in-plane direction birefringence index.

Multiple layers of the composition C-2 and the multiple layers of the composition D-2 were alternately applied. This way, a liquid crystal layer where a plurality of rod-like liquid crystal layers C-2 and a plurality of disk-like liquid crystal layers D-2 were alternately laminated was formed. $\Delta n_{1550} \times$ thickness=Re(1550) of the liquid crystal layer C-2 was 930 nm. This way, a first optically-anisotropic layer was prepared in which the liquid crystal layer where the rod-like liquid crystal layer C-2 and the disk-like liquid crystal layer D-2 were alternately laminated was laminated on the liquid crystal layer where the rod-like liquid crystal layer C-1 and the disk-like liquid crystal layer D-1 were alternately laminated. It was verified with a microscope that periodic alignment occurred. In addition, in the first optically-anisotropic layer, the twisted angle in the thickness direction of the liquid crystal layer portion where the rod-like liquid crystal layer C-1 and the disk-like liquid crystal layer D-1 were alternately laminated was 60°, and the twisted angle in the thickness direction of the liquid crystal layer portion where the rod-like liquid crystal layer C-2 and the disk-like liquid crystal layer D-2 were alternately laminated was −60°.

In addition, in a cross sectional image with a SEM, bright and dark lines having a V-shape that was horizontally laid to the lower interface (interface with the glass substrate) of the first optically-anisotropic layer was observed. The bright and dark lines were observed with the configuration where the liquid crystal compounds aligned such that the twisted directions in the thickness direction were different in terms of the positive and negative relationship were laminated in the thickness direction.

(Formation of Second Optically-Anisotropic Layer and Preparation of Transmissive Liquid Crystal Diffraction Element)

Figure 18:
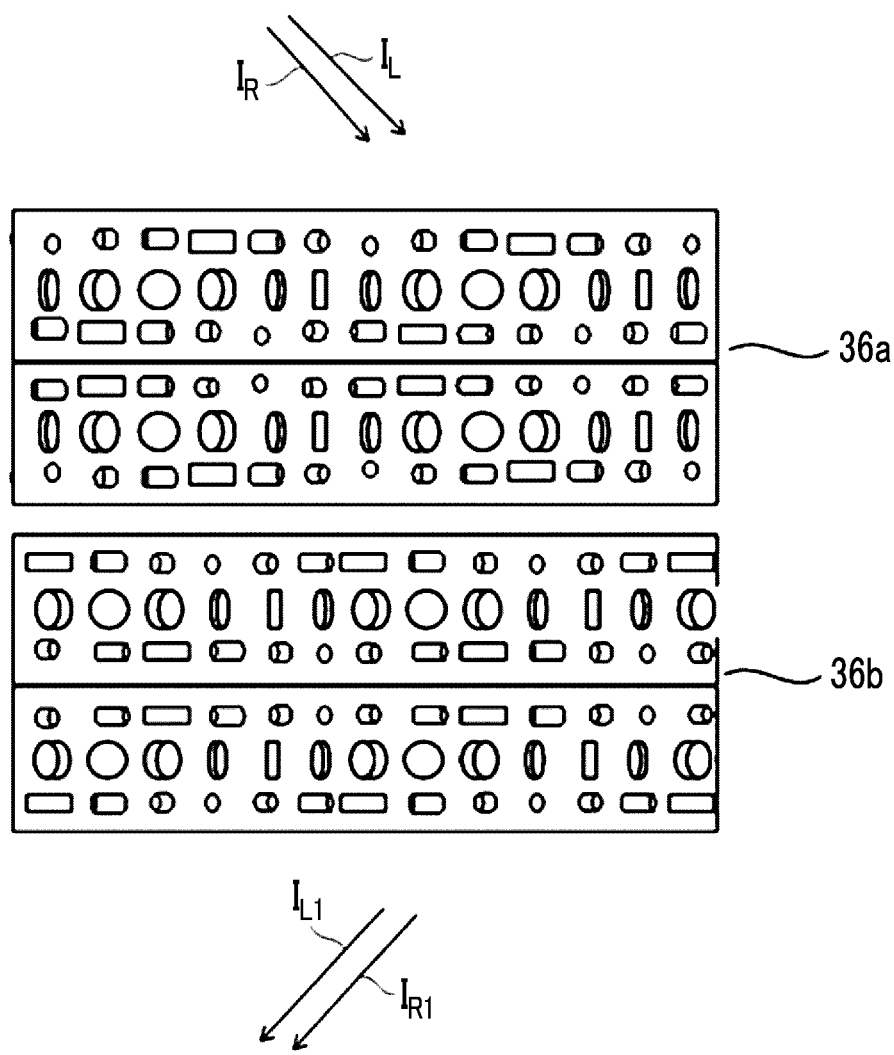
FIG. 18 is a diagram conceptually showing still another example of the transmissive liquid crystal diffraction element according to the present invention.

As a second optically-anisotropic layer, an optically-anisotropic layer was formed using the same method as the first optically-anisotropic layer. The second optically-anisotropic layer was transferred to and laminated on the first optically-anisotropic layer and bonded using a pressure sensitive adhesive. In this case, the second optically-anisotropic layer was inverted by 180 degrees with respect to an axis perpendicular to the main surface and bonded such that the rotation direction of the optical axis derived from the liquid crystal compound that changed while continuously rotating in one in-plane direction was opposite to that of the first optically-anisotropic layer and the directions (arrangement axes D) of the rotation directions in the one in-plane direction were parallel. This way, a transmissive liquid crystal diffraction element where the first optically-anisotropic layer and the second optically-anisotropic layer were laminated was prepared (refer to FIG. 18).

In the diffraction element, the value of $\lambda/\Lambda$ with respect to light having an incidence wavelength $\lambda$ of 1550 nm was 1.48, that is, $\Lambda=1.05$ μm.

Example 6

Figure 19:
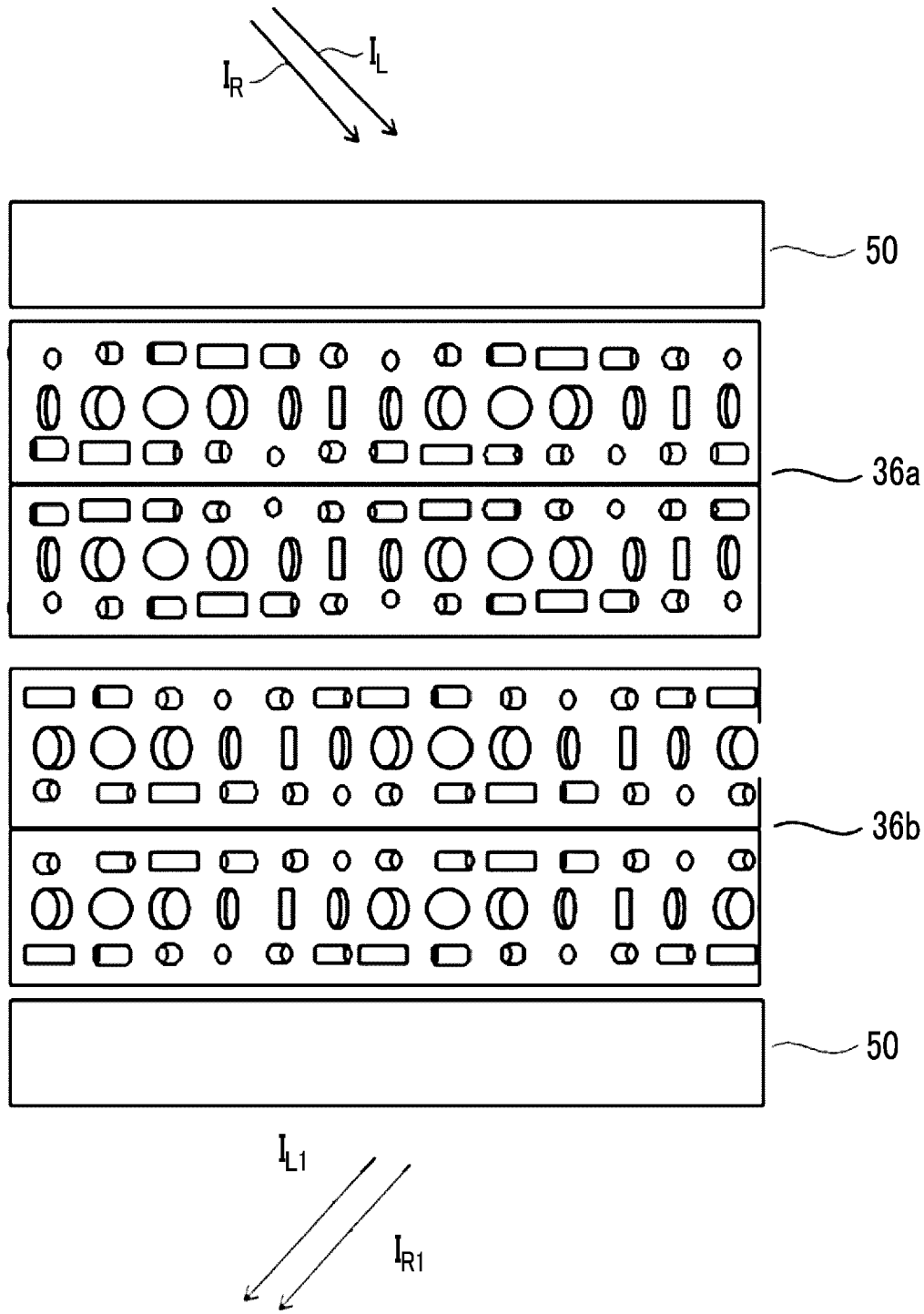
FIG. 19 is a diagram conceptually showing still another example of the transmissive liquid crystal diffraction element according to the present invention.

A $\lambda/4$ plate was bonded to both sides of the transmissive liquid crystal diffraction element according to Example 5 using a pressure sensitive adhesive, and a transmissive liquid crystal diffraction element according to Example 6 was obtained (refer to FIG. 19). The bonding was performed such that angles between the slow axes of the $\lambda/4$ plates on both of the sides and the azimuthal angle as the direction (arrangement axis D direction) in which the optical axis derived from the liquid crystal compound changed while continuously rotating in the one in-plane direction were 45 degrees or −45 degrees, respectively. The $\lambda/4$ plate was prepared using a method described in Examples of WO13/137464, and had a structure in which a positive A-Plate and a positive C-plate were laminated. In this case, the in-plane retardation Re(1550) was 388 nm, and the thickness direction retardation Rth(1550) was 0 nm.

In the diffraction element, the value of $\lambda/\Lambda$ with respect to light having an incidence wavelength $\lambda$ of 1550 nm was 1.48, that is, $\Lambda=1.05$ μm.

Example 7

A transmissive liquid crystal diffraction element according to Example 7 was prepared using the same method as that of Example 6, except that the formation of the first and second optically-anisotropic layers was performed as follows.

(Preparation of Liquid Crystal Composition)

As the liquid crystal composition for forming the liquid crystal layer, the following compositions C-3, C-4, D-3, and D-4 were prepared. The reference numeral C represents a liquid crystal compound of which the major component was a rod-like liquid crystal compound, the reference numeral D represents a liquid crystal compound of which the major component was a disk-like liquid crystal compound, the reference numeral 3 represents right-twisted, and the reference numeral 4 represents left-twisted. That is, the composition C-3 is a right-twisted liquid crystal composition of which the major component is a rod-like liquid crystal compound, the composition C-4 is a left-twisted liquid crystal composition of which the major component is a rod-like liquid crystal compound, the composition D-3 is a right-twisted liquid crystal composition of which the major component is a disk-like liquid crystal compound, and the composition D-4 is a left-twisted liquid crystal composition of which the major component is a disk-like liquid crystal compound.

Composition C-3

| | |
|---|---|
| Rod-like liquid crystal compound L-1 | 100.00 parts by mass |
| Chiral agent Ch-2 | 0.0338 parts by mass |
| Polymerization initiator (IRGACURE (registered trade name) 907, manufactured by BASF SE) | 1.25 parts by mass |
| Leveling agent T-1 | 0.32 parts by mass |
| Leveling agent T-2 | 0.04 parts by mass |
| Methyl ethyl ketone | 2000.00 parts by mass |

Composition C-4

| | |
|---|---|
| Rod-like liquid crystal compound L-1 | 100.00 parts by mass |
| Chiral agent Ch-3 | 0.0325 parts by mass |
| Polymerization initiator (IRGACURE (registered trade name) 907, manufactured by BASF SE) | 1.25 parts by mass |
| Leveling agent T-1 | 0.32 parts by mass |
| Leveling agent T-2 | 0.04 parts by mass |
| Methyl ethyl ketone | 2000.00 parts by mass |

Leveling Agent T-2

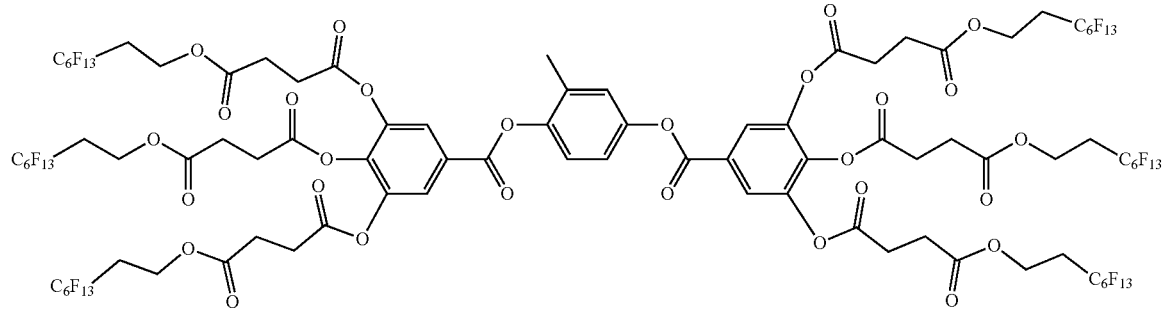

Composition D-3

| | | |
|---|---|---|
| Disk-like liquid crystal compound L-2 | 80.00 | parts by mass |
| Disk-like liquid crystal compound L-3 | 20.00 | parts by mass |
| Alignment assistant J-1 | 0.05 | parts by mass |
| Chiral agent Ch-2 | 0.0305 | parts by mass |
| Alignment assistant J-2 | 5.00 | parts by mass |
| Polymerization initiator I-1 | 3.00 | parts by mass |
| Leveling agent T-3 | 0.10 | parts by mass |
| Leveling agent T-4 | 0.10 | parts by mass |
| Methyl ethyl ketone | 300.00 | parts by mass |

Composition D-4

| | | |
|---|---|---|
| Disk-like liquid crystal compound L-2 | 80.00 | parts by mass |
| Disk-like liquid crystal compound L-3 | 20.00 | parts by mass |
| Alignment assistant J-1 | 0.05 | parts by mass |
| Chiral agent Ch-3 | 0.0280 | parts by mass |
| Alignment assistant J-2 | 5.00 | parts by mass |
| Polymerization initiator I-1 | 3.00 | parts by mass |
| Leveling agent T-3 | 0.10 | parts by mass |
| Leveling agent T-4 | 0.10 | parts by mass |
| Methyl ethyl ketone | 300.00 | parts by mass | disk-like liquid crystal layer D-3 was formed by applying the composition D-3 for forming the second layer to the rod-like liquid crystal layer C-3, heating the composition D-3 at 110° C., cooling the composition D-3, and irradiating the composition D-3 with ultraviolet light at 800 mJ/cm² for curing. Next, a corona treatment was performed on the surface of the disk-like liquid crystal layer D-3 at 75 W/m²/min, and a heat treatment was further performed thereon at 120° C. Next, the formation of the rod-like liquid crystal layer C-3 and the formation of the disk-like liquid crystal layer D-3 were alternately repeated. In this case, the coating thickness during each application was adjusted such that the thickness of the liquid crystal layer was about 0.1 μm and an excellent alignment state was obtained. In addition, the alignment direction (the direction of the major axis of the rod-like liquid crystal compound) of the liquid crystal compound in the rod-like liquid crystal layer C-3 and the alignment direction (the direction of the long side of the disk-like liquid crystal compound) of the liquid crystal compound in the disk-like liquid crystal layer D-3 were parallel during the lamination and application. Therefore, optical characteristics in which the thickness direction retardation was offset were obtained. The total $\Delta n_{1550} \times$

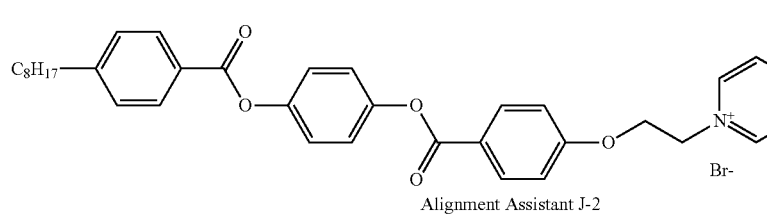

Alignment Assistant J-1

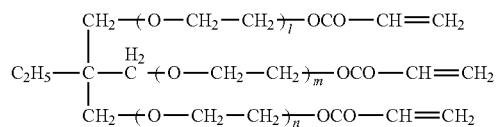

Alignment Assistant J-2

Polymerization Initiator I-1

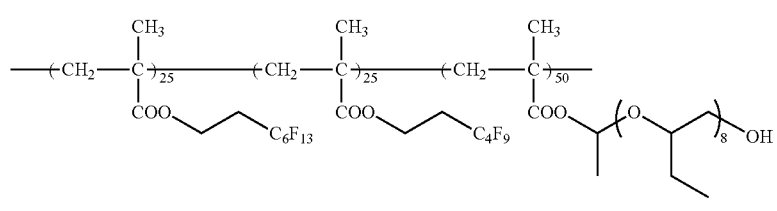

Leveling Agent T-3

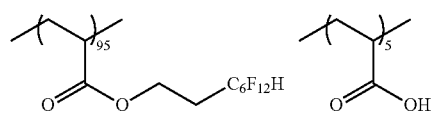

Leveling Agent T-4

(Formation of First Optically-Anisotropic Layer)

The first optically-anisotropic layer was formed by applying multiple layers of the composition C-3 and the composition D-3 to the alignment film P-2 and applying multiple layers of the composition C-4 and the composition D-4 thereto. A rod-like liquid crystal layer C-3 was formed by applying the composition C-3 for forming the first layer to the alignment film, heating the composition C-3 at 80° C., cooling the composition C-3, and irradiating the composition C-3 with ultraviolet light at 800 mJ/cm² for curing, a corona treatment was performed on the surface of the rod-like liquid crystal layer C-3 at 75 W/m²/min, and a thickness=Re(1550) of the liquid crystal layers where a plurality of rod-like liquid crystal layers C-3 and a plurality of disk-like liquid crystal layers D-3 were laminated as described above was 930 nm. In this case, $\Delta n_{1550}$ represents an in-plane direction birefringence index.

Multiple layers of the composition C-4 and the multiple layers of the composition D-4 were alternately applied. This way, a liquid crystal layer where a plurality of rod-like liquid crystal layers C-4 and a plurality of disk-like liquid crystal layers D-4 were alternately laminated was formed. $\Delta n_{1550} \times$ thickness=Re(1550) of the liquid crystal layer was 930 nm. This way, a first optically-anisotropic layer was prepared in which the liquid crystal layer where the rod-like liquid crystal layer C-3 and the disk-like liquid crystal layer D-3 were alternately laminated was laminated on the liquid crystal layer where the rod-like liquid crystal layer C-4 and the disk-like liquid crystal layer D-4 were alternately laminated. It was verified with a microscope that periodic alignment occurred. In addition, in the first optically-anisotropic layer, the twisted angle in the thickness direction of the liquid crystal layer portion where the rod-like liquid crystal layer C-3 and the disk-like liquid crystal layer D-3 were alternately laminated was 60°, and the twisted angle in the thickness direction of the liquid crystal layer portion where the rod-like liquid crystal layer C-4 and the disk-like liquid crystal layer D-4 were alternately laminated was −60°.

In addition, in a cross sectional image with a SEM, bright and dark lines having a V-shape that was horizontally laid to the lower interface (interface with the glass substrate) of the first optically-anisotropic layer was observed. The bright and dark lines were observed with the configuration where the liquid crystal compounds aligned such that the twisted directions in the thickness direction were different in terms of the positive and negative relationship were laminated in the thickness direction.

(Formation of Second Optically-Anisotropic Layer and Preparation of Transmissive Liquid Crystal Diffraction Element)

As a second optically-anisotropic layer, an optically-anisotropic layer was formed using the same method as the first optically-anisotropic layer. The second optically-anisotropic layer was transferred to and laminated on the first optically-anisotropic layer and bonded using a pressure sensitive adhesive. In this case, the second optically-anisotropic layer was inverted by 180 degrees with respect to an axis perpendicular to the main surface and bonded such that the rotation direction of the optical axis derived from the liquid crystal compound that changed while continuously rotating in one in-plane direction was opposite to that of the first optically-anisotropic layer and the directions (arrangement axes D) of the rotation directions in the one in-plane direction were parallel. This way, a transmissive liquid crystal diffraction element where the first optically-anisotropic layer and the second optically-anisotropic layer were laminated was prepared.

In the diffraction element, the value of $\lambda/\Lambda$ with respect to light having an incidence wavelength $\lambda$ of 1550 nm was 1.48, that is, $\Lambda=1.05$ μm.

Example 8

A transmissive liquid crystal diffraction element was prepared using the same method as that of Example 7, except that the following plasma treatment was performed instead of the corona treatment. Using a plasma cleaner PDC-32G (manufactured by Harrick Plasma Cooperation), a plasma treatment was performed on the sample surface for 10 seconds under conditions of an output MED and a reduced pressure. This way, a transmissive liquid crystal diffraction element was prepared.

In the diffraction element, the value of $\lambda/\Lambda$ with respect to light having an incidence wavelength $\lambda$ of 1550 nm was 1.48, that is, $\Lambda=1.05$ μm.

[Evaluation]

Laser light having a wavelength of 1550 nm was incident into the prepared transmissive liquid crystal diffraction element at an incidence angle θi from the normal direction of the main surface of the transmissive liquid crystal diffraction element such that the azimuthal angle was the direction (arrangement axis D direction) in which the optical axis derived from the liquid crystal compound changes while continuously rotating in the one in-plane direction. In the direction in which light was incident, an emission angle θo and an intensity (diffraction efficiency) of refracted light that was refracted in a direction opposite to the light incidence direction and an emission angle θp and an intensity (diffraction efficiency) of refracted light that was refracted in the same direction as the light incidence direction were measured using a power meter. In Examples 11 and 12, as the laser light, right circularly polarized light and left circularly polarized light were incident, respectively. In addition, in Example 13, S polarized light and P polarized light were incident. In addition, the average value of the intensity of the right circularly polarized light and the intensity of the left circularly polarized light, or the average value of the intensity of the S polarized light and the intensity of the P polarized light was used as the intensity value to be evaluated. The standards are as follows.

SS: the intensity (diffraction efficiency) was 97% or more
S: the intensity (diffraction efficiency) was 95% or more
A: the intensity (diffraction efficiency) was 92% or more
B: the intensity (diffraction efficiency) was 90% or more
C: the intensity (diffraction efficiency) was 80% or more
D: the intensity (diffraction efficiency) was 50% or more
E: the intensity (diffraction efficiency) was less than 50%

In addition, the polarization maintaining properties were evaluated based on the following standards.

A: The right circularly polarized light and the left circularly polarized light, or the S polarized light and the P polarized light were diffracted without being mixed
B: The right circularly polarized light and the left circularly polarized light, or the S polarized light and the P polarized light were diffracted substantially without being mixed
C: The right circularly polarized light and the left circularly polarized light, or the S polarized light and the P polarized light were mixed and diffracted The results are shown in Table 2 below.

TABLE 2

| | θi (°) | θo (°) | θp (°) | Intensity at θo | Intensity at θp | Polarization Maintaining Properties |
|---|---|---|---|---|---|---|
| Example 4 | 47.6 | −476 | 47.6 | A | Not Observed | B |
| | 42.6 | −53 | 42.6 | A | Not Observed | B |
| | 52.6 | −43 | 52.6 | A | Not Observed | B |
| Example 5 | 47.6 | −47.6 | 47.6 | A | Not Observed | A |
| | 42.6 | −53 | 42.6 | S | Not Observed | A |
| | 52.6 | −43 | 52.6 | S | Not Observed | A |
| Example 6 | 47.6 | −47.6 | 47.6 | S | Not Observed | A |
| | 42.6 | −53 | 42.6 | S | Not Observed | A |
| | 52.6 | −43 | 52.6 | S | Not Observed | A |
| Example 7 | 47.6 | −47.6 | 47.6 | SS | Not Observed | A |
| | 42.6 | −53 | 42.6 | SS | Not Observed | A |
| | 52.6 | −43 | 52.6 | SS | Not Observed | A |
| Example 8 | 47.6 | −47.6 | 47.6 | SS | Not Observed | A |
| | 42.6 | −53 | 42.6 | SS | Not Observed | A |
| | 52.6 | −43 | 52.6 | SS | Not Observed | A |

It can be seen from Table 2 that, in Examples of the present invention, even in a case where the incidence angle of incidence light deviates (42.6±5 degrees) from the center, the diffraction efficiency does not deteriorate and the incidence light can be bent at a large angle. In addition, the following can be seen. The refracted light that was refracted in the same direction (the angle of θp) as the light incidence direction was not able to be observed, and all of polarized light components (a right circularly polarized light component and a left circularly polarized light component, or an S polarized light and a P polarized light) of the incidence light were able to be diffracted in the same direction (the angle of θo). In addition, incidence light was able to be diffracted while maintaining the polarization state thereof. That is, in Examples 4 and 5, in a case where the incident polarized light was right circularly polarized light, the diffracted light was left circularly polarized light, in a case where the incident polarized light was left circularly polarized light, the diffracted light was right circularly polarized light, and the left circularly polarized light and the right circularly polarized light were able to be diffracted without being mixed. Likewise, in Example 6, in a case where the incident polarized light was S, the diffracted light was S polarized light, in a case where the incident polarized light was P polarized light, the diffracted light was converted into P polarized light, and the S polarized light and the P polarized light were able to be diffracted without being mixed. In particular, in Examples 5 and 6, the effects were realized to a high degree.

Example 71

In order to verify the effects of the present invention in a case where the wavelength of incidence light varied, the following example was prepared based on Example 7 and was evaluated. As in Example 7, a transmissive liquid crystal diffraction element was prepared, and the wavelength of incidence light was changed as shown in the following table and was evaluated.

TABLE 3

| | | | | Evaluation | | |
|---|---|---|---|---|---|---|
| | θi (°) | θo (°) | θp (°) | Intensity at θo | Intensity at θp | Polarization Maintaining Properties |
| 1520 nm | 47.6 | −45.2 | 47.6 | SS | Not Observed | A |
| | 42.6 | −50.4 | 42.6 | SS | Not Observed | A |
| | 52.6 | −40.8 | 52.6 | SS | Not Observed | A |
| 1550 nm | 47.6 | −47.6 | 47.6 | SS | Not Observed | A |
| | 42.6 | −53 | 42.6 | SS | Not Observed | A |
| | 52.6 | −43 | 52.6 | SS | Not Observed | A |
| 1580 nm | 47.6 | −50.1 | 47.6 | SS | Not Observed | A |
| | 42.6 | −55.9 | 42.6 | SS | Not Observed | A |
| | 52.6 | −45.3 | 52.6 | SS | Not Observed | A |

In the diffraction element, the value of λ/Λ was 1.45 with respect to light having an incidence wavelength λ of 1520 nm, was 1.48 with respect to light having an incidence wavelength λ of 1550 nm, and was 1.5 with respect to light having an incidence wavelength Λ, of 1580 nm, that is, Λ=1.05 μm.

It can be seen from the results of Table 3 that, in Examples of the present invention, even in a case where the wavelength of incidence light was changed (1520 to 1580 nm), all of the polarized light components of the incidence light were bent at a large degree with a high diffraction efficiency, and the incidence light was able to be diffracted while maintaining the polarization state thereof. In addition, it can be seen that, since the emission angle varied depending on the wavelength of the incidence light, the diffraction element functioned as a spectral element having a high efficiency and high polarization maintaining properties.

Example 72

In order to verify the effects of the present invention in a case where the wavelength of incidence light varied, the following example was prepared based on Example 7 and was evaluated. In Example 7, Λ=0.887 μm, the total $\Delta n_{1310} \times$ thickness=Re(1310) of the liquid crystal layers where a plurality of rod-like liquid crystal layers C-3 and a plurality of disk-like liquid crystal layers D-3 were laminated was set to 786 nm, and the total $\Delta n_{1310} \times$ thickness=Re(1310) of the liquid crystal layers where a plurality of rod-like liquid crystal layers C-4 and a plurality of disk-like liquid crystal layers D-4 were laminated was set to 786 nm. In addition, the concentration of the chiral agent in each of the layers was adjusted such that the twisted angle in the thickness direction of the liquid crystal layer portion where the rod-like liquid crystal layer C-3 and the disk-like liquid crystal layer D-3 were alternately laminated was 60°, and the twisted angle in the thickness direction of the liquid crystal layer portion where the rod-like liquid crystal layer C-4 and the disk-like liquid crystal layer D-4 were alternately laminated was −60°. This way, a transmissive liquid crystal diffraction element was prepared, and the wavelength of incidence light was changed as shown in the following table and was evaluated.

TABLE 4

| | | | | Evaluation | | |
|---|---|---|---|---|---|---|
| | θi (°) | θo (°) | θp (°) | Intensity at θo | Intensity at θp | Polarization Maintaining Properties |
| 1285 nm | 47.6 | −45.3 | 47.6 | SS | Not Observed | A |
| | 42.6 | −50.5 | 42.6 | SS | Not Observed | A |
| | 52.6 | −40.9 | 52.6 | SS | Not Observed | A |
| 1310 nm | 47.6 | −47.6 | 47.6 | SS | Not Observed | A |
| | 42.6 | −53 | 42.6 | SS | Not Observed | A |
| | 52.6 | −43 | 52.6 | SS | Not Observed | A |
| 1335 nm | 47.6 | −50.1 | 47.6 | SS | Not Observed | A |
| | 42.6 | −55.9 | 42.6 | SS | Not Observed | A |
| | 52.6 | −45.3 | 52.6 | SS | Not Observed | A |

In the diffraction element, the value of λ/Λ was 1.45 with respect to light having an incidence wavelength λ of 1285 nm, was 1.48 with respect to light having an incidence wavelength λ of 1310 nm, and was 1.51 with respect to light having an incidence wavelength λ of 1335 nm, that is, Λ=0.887 μm.

It can be seen from the results of Table 4 that, in Examples of the present invention, even in a case where the wavelength of incidence light was changed (1285 to 1335 nm), all of the polarized light components of the incidence light were bent at a large degree with a high diffraction efficiency, and the incidence light was able to be diffracted while maintaining the polarization state thereof. In addition, it can be seen that, since the emission angle varied depending on the wavelength of the incidence light, the diffraction element functioned as a spectral element having a high efficiency and high polarization maintaining properties.

Example 9

An alignment film was formed and exposed using the same method as that of Example 1, except that the intersecting angle (intersecting angle α) between the two laser beams was adjusted such that the single period Λ (the length over which the optical axis rotates by 180°) of an alignment pattern formed by interference of the two laser beams was 1.0 μm. The formation of the first and second optically-anisotropic layers was performed as follows.

(Formation of First Optically-Anisotropic Layer)

A first optically-anisotropic layer was formed using the same method as described above, except that the thickness was adjusted during the formation (composition B-1) of the first optically-anisotropic layer in Example 1 as the liquid crystal composition for forming the liquid crystal layer.

Finally, in the first optically-anisotropic layer, $\Delta n_{550} \times$ thickness=Re(550) of the liquid crystals was 280 nm, and it was verified with a polarization microscope that periodic alignment occurred. In addition, the twisted angle of the first optically-anisotropic layer in the thickness direction was 0°. In addition, in a cross sectional image with a SEM, bright and dark lines that were perpendicular to the lower interface (interface with the glass substrate) of the first optically-anisotropic layer was observed.

As a second optically-anisotropic layer, an optically-anisotropic layer was formed using the same method as the first optically-anisotropic layer. The second optically-anisotropic layer was transferred to and laminated on the first optically-anisotropic layer and bonded using a pressure sensitive adhesive. In this case, the second optically-anisotropic layer was inverted by 180 degrees with respect to an axis perpendicular to the main surface and bonded such that the rotation direction of the optical axis derived from the liquid crystal compound that changed while continuously rotating in one in-plane direction was opposite to that of the first optically-anisotropic layer and the directions (arrangement axes D) of the rotation directions in the one in-plane direction were parallel. This way, a transmissive liquid crystal diffraction element where the first optically-anisotropic layer and the second optically-anisotropic layer were laminated was prepared.

In the diffraction element, the value of $\lambda/\Lambda$ was 0.45 with respect to light having an incidence wavelength $\lambda$ of 450 nm, was 0.53 with respect to light having an incidence wavelength $\lambda$ of 532 nm, and was 0.65 with respect to light having an incidence wavelength $\lambda$ of 650 nm, that is, $\Lambda$=1.0 μm.

Comparative Example 2

A transmissive liquid crystal diffraction element including only the first optically-anisotropic layer according to Example 9 was prepared.

[Evaluation]

Laser light components having wavelengths of 450 nm, 532 nm, and 650 nm was incident into the prepared transmissive liquid crystal diffraction element at an incidence angle θi from the normal direction of the main surface of the transmissive liquid crystal diffraction element such that the azimuthal angle was the direction (arrangement axis D direction) in which the optical axis derived from the liquid crystal compound changes while continuously rotating in the one in-plane direction. In the direction in which light was incident, an emission angle θo and an intensity (diffraction efficiency) of refracted light that was refracted in a direction opposite to the light incidence direction and an emission angle θp and an intensity (diffraction efficiency) of light that was emitted in the same direction as the light incidence direction were measured using a power meter. As the incident laser light, right circularly polarized light and left circularly polarized light were incident, and the average value thereof was used as the intensity (diffraction efficiency). Standards of the intensity (diffraction efficiency) were as follows. In the evaluation of the intensity (diffraction efficiency), the average value of the intensities (diffraction efficiencies) of the refracted light components at the wavelengths of 450 nm, 532 nm, and 650 nm was used.
S: the intensity (diffraction efficiency) was 80% or more
A: the intensity (diffraction efficiency) was 75% or more
B: the intensity (diffraction efficiency) was 70% or more
C: the intensity (diffraction efficiency) was 60% or more
D: the intensity (diffraction efficiency) was 50% or more
E: the intensity (diffraction efficiency) was less than 50%

The results are shown in the following table 5.

TABLE 5

| | Wavelength (nm) | θi (°) | θo (°) | θp (°) | Evaluation Intensity at θo |
|---|---|---|---|---|---|
| Example 9 | 450 | 16 | −10 | 16 | S |
| | 532 | 16 | −15 | 16 | |
| | 650 | 16 | −22 | 16 | |
| Comparative Example 2 | 450 | 16 | −10 | 16 | E |
| | 532 | 16 | −15 | 16 | |
| | 650 | 16 | −22 | 16 | |

It can be seen from Table 5 that, in Examples of the present invention, a high light intensity (diffraction efficiency) can be obtained with respect to incidence light components having different wavelengths. In addition, all of polarized light components (a right circularly polarized light component and a left circularly polarized light component) of the incidence light were diffracted in the same direction (the angle of θo), and a high diffraction efficiency was obtained. Further, light was bent at different emission angles θp with respect to the wavelengths of 450 nm, 532 nm, and 650 nm. That is, it can be seen that, in Examples of the present invention, the diffraction element functioned as a spectral element having a high diffraction efficiency.

Example 10

An alignment film was formed and exposed using the same method as that of Example 9. The formation of the first and second optically-anisotropic layers was performed as follows.

(Formation of First Optically-Anisotropic Layer)

The first optically-anisotropic layer was formed by applying multiple layers of the following composition B-4 to the alignment film P-2. Preparation conditions of heating, cooling, and ultraviolet curing were the same as those of Example 1. In the liquid crystal layer where multiple layers were formed of the composition B-4, $\Delta n_{1600} \times$thickness=(Re (600)) was 214 nm, and the twisted angle was 90 degrees. Further, multiple layers of the following composition B-5 were applied to the liquid crystal layer of the composition B-4. In the liquid crystal layer where multiple layers were formed of the composition B-5, 411600×thickness=(Re (600)) was 305 nm, and the twisted angle was −33 degrees. This way, the first optically-anisotropic layer was formed. In a cross sectional image with a SEM, bright and dark lines having V-shape that was horizontally laid to the lower interface (interface with the glass substrate) of the first optically-anisotropic layer and where lengths of angles of two lines extending obliquely horizontally were different was observed. The bright and dark lines were observed with the configuration where the liquid crystal compounds aligned such that the twisted directions in the thickness direction were different in the left-right direction were laminated in the thickness direction and the absolute values of the thicknesses and the twisted angles of the right-twisted layer and the left-twisted layer are different.

Composition B-4

| Rod-like liquid crystal compound L-1 | 100.00 parts by mass |
|---|---|
| Chiral agent Ch-A | 0.38 parts by mass |
| Polymerization initiator (IRGACURE (registered trade name) 907, manufactured by BASF SE) | 3.00 parts by mass |
| Photosensitizer (KAYACURE DETX-S, manufactured by Nippon Kayaku Co., Ltd.) | 1.00 part by mass |
| Leveling agent T-1 | 0.08 parts by mass |
| Methyl ethyl ketone | 2000.00 parts by mass |

Composition B-5

| Rod-like liquid crystal compound L-1 | 100.00 parts by mass |
|---|---|
| Chiral agent Ch-B | 0.166 parts by mass |
| Polymerization initiator (IRGACURE (registered trade name) 907, manufactured by BASF SE) | 3.00 parts by mass |
| Photosensitizer (KAYACURE DETX-S, manufactured by Nippon Kayaku Co., Ltd.) | 1.00 part by mass |
| Leveling agent T-1 | 0.08 parts by mass |
| Methyl ethyl ketone | 2000.00 parts by mass |

(Formation of Second Optically-Anisotropic Layer and Preparation of Transmissive Liquid Crystal Diffraction Element)

As a second optically-anisotropic layer, an optically-anisotropic layer was formed using the same method as the first optically-anisotropic layer. The second optically-anisotropic layer was transferred to and laminated on the first optically-anisotropic layer and bonded using a pressure sensitive adhesive. In this case, the second optically-anisotropic layer was inverted by 180 degrees with respect to an axis perpendicular to the main surface and bonded such that the rotation direction of the optical axis derived from the liquid crystal compound that changed while continuously rotating in one in-plane direction was opposite to that of the first optically-anisotropic layer and the directions (arrangement axes D) of the rotation directions in the one in-plane direction were parallel. This way, a transmissive liquid crystal diffraction element where the first optically-anisotropic layer and the second optically-anisotropic layer were laminated was prepared.

In the diffraction element, the value of λ/Λ was 0.45 with respect to light having an incidence wavelength λ of 450 nm, was 0.53 with respect to light having an incidence wavelength λ of 532 nm, was 0.65 with respect to light having an incidence wavelength λ of 650 nm, and was 0.98 with respect to light having an incidence wavelength λ of 980 nm that is, Λ=1.0 μm.

[Evaluation]

Laser light components having wavelengths of 450 nm, 532 nm, 650 nm, and 980 nm was incident into the prepared transmissive liquid crystal diffraction element at an incidence angle θi from the normal direction of the main surface of the transmissive liquid crystal diffraction element such that the azimuthal angle was the direction (arrangement axis D direction) in which the optical axis derived from the liquid crystal compound changes while continuously rotating in the one in-plane direction. In the direction in which light was incident, an emission angle θo and an intensity (diffraction efficiency) of refracted light that was refracted in a direction opposite to the light incidence direction and an emission angle θp and an intensity (diffraction efficiency) of light that was emitted in the same direction as the light incidence direction were measured using a power meter. As the incident laser light, right circularly polarized light and left circularly polarized light were incident, and the average value thereof was used as the intensity (diffraction efficiency). Standards of the intensity (diffraction efficiency) were as follows. In the evaluation of the intensity (diffraction efficiency), the average value of the intensities (diffraction efficiencies) of the refracted light components at the wavelengths of 450 nm, 532 nm, 650 nm, and 980 nm was used.

S: the intensity (diffraction efficiency) was 70% or more
A: the intensity (diffraction efficiency) was 65% or more
B: the intensity (diffraction efficiency) was 60% or more
C: the intensity (diffraction efficiency) was 50% or more
D: the intensity (diffraction efficiency) was 40% or more
E: the intensity (diffraction efficiency) was less than 40%

The results are shown in the following Table 6.

TABLE 6

| | Wavelength (nm) | θi (°) | θo (°) | θp (°) | Evaluation Intensity at θo |
|---|---|---|---|---|---|
| Example 10 | 450 | 16 | −10 | 16 | S |
| | 532 | 16 | −15 | 16 | |
| | 650 | 16 | −22 | 16 | |
| | 980 | 16 | −45 | 16 | |

It can be seen from Table 6 that, in Examples of the present invention, a high light intensity (diffraction efficiency) can be obtained with respect to incidence light components having different wavelengths. In addition, all of polarized light components (a right circularly polarized light component and a left circularly polarized light component) of the incidence light were diffracted in the same direction (the angle of θo), and a high diffraction efficiency was obtained. As a result, it can be seen that the diffraction element functioned as a spectral element having a high diffraction efficiency with respect to visible light to infrared light at wavelengths of 450 nm, 532 nm, 650 nm, and 980 nm.

Example 11

The exposure of the alignment film was performed using the same method as that of Example 10, except that the intersecting angle (intersecting angle α) between the two beams was adjusted such that the single period Λ of the alignment pattern was 2.375 μm. In addition, a composition B-6 was prepared using the same method as that of the composition B-4, except that the amount of the chiral agent Ch-A was changed to 0.16 parts by mass. In addition, a composition B-7 was prepared using the same method as that of the composition B-5, except that the amount of the chiral agent Ch-B was changed to 0.07 parts by mass. The first optically-anisotropic layer was formed by applying multiple layers of the following composition B-6 to the alignment film P-2. Preparation conditions of heating, cooling, and ultraviolet curing were the same as those of Example 1. In the liquid crystal layer where multiple layers were formed of the composition B-6, $\Delta n_{1400} \times$thickness=(Re(1400)) was 508 nm, and the twisted angle was 90 degrees. Further, multiple layers of the following composition B-7 were applied to the liquid crystal layer of the composition B-6. In the liquid crystal layer where multiple layers were formed of the composition B-7, $\Delta n_{1400} \times$thickness=(Re(1400)) was 724 nm, and the twisted angle was −33 degrees.

This way, the first optically-anisotropic layer was formed. In a cross sectional image with a SEM, bright and dark lines having V-shape that was horizontally laid to the lower interface (interface with the glass substrate) of the first optically-anisotropic layer and where lengths and angles of two lines extending obliquely horizontally were different was observed. The bright and dark lines were observed with the configuration where the liquid crystal compounds aligned such that the twisted directions in the thickness direction were different in the left-right direction were laminated in the thickness direction and the absolute values of the thicknesses and the twisted angles of the right-twisted layer and the left-twisted layer are different.

(Formation of Second Optically-Anisotropic Layer and Preparation of Transmissive Liquid Crystal Diffraction Element)

As a second optically-anisotropic layer, an optically-anisotropic layer was formed using the same method as the first optically-anisotropic layer. The second optically-anisotropic layer was transferred to and laminated on the first optically-anisotropic layer and bonded using a pressure sensitive adhesive. In this case, the second optically-anisotropic layer was inverted by 180 degrees with respect to an axis perpendicular to the main surface and bonded such that the rotation direction of the optical axis derived from the liquid crystal compound that changed while continuously rotating in one in-plane direction was opposite to that of the first optically-anisotropic layer and the directions (arrangement axes D) of the rotation directions in the one in-plane direction were parallel. This way, a transmissive liquid crystal diffraction element where the first optically-anisotropic layer and the second optically-anisotropic layer were laminated was prepared.

In the diffraction element, the value of $\lambda/\Lambda$ was 0.40 with respect to light having an incidence wavelength $\lambda$ of 950 nm, was 0.59 with respect to light having an incidence wavelength $\lambda$ of 1400 nm, and was 1.05 with respect to light having an incidence wavelength $\lambda$ of 2500 nm, that is, $\Lambda$=2.375 μm.

[Evaluation]

Laser light components having wavelengths of 950 nm, 1400 nm, and 2500 nm was incident into the prepared transmissive liquid crystal diffraction element at an incidence angle $\theta i$ from the normal direction of the main surface of the transmissive liquid crystal diffraction element such that the azimuthal angle was the direction (arrangement axis D direction) in which the optical axis derived from the liquid crystal compound changes while continuously rotating in the one in-plane direction. An emission angle $\theta o$ and an intensity (diffraction efficiency) of refracted light that was refracted in a direction opposite to the light incidence direction and an emission angle $\theta p$ and an intensity (diffraction efficiency) of light that was emitted in the same direction as the light incidence direction were measured. As the intensity, the average value of the diffraction efficiencies of right circularly polarized light and left circularly polarized light of the incidence light was used. Standards of the intensity (diffraction efficiency) were as follows.

S: the intensity (diffraction efficiency) was 60% or more
A: the intensity (diffraction efficiency) was 55% or more
B: the intensity (diffraction efficiency) was 50% or more
C: the intensity (diffraction efficiency) was 40% or more
D: the intensity (diffraction efficiency) was 30% or more
E: the intensity (diffraction efficiency) was less than 30%

The results are shown in the following Table 7.

TABLE 7

|  | Wavelength (nm) | $\theta i$ (°) | $\theta o$ (°) | $\theta p$ (°) | Evaluation Intensity at $\theta o$ |
|---|---|---|---|---|---|
| Example 11 | 950 | 16 | −7 | 16 | S |
|  | 1400 | 16 | −21 | 16 |  |
|  | 2500 | 16 | −51 | 16 |  |

It can be seen from Table 7 that, in Examples of the present invention, a high light intensity (diffraction efficiency) can be obtained with respect to incidence light components having different wavelengths. In addition, all of polarized light components (a right circularly polarized light component and a left circularly polarized light component) of the incidence light were diffracted in the same direction (the angle of $\theta o$), and a high diffraction efficiency was obtained. That is, it can be seen that the diffraction element functioned as a spectral element having a high diffraction efficiency with respect to infrared light at a wavelength of 950 to 2500 nm.

As can be seen from the above results, the effects of the present invention are obvious.

The present invention is suitably applicable to various applications where light is bent, for example, optical communication. In a reflective member such as a mirror that is used for an application where light is bent, a light traveling direction is reversed in a direction perpendicular to a reflecting surface and does not change in a direction parallel to the reflecting surface. On the other hand, the transmissive liquid crystal diffraction element according to the embodiment of the present invention, a light traveling direction does not change in a direction perpendicular to the main surface and is reversed in a direction parallel to the main surface. Therefore, between the transmissive liquid crystal diffraction element according to the embodiment of the present invention and a reflective member, directions of surfaces into which light is incident are different by 90° in order to obtain the same light bending action. Accordingly, in optical communication or the like, in a case where an installation space is limited due to a reduction in size and thickness, there may be a case where the transmissive liquid crystal diffraction element according to the embodiment of the present invention can be easily disposed at a position where it is difficult to dispose a reflective member.

In addition, the present invention is suitably applicable to various applications where light is split, for example, a hyperspectral camera. In a spectral element such as a diffraction element that is used for applications where light is split, light needs to be bent to obtain a high diffraction efficiency in a wide wavelength range. With the transmissive liquid crystal diffraction element according to the embodiment of the present invention, incidence light in a wide wavelength range can be split with a high diffraction efficiency, and light can be detected with a high sensitivity in a hyperspectral camera or the like.

EXPLANATION OF REFERENCES

10: transmissive liquid crystal diffraction element
30: support
32: alignment film
36, 37, 36c: optically-anisotropic layer
36a, 37a, 37c: first optically-anisotropic layer 36b, 37b, 37d: second optically-anisotropic layer
38: retardation layer
40: liquid crystal compound
40c: rod-like liquid crystal compound
40d: disk-like liquid crystal compound
40A: optical axis
42, 42b: rod-like liquid crystal layer
44, 44b: disk-like liquid crystal layer
46a, 46b, 47, 48a, 48b: liquid crystal layer
50: λ/4 plate
60: exposure device
62: laser
64: light source
65: λ/2 plate
68: polarization beam splitter
70a, 70B: mirror
72A, 72B: λ/4 plate
$I_R$, $I_{R1}$: right circularly polarized light
$I_L$, $I_{L1}$: left circularly polarized light
D: arrangement axis
R: region
A: single period
M: laser light
MA, MB: beam
$P_O$: linearly polarized light
$P_R$: right circularly polarized light
$P_L$: left circularly polarized light
α: angle
$L_1$, $L_2$, $L_4$, $L_5$: light

What is claimed is:

1. A transmissive liquid crystal diffraction element comprising:
a first optically-anisotropic layer and a second optically-anisotropic layer each of which has a liquid crystal alignment pattern in which a direction of an optical axis derived from a liquid crystal compound changes while continuously rotating in at least one in-plane direction,
wherein a rotation direction of the optical axis in the liquid crystal alignment pattern of the first optically-anisotropic layer and a rotation direction of the optical axis in the liquid crystal alignment pattern of the second optically-anisotropic layer are opposite to each other,
in a case where a length over which the direction of the optical axis derived from the liquid crystal compound in the liquid crystal alignment pattern rotates by 180° in a plane is set as a single period, a single period of the liquid crystal alignment pattern in the first optically-anisotropic layer and a single period of the liquid crystal alignment pattern in the second optically-anisotropic layer are the same,
the liquid crystal compound in each of the first optically-anisotropic layer and the second optically-anisotropic layer is twisted and aligned in a thickness direction,
a twisted angle of the twisted alignment is less than 360°, and
a twisted direction of the liquid crystal compound in the first optically-anisotropic layer and a twisted direction of the liquid crystal compound in the second optically-anisotropic layer are opposite to each other.

2. The transmissive liquid crystal diffraction element according to claim 1,
wherein the liquid crystal compound is a rod-like liquid crystal compound or a disk-like liquid crystal compound.

3. The transmissive liquid crystal diffraction element according to claim 1,
wherein at least one of the first optically-anisotropic layer or the second optically-anisotropic layer has a configuration in which a rod-like liquid crystal layer where a rod-like liquid crystal compound is aligned in the liquid crystal alignment pattern and a disk-like liquid crystal layer where a disk-like liquid crystal compound is aligned in the liquid crystal alignment pattern are alternately laminated.

4. The transmissive liquid crystal diffraction element according to claim 1, further comprising:
a retardation layer that is disposed between the first optically-anisotropic layer and the second optically-anisotropic layer.

5. The transmissive liquid crystal diffraction element according to claim 4,
wherein an Nz value of the retardation layer is 0.1 to 1.1.

6. The transmissive liquid crystal diffraction element according to claim 1, further comprising:
an λ/4 plate that is provided on at least one of a side of the first optically-anisotropic layer opposite to the second optically-anisotropic layer or a side of the second optically-anisotropic layer opposite to the first optically-anisotropic layer.

7. A transmissive liquid crystal diffraction element comprising:
a first optically-anisotropic layer and a second optically-anisotropic layer each of which has a liquid crystal alignment pattern in which a direction of an optical axis derived from a liquid crystal compound changes while continuously rotating in at least one in-plane direction,
wherein a rotation direction of the optical axis in the liquid crystal alignment pattern of the first optically-anisotropic layer and a rotation direction of the optical axis in the liquid crystal alignment pattern of the second optically-anisotropic layer are opposite to each other,
in a case where a length over which the direction of the optical axis derived from the liquid crystal compound in the liquid crystal alignment pattern rotates by 180° in a plane is set as a single period, a single period of the liquid crystal alignment pattern in the first optically-anisotropic layer and a single period of the liquid crystal alignment pattern in the second optically-anisotropic layer are the same,
at least one of the first optically-anisotropic layer or the second optically-anisotropic layer has a configuration in which a plurality of liquid crystal layers where the liquid crystal compound is twisted and aligned in a thickness direction are laminated,
a twisted angle of the twisted alignment in each of the liquid crystal layers is less than 360°, and
twisted directions of the liquid crystal compound in the plurality of liquid crystal layers are alternately changed in a laminating direction.

8. The transmissive liquid crystal diffraction element according to claim 7,
wherein at least one of the liquid crystal layers has a configuration in which a rod-like liquid crystal layer where a rod-like liquid crystal compound is aligned in the liquid crystal alignment pattern and a disk-like liquid crystal layer where a disk-like liquid crystal compound is aligned in the liquid crystal alignment pattern are alternately laminated.

* * * * *